US011588976B2

(12) United States Patent
Kitamura et al.

(10) Patent No.: US 11,588,976 B2
(45) Date of Patent: Feb. 21, 2023

(54) IMAGE CAPTURING APPARATUS HAVING IMAGE CAPTURING DEVICE PROVIDED WITH POLARIZATION ELEMENTS AND METHOD OF CONTROLLING SAME

(71) Applicant: CANON KABUSHIKI KAISHA, Tokyo (JP)

(72) Inventors: Kazuya Kitamura, Kanagawa (JP); Tokuro Nishida, Kanagawa (JP); Hiroyuki Hasegawa, Chiba (JP); Takenori Kobuse, Kanagawa (JP); Yusuke Yamashita, Kanagawa (JP); Yoshikazu Ishikawa, Kanagawa (JP); Takayuki Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 17/172,696

(22) Filed: Feb. 10, 2021

(65) Prior Publication Data

US 2021/0266444 A1    Aug. 26, 2021

(30) Foreign Application Priority Data

Feb. 25, 2020    (JP) .............................. JP2020-029498

(51) Int. Cl.
*H04N 5/235*    (2006.01)
*G06T 7/246*    (2017.01)
(Continued)

(52) U.S. Cl.
CPC ........... *H04N 5/2351* (2013.01); *G06T 7/248* (2017.01); *H04N 5/76* (2013.01); *H04N 7/0127* (2013.01)

(58) Field of Classification Search
CPC ...... H04N 5/2351; H04N 5/76; H04N 7/0127; H04N 5/23251; H04N 5/23261;
(Continued)

(56) References Cited

U.S. PATENT DOCUMENTS

| 2018/0006066 A1 | 1/2018 | Okuno |
| 2018/0286908 A1 | 10/2018 | Yamazaki |

(Continued)

FOREIGN PATENT DOCUMENTS

| JP | 2017076683 A | 4/2017 |
| JP | 2018007024 A | 1/2018 |

*Primary Examiner* — Christopher K Peterson
(74) *Attorney, Agent, or Firm* — Rossi, Kimms & McDowell LLP

(57) ABSTRACT

An image capturing apparatus that has an image capturing device including polarization elements and sets a proper frame rate according to a situation when acquiring a video using polarization information. The image capturing device an image capturing device including polarization pixels that detect polarization information of a plurality of different directions. The polarization information of the polarization pixels is determined by performing first polarization calculation or second polarization calculation which is smaller in calculation load than the first polarization calculation, on video signals output from the polarization pixels. A polarization-processed image is generated by using the polarization information. The first polarization calculation and the second polarization calculation are switched according to a predetermined timing, a mode, or a result of detecting a predetermined state.

37 Claims, 35 Drawing Sheets

(51) Int. Cl.
   *H04N 5/76*      (2006.01)
   *H04N 7/01*      (2006.01)
   *H04N 5/232*     (2006.01)
   *H04N 5/238*     (2006.01)
   *H04N 5/783*     (2006.01)
   *H04N 5/77*      (2006.01)

(58) Field of Classification Search
   CPC ............... H04N 5/238; H04N 5/23212; H04N 5/23229; H04N 5/23245; H04N 5/232933; H04N 5/783; H04N 5/772; G06T 7/248
   See application file for complete search history.

(56) References Cited

U.S. PATENT DOCUMENTS

| | | | |
|---|---|---|---|
| 2018/0359401 A1* | 12/2018 | Oyaizu | H04N 5/35581 |
| 2019/0273856 A1* | 9/2019 | Hirasawa | H04N 5/238 |
| 2021/0152748 A1* | 5/2021 | Lu | H04N 5/2256 |

* cited by examiner

|  | HIGH-DEFINITION MODE | HIGH-FRAME RATE MODE |
|---|---|---|
| RECORDING FORMAT | NON-COMPRESSION RECORDING | COMPRESSION RECORDING |
| RESOLUTION | 4K | HD |
| SIGNAL FORMAT | RGB444 | YCC422 |
| BIT DEPTH | 12 BITS | 10 BITS |

FIG. 9

|  | FRAME NUMBER | | | | | | |
|---|---|---|---|---|---|---|---|
| INPUT IMAGE | A3 | A4 | A5 | A6 | A7 | A8 | A9 |
| ASSIST IMAGE | B2 | B3 | B4 | B5 | B6 | B7 | B8 |
| POLARIZATION-PROCESSED IMAGE | C1 | C1 | C3 | C3 | C5 | C5 | C7 |
| DISPLAY IMAGE | B2+C1 | B3+C1 | B4+C3 | B5+C3 | B6+C5 | B7+C5 | B8+C7 |

FIG. 10

| | FRAME NUMBER | | | | | | | |
|---|---|---|---|---|---|---|---|---|
| INPUT IMAGE | A5 | A6 | A7 | A8 | A9 | A10 | A11 | A12 |
| OUTPUT IMAGE | A5 | A6 | A7 | A8 | A9 | A10 | A11 | A12 |
| INPUT IMAGE FOR DISPLAY | A5 | A5 | A7 | A7 | A9 | A9 | A11 | A11 |
| ASSIST IMAGE | B3 | B5 | B5 | B7 | B7 | B9 | B9 | B11 |
| POLARIZATION-PROCESSED IMAGE FOR DISPLAY | C1 | C1 | C1 | C1 | C5 | C5 | C5 | C5 |
| DISPLAY IMAGE | B3+C1 | B5+C1 | B5+C1 | B7+C1 | B7+C5 | B9+C5 | B9+C5 | B11+C5 |

FIG. 27

| OPERATION OF BODY | POWER CONSUMPTION VALUE [W] | | | | |
|---|---|---|---|---|---|
| | 5.5 | 4.7 | 3.7 | 3.0 | 2.1 |
| | MULTI CAMERA: ON<br>LED LIGHT: ON<br>MOVING IMAGE RECORDING: ON<br>PANEL HIGH LUMINANCE: ON<br>PANEL DOUBLE SPEED DRIVING: ON<br>Wi-Fi: ON<br>VIDEO OUTPUT: ON<br>... | MULTI CAMERA: ON<br>LED LIGHT: ON<br>MOVING IMAGE RECORDING: ON<br>PANEL HIGH LUMINANCE: ON<br>PANEL DOUBLE SPEED DRIVING: ON<br>Wi-Fi: OFF<br>VIDEO OUTPUT: OFF<br>... | MULTI CAMERA: OFF<br>LED LIGHT: ON<br>MOVING IMAGE RECORDING: ON<br>PANEL HIGH LUMINANCE: ON<br>PANEL DOUBLE SPEED DRIVING: ON<br>Wi-Fi: OFF<br>VIDEO OUTPUT: OFF<br>... | MULTI CAMERA: OFF<br>LED LIGHT: OFF<br>MOVING IMAGE RECORDING: ON<br>PANEL HIGH LUMINANCE: ON<br>PANEL DOUBLE SPEED DRIVING: ON<br>Wi-Fi: OFF<br>VIDEO OUTPUT: OFF<br>... | MULTI CAMERA: OFF<br>LED LIGHT: OFF<br>MOVING IMAGE RECORDING: ON<br>PANEL HIGH LUMINANCE: OFF<br>PANEL DOUBLE SPEED DRIVING: OFF<br>Wi-Fi: OFF<br>VIDEO OUTPUT: OFF<br>... |

SWITCHING OF CALCULATION ELECTRIC POWER THRESHOLD VALUE 4.0W

WAVEFORM OF C1-1

WAVEFORM OF C1-4

WAVEFORM OF C1-2

WAVEFORM OF C1-3

IMAGE CAPTURING APPARATUS HAVING IMAGE CAPTURING DEVICE PROVIDED WITH POLARIZATION ELEMENTS AND METHOD OF CONTROLLING SAME

BACKGROUND OF THE INVENTION

Field of the Invention

The present invention relates to an image capturing apparatus having an image capturing device provided with polarization elements that are capable of acquiring polarization information on polarizations in different directions and a method of controlling the same.

Description of the Related Art

An image capturing device represented e.g. by a CCD sensor and a CMOS sensor has a plurality of light receiving elements (pixels) two-dimensionally arranged and is capable of detecting the intensity of light (luminance) by converting light to an electrical signal in each pixel. Further, by disposing color filters, which allow only light in the wavelength bands of red (R), green (G), and blue (B) to pass therethrough, on the pixels, it is possible to acquire only light having visible wavelengths (colors). By using this mechanism, it is possible to convert a color video visually recognizable by human eyes to digital signals, to thereby store the video in a storage device and display the same on a display device.

Besides the properties of luminance, color, and so forth, light has a property called polarization. Polarization can be regarded as a property of vibration of light in a particular direction, and it is known that light emitted from a light source has various vibration direction components (polarization directions) when the light is reflected from an object. However, in actuality, a mixture of all polarized light and non-polarized light (scattered light) combined reaches human eyes and hence polarization is hardly felt.

On the other hand, it is known that it is possible to positively select polarized light to eliminate an unnecessary video, thereby making a necessary video stand out. For example, a shooting technique for eliminating a video image which is to appear, by reflection, on a surface of water or a surface of glass, using a polarizing filter (hereinafter referred to as the "PL filter") is commonly used. Further, polarization is applied to various purposes, such as a purpose of suppressing unnecessary reflected light to enhance contrast and a purpose of visualizing stress acting on an object using the intensity of polarization.

For example, as a technique for positively using polarized components, Japanese Laid-Open Patent Publication (Kokai) No. 2018-7024 has proposed a method of acquiring a plurality of videos by rotating a PL filter attached to a lens and setting exposure conditions based on the plurality of videos. Further, Japanese Laid-Open Patent Publication (Kokai) No. 2017-76683 has proposed a CMOS sensor provided with a polarizing filter for each pixel of an image capturing device and the image capturing apparatus equipped with this CMOS sensor. In the image capturing apparatus disclosed in Japanese Laid-Open Patent Publication (Kokai) No. 2017-76683, it is possible to calculate new information, such as a polarization degree and a polarization angle, based on luminance information (hereinafter referred to as the "polarization information") acquired through the polarizing filters for filtering out polarized components in different directions, and further generate luminance information at an arbitrary polarization angle.

Calculation for generating luminance information at an arbitrary polarization angle has a large processing load because calculation processing is executed on a pixel-by-pixel basis. Therefore, for example, in a case where processing for generating luminance information is executed for all frames when shooting a moving image, the frame rate of display of the video is reduced. On the other hand, there is a case where a user desires to display an object being shot on a display device with high accuracy by allowing reduction of the frame rate.

SUMMARY OF THE INVENTION

The present invention provides an image capturing apparatus that has an image capturing device including polarization elements and sets a proper frame rate according to a situation when acquiring a video using polarization information.

In a first aspect of the present invention, there is provided an image capturing apparatus including an image capturing unit including polarization pixels that detect polarization information of a plurality of different direction, and at least one processor or circuit configured to perform the operations of the following units: a calculation unit configured to determine polarization information of the polarization pixels by performing first polarization calculation or second polarization calculation which is smaller in calculation load than the first polarization calculation, on video signals output from the polarization pixels, an image generation unit configured to generate a polarization-processed image using polarization information determined by the calculation unit; and a control unit configured to switch between the first polarization calculation and the second polarization calculation, which are performed by the calculation unit, according to a predetermined timing, a mode, or a result of detecting a predetermined state.

In a second aspect of the present invention, there is provided an image capturing apparatus including an image capturing unit including polarization pixels that detect polarization information of a plurality of different directions, and at least one processor or circuit configured to perform the operations of the following units: a calculation unit configured to determine polarization information by performing a predetermined calculation on video signals output from the polarization pixels, a generation unit configured to generate a waveform monitor associated with the video signals, and a display control unit configured to display the waveform monitor that identifiably displays image information calculated from the polarization information on a display unit that displays a video acquired by the image capturing unit.

In a third aspect of the present invention, there is provided a method of controlling an image capturing apparatus comprising generating a polarization-processed image using polarization information obtained by performing first polarization calculation on video signals output from an image capturing unit including polarization pixels that detect polarization information of a plurality of different directions, generating a polarization-processed image using polarization information obtained by performing second polarization calculation, which is smaller in calculation load than the first polarization calculation, on the video signals, and generating a polarization-processed image by switching between the first polarization calculation and the second polarization calculation according to a predetermined timing, a mode, or a result of detecting a predetermined state.

According to the present invention, it is possible to provide an image capturing apparatus that sets a proper frame rate according to a situation when acquiring a video using polarization information.

Further features of the present invention will become apparent from the following description of exemplary embodiments (with reference to the attached drawings).

BRIEF DESCRIPTION OF THE DRAWINGS

FIG. 9 is a diagram showing correspondence between images processed by respective processing sections and frame numbers in a fourth embodiment.

FIG. 10 is a diagram showing correspondence between images processed by respective processing sections and frame numbers in a fifth embodiment.

FIG. 27 is a diagram useful in explaining a relationship between operation functions of the image capturing apparatus and power consumption.

DESCRIPTION OF THE EMBODIMENTS

The present invention will now be described in detail below with reference to the accompanying drawings showing embodiments thereof.

Figure 1:
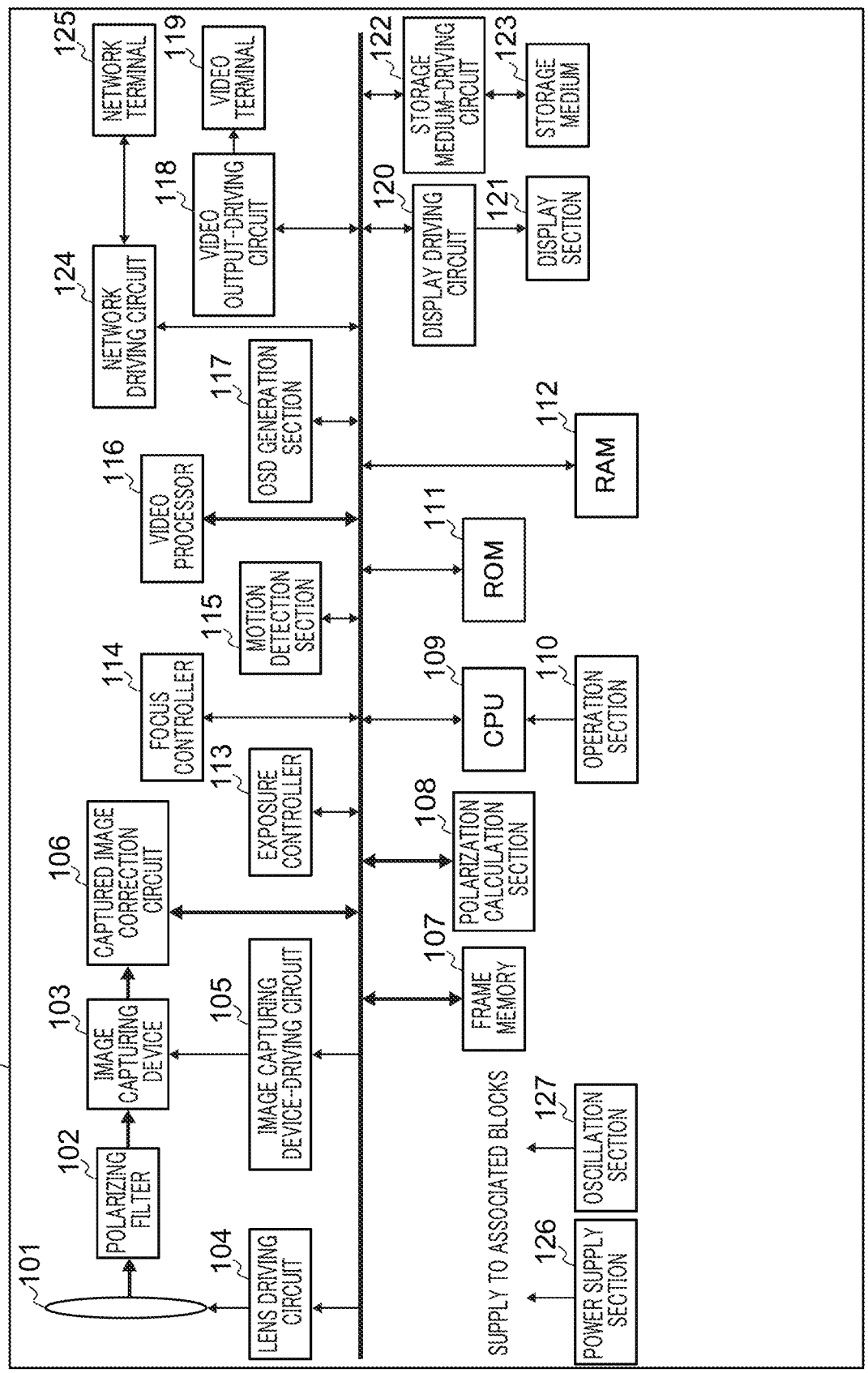
FIG. 1 is a schematic block diagram of an image capturing apparatus according to embodiments of the present invention.

FIG. 1 is a schematic block diagram of an image capturing apparatus 100 according to embodiments of the present invention. The image capturing apparatus 100 is configured to be capable of inputting, outputting, recording, and displaying a video.

The image capturing apparatus 100 includes an optical lens 101, polarizing filters 102, a lens driving circuit 104, an image capturing device 103, an image capturing device-driving circuit 105, a captured image correction circuit 106, and a frame memory 107. The image capturing apparatus 100 also includes a polarization calculation section 108, an exposure controller 113, a focus controller 114, a motion detection section 115, a video processor 116, an OSD generation section 117, a CPU 109, a ROM 111, a RAM 112, and an operation section 110. The image capturing apparatus 100 further includes a display section 121, a display driving circuit 120, a video terminal 119, a video output-driving circuit 118, a network terminal 125, a network driving circuit 124, a storage medium 123, a storage medium-driving circuit 122, a power supply section 126, and an oscillation section 127.

The optical lens 101 forms an image capturing optical system. The lens driving circuit 104 optically enlarges a video and adjusts a focal length and the like by moving the optical lens 101 in an optical axis direction. Incident light having passed through the optical lens 101 passes through the polarizing filters 102 and is received by the image capturing device 103. As described hereinafter with reference to FIG. 2, the polarizing filters 102 and the image capturing device 103 form an imaging surface polarization sensor 200.

The image capturing device 103 is e.g. a CCD sensor or a CMOS sensor, and converts an optical image formed on an imaging surface thereof to analog electrical signals. The image capturing device 103 also has a function of converting the generated analog electrical signals to digital signals. Although the image capturing device 103 is assumed to be a large-sized one that is capable of shooting a high-pixel video referred to as a 4K video or a 8K video, the image capturing device 103 is not limited to this.

The image capturing device-driving circuit 105 drives the image capturing device 103. The captured image correction circuit 106 performs various correction processing on a video converted to digital signals by the image capturing device 103. The captured image correction circuit 106 performs correction of variation in performance of each pixel, white balance correction, correction of distortion and insufficiency of the amount of light in a peripheral, for which the characteristics of the optical lens 101 are responsible, and so on.

The frame memory 107 is a storage device, generally referred to as the RAM, which can temporarily store video signals (video data) and from which the stored video data can be read out when required. The video signals have a large amount of data, and hence the frame memory 107 is required to be capable of writing and reading data at high speed and have a large capacity. For example, by using e.g. a DDR3-SDRAM for the frame memory 107, it possible to perform various processing operations, such as synthesis of images which are temporally different and cutting (trimming) of a necessary area.

The polarization calculation section 108 calculates polarization information. The polarization information refers to, as described hereinafter, luminance information acquired at a plurality of polarization angles, and luminance information at an arbitrary polarization angle which can be determined based on the acquired luminance information. The exposure controller 113 performs exposure control. The focus controller 114 controls a focus position of the image capturing optical system. The motion detection section 115 includes an angular velocity sensor (gyro sensor) and the like, and detects motion (shake) of the image capturing apparatus 100 based on an output from the angular velocity sensor. The video processor 116 performs image generation, processing of vide data, and so forth. Further, the video processor 116 detects a moving body in a video, and further detects motion of the moving body based a video (frames) output from the image capturing device 103. The OSD generation section 117 superimposes on-screen display (OSD), such as character information, on a video.

The CPU 109 performs centralized control of the functions of the image capturing apparatus 100. The ROM 111 is a nonvolatile storage device and stores programs for causing the CPU 109 to operate, various adjustment parameters, and so forth A program read out from the ROM 111s executed by being loaded into the RAM 112 which is a volatile storage element. In general, the RAM 112 may be a memory which operates at lower speed and has a smaller capacity than the frame memory 107.

The operation section 110 receives a user's operation, as an interface for an operation input from the outside. The operation section 110 is formed e.g. by mechanical buttons and switches, and includes a power switch, a mode changing switch, and so forth. When a user's operation is received, the operation section 110 transmits a command assigned to the received operation to the CPU 109. The display section 121 displays a video processed by the video processor 116, a setting menu formed by the OSD generation section 117, and the like. A user can check an operation status of the image capturing apparatus 100, etc., by visually recognizing the contents displayed on the display section 121. The display driving circuit 120 controls display on the display section 121. Note that a liquid crystal display, an organic EL display, or the like is used for the display section 121, but the display section 121 is not limited to these. Further, a touch panel is sometimes combined with the display section 121, and in this case, the touch panel functions as the operation section 110.

The video terminal 119 is an interface for transmitting video signals (video data) to an external apparatus and enables the external apparatus to display the video. Typical examples of the video terminal 119 include SDI, HDMI (registered trademark), Display Port, and like other terminals of various standards. The video output-driving circuit 118 controls the video terminal 119 according to a type of the video terminal 119. The network terminal 125 is an interface capable of transmitting not only video signals, but also various control signals. The network driving circuit 124 controls the network terminal 125, and, for example, enables connection to a network, such as the Internet.

The storage medium 123 is storage means having a large storage capacity, such as a HDD or a SSD, and stores video data and various settings data. The storage medium-driving circuit 122 controls writing/reading of various data into/from the storage medium 123. The power supply section 126 has a function of converting power supply, such as a commercial power supply, supplied from the outside, or a battery, to a desired voltage and distributing the voltage, and supplies power to blocks forming the image capturing apparatus 100. The oscillation section 127 has an oscillation device referred to as the crystal. The CPU 109 and the like generate a desired timing signal based on a single-periodic signal input from the oscillation element, and advance the program sequence.

Next, the polarizing filters 102 and the image capturing device 103 will be described. The polarizing filters 102 are arranged in front (on an object side) of the imaging surface of the image capturing device 103, and the image capturing device 103 configured as described above is referred to as the "imaging surface polarization sensor" in the following description.

Figure 2:
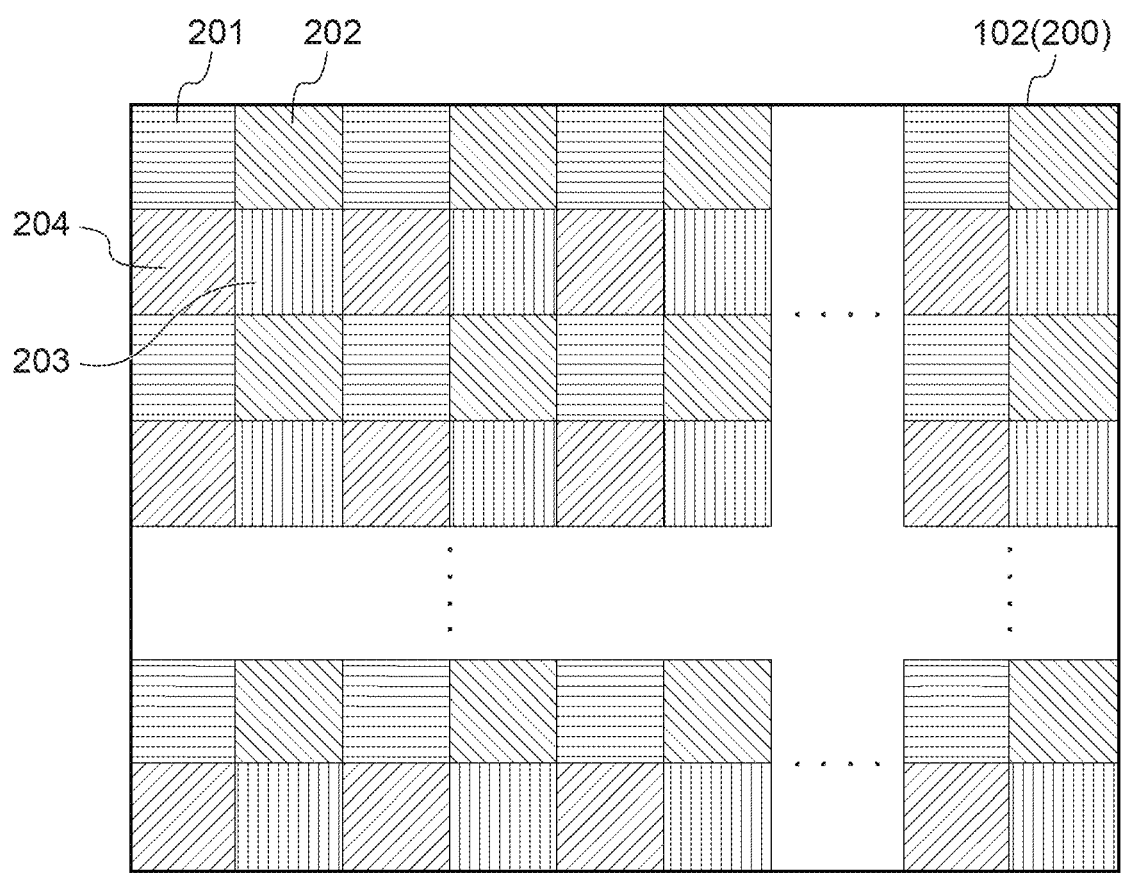
FIG. 2 is a diagram showing an example of arrangement of a polarizing filter.

FIG. 2 is a diagram showing an example of arrangement of the polarizing filters 102 on the imaging surface polarization sensor 200. The polarizing filters 102 include polarizing filters 201, 202, 203, and 204 arranged for respective pixels of the image capturing device 103. Thus, each pixel of the image capturing device 103 is caused to function as a polarization pixel by the polarizing filter 102 and the image capturing device 103.

Each four polarizing filters 201, 202, 203, and 204, as a set, are repeatedly two-dimensionally arranged in respective directions orthogonal to each other. The polarizing filters 201, 202, 203, and 204 are different in polarization direction, and can detect light in different polarization directions. More specifically, the polarization directions are each displaced by 45 degrees such that the polarizing filter 201 has a polarization direction of 0 degrees, the polarizing filter 202 has a polarization direction of 45 degrees, the polarizing filter 203 has a polarization direction of 90 degrees, and the polarizing filter 204 has a polarization direction of 135 degrees.

With this arrangement, it is possible to always acquire light in the plurality of different polarization directions in the same time zone as images of the same frame without requiring an operation for manually rotating the PL filter arranged in front of the lens. For example, one image is generated by selecting pixels having the same polarization direction and receiving the pixel signals from the selected pixels, whereby it is possible to acquire the image having polarization characteristics of the corresponding polarizing filters. In the case of the imaging surface polarization sensor 200 shown in FIG. 2, it is possible to acquire images having characteristics of the four different polarization directions.

Figure 3:
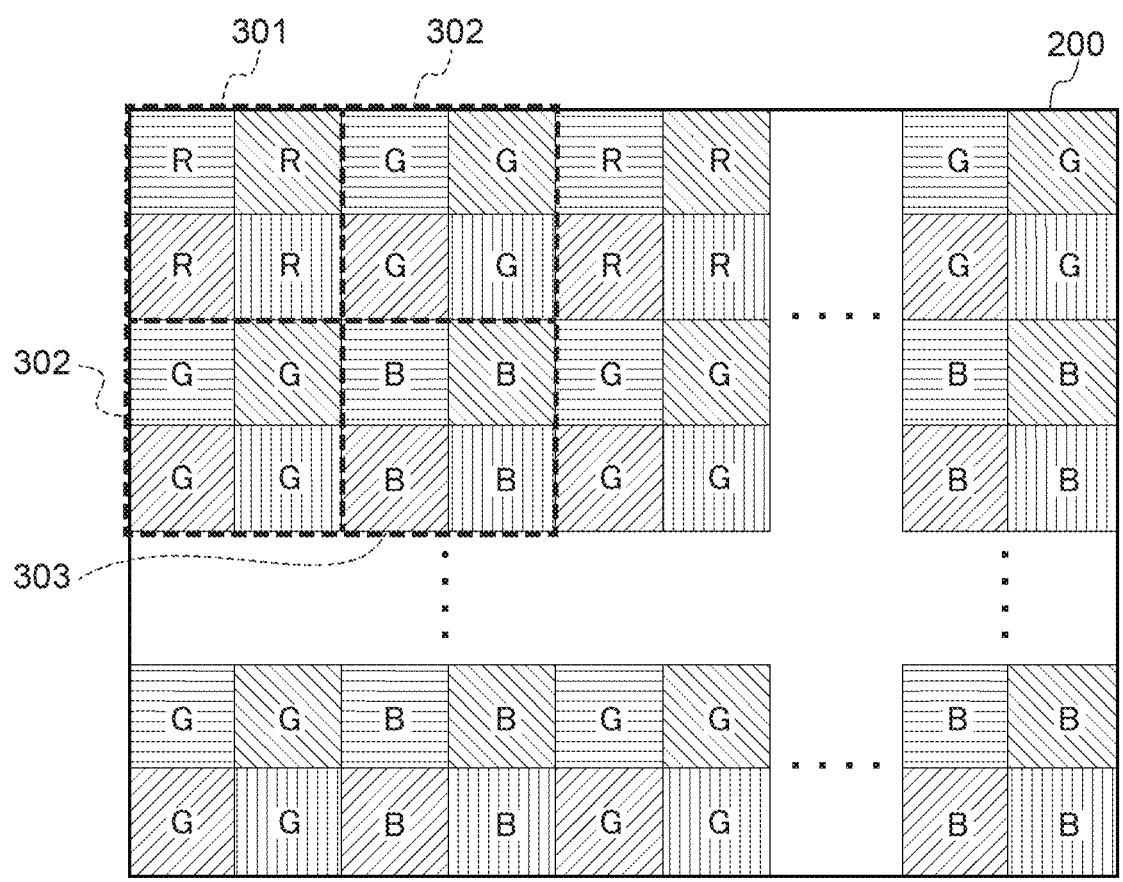
FIG. 3 is a diagram showing an example of arrangement of color filters on an image capturing device.

The color filters and the like are not taken into consideration in FIG. 2, and hence a monochrome video is obtained, but a color video can be acquired by arranging color filters on the image capturing device 103. FIG. 3 is a diagram useful in explaining an example of arrangement of color filters on the imaging surface polarization sensor 200. In the imaging surface polarization sensor 200, the color filters of one color are arranged in an area corresponding to one set of the polarizing filters 201 to 204, and red (R) filters 301, green (G) filters 302, and blue (B) filters 303 are arranged in the Bayer array.

Note that FIGS. 2 and 3 show the configuration of the imaging surface polarization sensor 200 by way of example, and this is not limitative, but the method of arranging the polarizing filters and the polarization angle can be set as desired. Further, the imaging surface polarization sensor 200 may be configured as a combination of areas where polarizing filters are arranged on pixels of the image capturing device 103 and areas where no polarizing filters are arranged on pixels of the image capturing device 103.

Next, a description will be given of a calculation method for generating luminance information at an arbitrary polarization angle from luminance information (polarization information) acquired at a plurality of polarization angles. This calculation is performed by the polarization calculation section 108 under the control of the CPU 109.

Figure 4A:
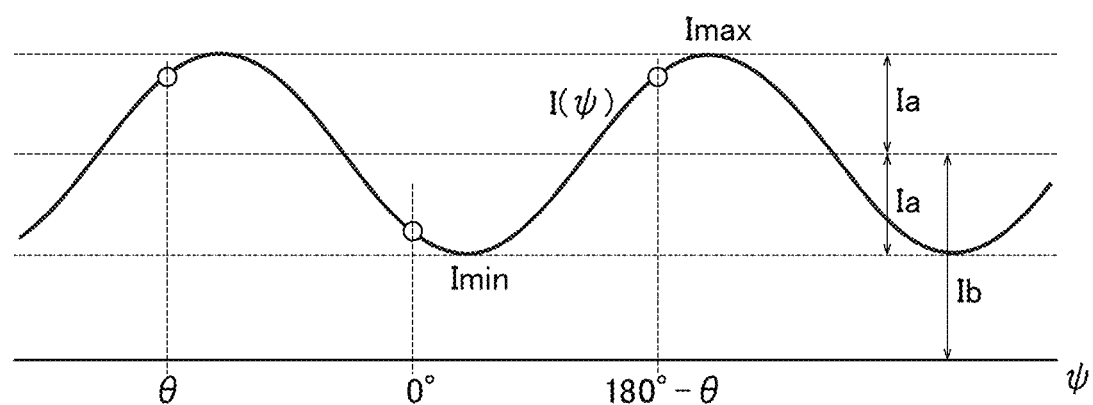
FIGS. 4A and 4B are diagrams useful in explaining a waveform and polarized components of light which reaches human eyes.

FIG. 4A is a diagram useful in explaining a waveform of light which reaches human eyes. Light which reaches human eyes is in a state in which polarized components and non-polarized components (scattered light) are mixed and is observed as a waveform having characteristics shown in FIG. 4A by way of example. In FIG. 4A, "Imax" is a luminance value of mixture of the polarized and non-polarized components (scattered light), "Imin" represents a luminance value of only the non-polarized components excluding the polarized component, and "Ib" represents an output level of the median of the polarized component. The value of "Ia" represents a value corresponding to half of a difference between the values Imax and Imin, i.e. an amplitude value of light. The luminance I of the waveform in FIG. 4A can be expressed by the following equations (1) as a general formula. However, a circularly polarized component is regarded as a non-polarized component.

Figure 4B:
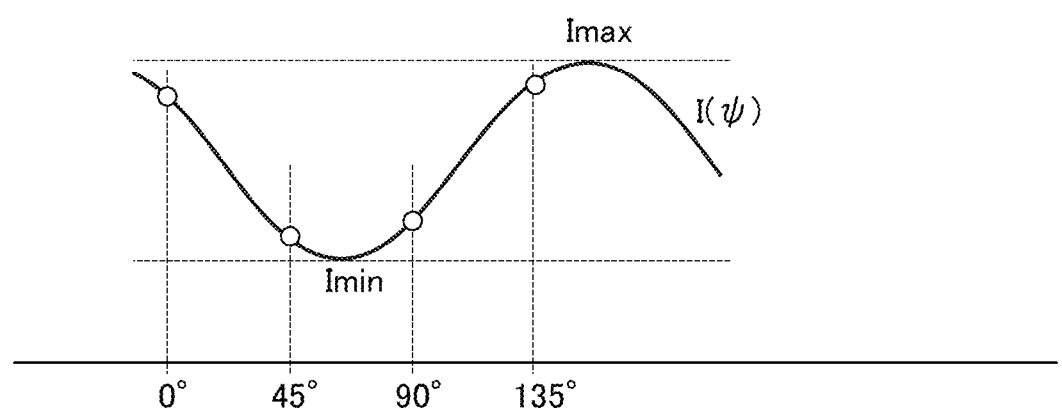

FIG. 4B is a diagram showing a waveform obtained from a luminance value actually measured at a predetermined polarization angle. That is, actual measurement values detected at 0°, 45°, 90°, and 135° are substituted into a polarization angle $\psi$ P in the following equation (1). As a result, the following equations (2) to (5) are obtained, and by using at least three equations out of these equations, the equation can be solved, so that the luminance I at an arbitrary polarization angle can be calculated.

Further, when the following equation (1) is solved for Ib and Ia, respectively, the following equations (6) and (7) are obtained. By calculating these values Ib and Ia, the values Imax and Imin can be calculated. Further, a ratio between the values Imax and Imin can also be determined by the following equation (8), as a polarization degree DoLP (Degree of Linear Polarization). Furthermore, by solving the equation using a coefficient $\theta$, a polarization angle AoLP (Angle of Linear Polarization) can be determined. Thus, it is possible to calculate a luminance at an arbitrary polarization angle from the following equation (1) and actual measurement values, and use a result of the calculation for image processing, such as reduction of reflection components and emphasis.

$$I(\psi) = Ib + Ia\,\cos(2\theta + 2\psi) \quad (1)$$

$$I(0) = Ib + Ia\,\cos(2\theta) \quad (2)$$

$$I(45) = Ib + Ia\,\cos(2\theta + 90) \quad (3)$$

$$I(90) = Ib + Ia\,\cos(2\theta + 180) \quad (4)$$

$$I(135) = Ib + Ia\,\cos(2\theta + 270) \quad (5)$$

$$Ib = \frac{I(0) + I(45) + I(90) + I(135)}{4} \quad (6)$$

$$Ia = \frac{\sqrt{[I(0) - I(90)]^2 + [I(135) - I(45)]^2}}{2} \quad (7)$$

$$DoLP = \frac{(I\max - I\min)}{(I\max + I\min)} \quad (8)$$

Figure 5:
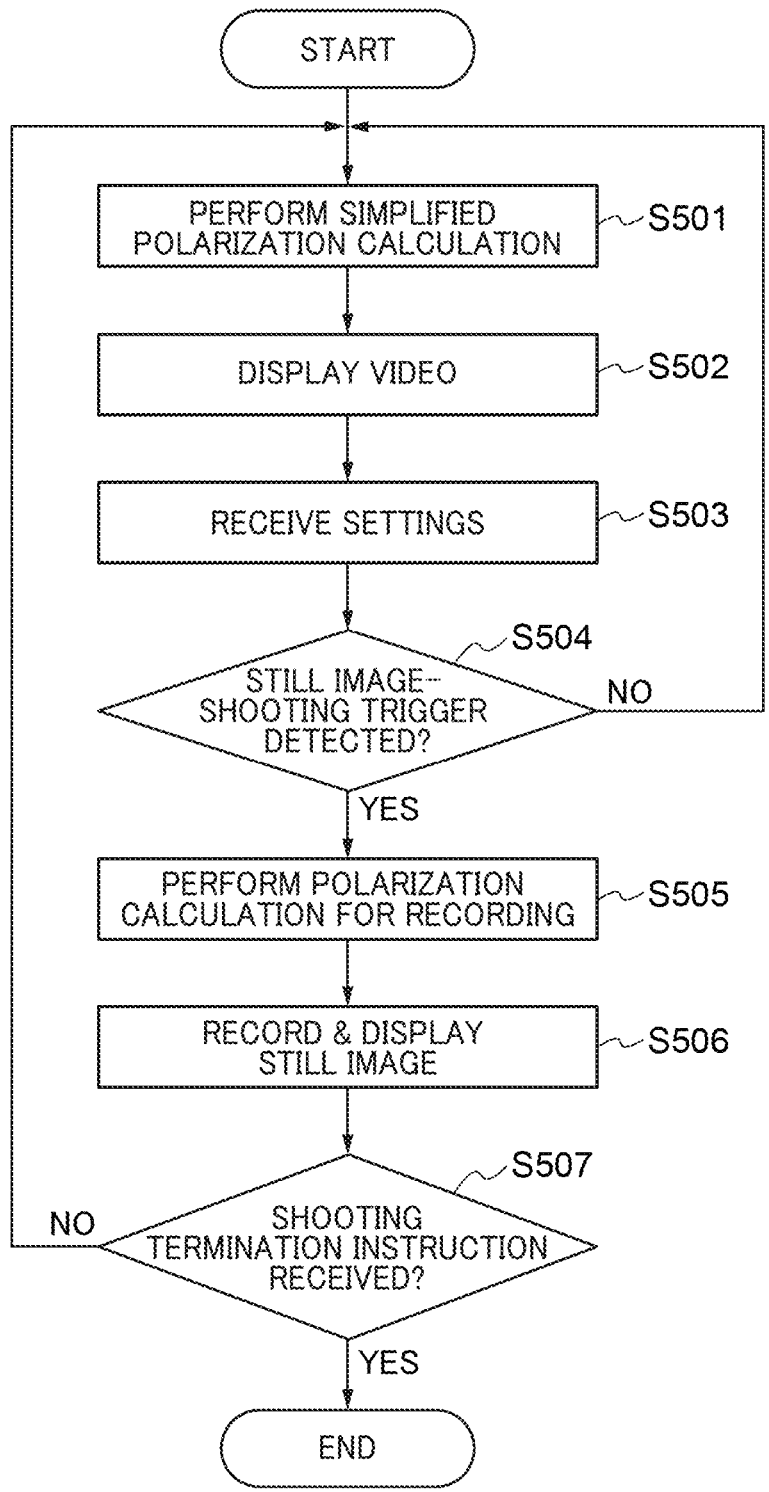
FIG. 5 is a flowchart of a still image-shooting process in a first embodiment.

In a first embodiment, a description will be given of an example of a still image shooting operation of the image capturing apparatus 100. FIG. 5 is a flowchart of a still image-shooting process performed by the image capturing apparatus 100. Processing operations (steps) indicated by S numbers in FIG. 5 are realized by the CPU 109 that loads a predetermined program stored in the ROM 111 into the RAM 112 and performs centralized control of the operations of the components of the image capturing apparatus 100.

When a user operates the operation section 110 to power on the image capturing apparatus 100, the CPU 109 performs shooting standby processing. As one of the shooting standby processing operations, in a step S501, the CPU 109 controls the polarization calculation section 108 to generate a video generated by simplified polarization calculation processing. Note that details of the simplified polarization calculation processing performed by the polarization calculation section 108 will be described hereinafter.

In a step S502, the CPU 109 displays the video generated in the step S501 in a state in which a video, a setting menu, and the like, processed by the OSD generation section 117, are superimposed thereon. In a step S503, the CPU 109 receives settings input by the user operating the operation section 110 and the like while viewing the display section 121 to set various settings of the image capturing apparatus 100. Thus, the image capturing apparatus 100 is shifted to a shooting standby state.

In a step S504, the CPU 109 determines whether or not a still image-shooting trigger has been detected. The still image-shooting trigger refers to a release start instruction assigned e.g. to pressing of a release button included in the operation section 110 or a touch operation performed on a touch panel overlaid on the display section 121. If it is determined that a still image-shooting trigger has been detected (YES to the step S504), the CPU 109 proceeds to a step S505, whereas if it is determined that a still image shooting trigger has not been detected (NO to the step S504), the CPU 109 returns to the step S501 and maintains the shooting standby state.

In the step S505, the CPU 109 controls the polarization calculation section 108 to generate a video subjected to polarization calculation processing for recording. In a step S506, the CPU 109 displays the video generated in the step S505 on the display section 121 and records the video data in the storage medium 123. In a step S507, the CPU 109 determines whether or not a shooting termination instruction (such as a power-off operation or shifting to a sleep state after the elapse of a predetermined time period) has been received. If a shooting termination instruction has not been received (NO to the step S507), the CPU 109 returns to the step S501 and shifts the image capturing apparatus 100 to the shooting standby state, whereas if a shooting termination instruction has been received (YES to the step S507), the CPU 109 terminates the present process.

Image generation by the polarization calculation processing for recording in the step S505 will be described. As described with reference to FIGS. 2 to 4, the value Imax as a luminance value of mixture of the polarized and non-polarized components and the value Imin as a luminance value of only the non-polarized components excluding the polarized component can be determined based on the luminance information acquired from the imaging surface polarization sensor 200. One type of the polarization calculation processing for recording is processing for generating a reflection-emphasized image by calculating the value Imax for each set of four pixels. Another type of polarization calculation processing for recording is processing for generating a reflection-reduced image by calculating the value Imin for each set of four pixels. Still another type of the polarization calculation processing for recording is processing for displaying a user interface via which the value of the polarization angle ψ can be changed, on the display section 121, and generating a reflection-controlled image in which the amount of reflected light is controlled based on a user's operation of changing the polarization angle ψ of I ('ψ') via the operation section 110.

However, the above-described types of the polarization calculation processing for recording are performed on a pixel-by-pixel basis, and hence the calculation load is large, so that if video signals formed by performing the calculation processing on all pixels are generated for all frames, the processing cannot be completed in time, which reduces the frame rate. As a result, the real-time property of the video displayed on the display section 121 is impaired. Therefore, the polarization calculation processing for recording is unsuitable for processing performed when generating a video viewed by a user while finely adjusting an angle of view and focus. In view of this, in the present embodiment, before the release operation for capturing a still image for recording, a video displayed on the display section 121 for a user to view the same is generated by the simplified polarization calculation processing (S501) at a high frame rate.

One type of the simplified polarization calculation processing is processing for generating a simplified reflection-emphasized image by setting the maximum value Imax' of the luminance information I (0), I (45), I (90), and I (135) acquired through the polarizing filters 201 to 204 of the four different directions as the luminance value of each pixel of the unit. Another type of the simplified polarization calculation processing is, inversely, processing for generating a simplified reflection-reduced image by setting the minimum value Imin' of the luminance information I (0), I (45), I (90), and I (135) as the luminance value of each pixel of the unit. Still another type of the simplified polarization calculation processing is processing for generating a simplified reflection-controlled image in which an amount of reflected light is simply controlled by determining a value Ic between the maximum value Imax' and the minimum value Imin' by the following equation (9) and causing a user to designate a value of "n" in the equation (9) via the operation section 110.

Thus, in the first embodiment, an image (video) to be displayed on the display section 121 is generated by using the simplified polarization calculation processing, whereby it is possible to suppress reduction of the frame rate, which is caused due to the polarization calculation processing, and provide a video to a user, which does not cause the user to have trouble in checking an object.

$$Ic = n \times I\max' + (1-n) \times I\min' \quad (9)$$

Figure 6:
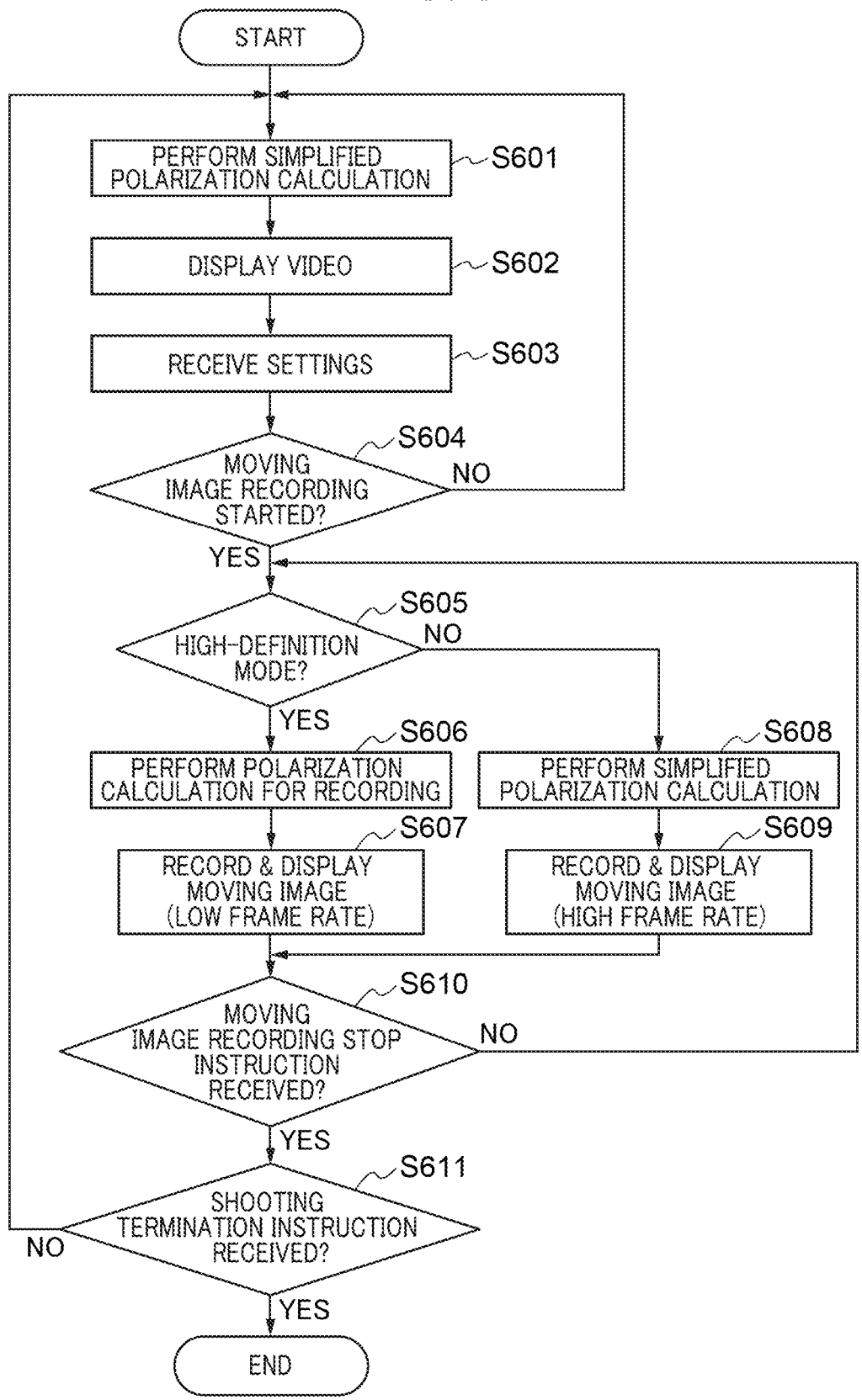
FIG. 6 is a flowchart of a moving image-shooting process in a second embodiment.

Next, a second embodiment of the present invention will be described. In the second embodiment, a description will be given of an example of a moving image shooting operation in the image capturing apparatus 100. FIG. 6 is a flowchart of a moving image-shooting process performed by the image capturing apparatus 100. Processing operations (steps) indicated by S numbers in FIG. 6 are realized by the CPU 109 that loads a predetermined program stored in the ROM 111 into the RAM 112 and performs centralized control of the operations of the components of the image capturing apparatus 100.

Steps S601 to S603 are the same as the steps S501 to S503 of the flowchart in FIG. 5, respectively, and hence description thereof is omitted. After the step S603 is finished and the image capturing apparatus 100 shifts to the shooting standby state, the CPU 109 determines in a step S604 whether or not a moving image recording start instruction has been received, based on a user's operation of the operation section 110. If it is determined that a moving image recording start instruction has not been received (NO to the step S604), the CPU 109 returns to the step S601, whereas if it is determined that a moving image recording start instruction has been received (YES to the step S604), the CPU 109 proceeds to a step S605.

In the step S605, the CPU 109 determines whether or not the shooting mode set in the step S603 is a high-definition mode. If it is determined that the shooting mode has been set to the high-definition mode (YES to the step S605), the CPU 109 proceeds to a step S606, whereas if it is determined that the shooting mode has not been set to the high-definition mode (NO to the step S605), the CPU 109 proceeds to a step S608. Note that details of the high-definition mode will be described hereinafter.

In the step S606, the CPU 109 performs the polarization calculation processing for recording. The step S606 is the same as the step S505 of the flowchart in FIG. 5, and hence detailed description thereof is omitted. In the next step S607, the CPU 109 displays the video generated by the polarization calculation processing for recording on the display section 121, stores the video data in the recording medium 123, and then proceeds to a step S610. On the other hand, in the step S608, the CPU 109 performs the simplified polarization calculation processing. The step S608 is the same as the step S501 of the flowchart in FG. 5, and hence detailed description thereof is omitted. In the next step S609, the CPU 109 displays the video generated by the simplified polarization calculation processing on the display section 121, stores the video data in the recording medium 123, and then proceeds to the step S610.

In the step S610, the CPU 109 determines whether or not a moving image recording stop instruction has been received, based on a user's operation of the operation section 110. If it is determined that a moving image recording stop instruction has been received (YES to the step S610), the CPU 109 proceeds to a step S611, whereas if it is determined that a moving image recording stop instruction has not been received (NO to the step S610), the CPU 109 returns to the step S605 and continues the moving image recording.

In the step S611, the CPU 109 determines whether or not a shooting termination instruction has been received. If it is determined that a shooting termination instruction has not been received (NO to the step S611), the CPU 109 returns to the step S601 and shifts the image capturing apparatus 100 to the shooting standby state, whereas if it is determined that a shooting termination instruction has been received (YES to the step S611), the CPU 109 terminates the present process.

Figures 7, 8:
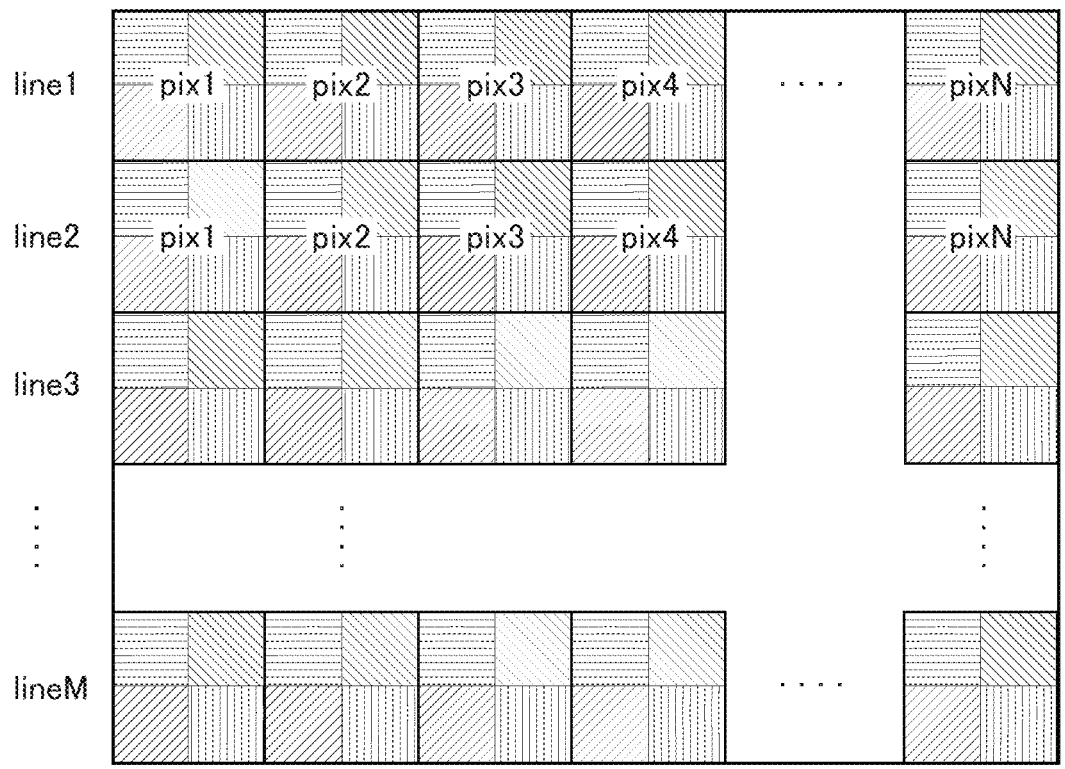
FIG. 7 is a diagram showing comparison between modes of moving image shooting in FIG. 6.
FIG. 8 is a diagram useful in explaining how pixel numbers and line numbers are assigned to pixels and lines of an imaging surface polarization sensor in a third embodiment.

Next, a specific example of the high-definition mode and a mode which is not the high-definition mode (hereinafter referred to as the "high-frame rate mode") will be described. FIG. 7 is a diagram showing the high-definition mode and the high-frame rate mode for comparison.

In the high-definition mode, the recording format is a non-compression format, the resolution is 4K, the signal format is RGB 444, and the bit depth is 12 bits. Therefore, in the high-definition mode, the frame rate is reduced because the amount of data per frame is large, but it is possible to generate a high-definition video, and record and display the generated video. On the other hand, in the high-frame rate mode, the recording format is a compression format based on a standard of MPEG2, H. 264, H. 265 or the like, the resolution is HD, the signal format is YCC422, and the bit depth is 10 bits. Therefore, in the high-frame rate mode, the amount of data per frame is small, but it is possible to record and display the generated video at a high frame rate.

As described above, in the second embodiment, it is possible to acquire a desired video by performing the polarization calculation processing for recording in the high-definition mode, and generate an image subjected to the polarization calculation processing while suppressing reduction of the frame rate by performing the simplified polarization calculation processing in the high-frame rate mode. Note that in the above description, the polarization calculation processing, the recording format, the resolution, the signal format, and the bit depth are switched according to whether or not the shooting mode is the high-definition mode. However, this is not limitative, but only the polarization calculation processing may be switched, or the recording format and the like may be individually switched.

Next, a third embodiment of the present invention will be described. In the first embodiment, as an example of the simplified polarization calculation processing, the description is given of the method of generating a video (frame (image)) by performing the polarization calculation processing using the values Imax' and Imin' instead of calculating the values Imax and Imin for each set of four pixels different in polarization direction. On the other hand, in the third embodiment, as another example of the simplified polarization calculation processing, a description will be given of a method of generating an image by performing the polarization calculation processing using not all of the pixels as sets each formed by four pixels different in polarization direction, but thinned sets of pixels.

FIG. 8 is a diagram useful in explaining how pixel numbers and line numbers are assigned to pixels and lines of the imaging surface polarization sensor 200. As shown in FIG. 8, pixel numbers are assigned to sets of pixels as pixel 1, pixel 2, pixel 3, pixel 4, . . . , and pixel N, in the horizontal direction, and line numbers are assigned to lines as line 1, line 2, line 3, . . . , and line M, in the vertical direction.

In the above-described polarization calculation processing for recording (steps S505 and S506), the values Imax and Imin, and so forth are calculated with respect to all of the lines and pixels. On the other hand, in the present embodiment, as the simplified polarization calculation processing performed by the polarization calculation section 108, for example, the polarization calculation processing is performed only with respect to odd-numbered pixels in each line, such as pixel 1 and pixel 3, and the obtained result is applied to even-numbered pixels, such as pixel 2 and pixel 4, respectively. With this, it is possible to reduce the amount of calculation required when generating an image subjected to the polarization calculation processing (hereinafter referred to as the "polarization-processed image"). The calculation load reduction method is not limited to this, but it is possible to further reduce the amount of calculation required when generating a polarization-processed image by performing the polarization calculation processing only with respect to pixels in the odd-numbered lines, such as line 1 and line 3, and applying the obtained result to the even-numbered lines, such as line 2 and line 4, respectively.

Thus, in the third embodiment, the whole calculation amount is reduced (the calculation load is reduced) by performing the polarization calculation processing by thinning sets of pixels, whereby it is possible to generate a polarization-processed image while suppressing reduction of the frame rate.

Note that although the above description is given of the example in which values obtained from the odd-numbered pixels are applied to the even-numbered pixels, respectively, or values obtained from the odd-numbered lines are applied to the even-numbered lines, respectively, the calculation load reduction method is not limited to these. For example, values generated by interpolation processing, such as processing for applying an average value of values obtained from pixel 1 and pixel 3 to pixel 2, may be applied to thinned-out pixels, and the same interpolation processing can be used for lines.

Next, a fourth embodiment of the present invention will be described. In the fourth embodiment, as a still another example of the simplified polarization calculation processing, a description will be given of a method of generating a polarization-processed image by performing the polarization calculation processing using thinned frames.

FIG. 9 is a diagram showing correspondence between images generated by the processing sections of the image capturing apparatus 100 and frame numbers. An input image is an image subjected to correction processing by the captured image correction circuit 106. An assist image is an image obtained by processing the input image by the video processor 116, and is e.g. an image for displaying a function of assisting shooting to be performed by a user, such as a waveform monitor and peaking, on the display section 121. Generation of the assist image is performed for each frame, and assist images generated with respect to input images A1, A2, A3, and A4 are B1, B2, B3, and B4, respectively.

Since the calculation load for generating a polarization-processed image is large, there is a case where it is not easy to update the polarization-processed image for each frame in synchronism with the assist image. To cope with this, in the fourth embodiment, the polarization calculation processing is performed only with respect to the odd-numbered frames, such as input images A1, A3, A5, . . . , whereby polarization-processed images C1, C3, C5, . . . , are generated. Then, the assist image is updated once for each frame, and the polarization-processed image is updated once for every two frames. These images are combined and displayed on the display section 121. This makes it possible to display the polarization-processed image, while suppressing reduction of the frame rate of information displayed for a user to perform smooth shooting.

Next, a fifth embodiment of the present invention will be described. In the fifth embodiment, a description will be given of a configuration for directly outputting an input image to the video terminal 119, and displaying an image on the display section 121, which is obtained by further performing thinning and the polarization calculation processing with respect to a video lower in frame rate than a video output from the video terminal 119.

FIG. 10 is a diagram showing correspondence between images generated by the processing sections of the image capturing apparatus 100 and frame numbers. An input image is an image subjected to correction processing by the captured image correction circuit 106. An output image is an image output from the video terminal 119 and output at the same frame rate as the input image. An input image for display is an image output to the display section 121, and is an original image based on which a polarization-processed image is generated. The input image for display is generated by thinning pixels from the input image and is lower in frame rate.

The assist image is an image generated by processing the input image for display by the video processor 116. A polarization-processed image for display is an image generated by further performing thinning and the polarization calculation processing with respect to the input image for display, and is updated for every four frames and displayed on the display section 121 in a state combined with the assist image. This makes it possible to display the polarization-processed image, while suppressing reduction of the frame rate of information displayed for a user to perform smooth shooting.

Next, a sixth embodiment of the present invention will be described. In the sixth embodiment, a polarization-processed image is simply displayed on the display section 121 by selecting lines to be subjected to the polarization calculation processing on a frame-by-frame basis. The polarization calculation section 108 performs the polarization calculation processing only with respect to the odd-numbered lines in FIG. 8 for odd-numbered frames and performs the polarization calculation processing only with respect to the even-numbered lines in FIG. 8 for even-numbered frames.

On the display section 121, for each odd-numbered frame, a polarization-processed image is displayed using the values of the odd-numbered lines, calculated by the polarization calculation section 108, and using the values of the even-numbered lines, calculated by the polarization calculation section 108 for the immediately preceding frame. Similarly, on the display section 121, for each even-numbered frame, a polarization-processed image is displayed using the values of the even-numbered lines, calculated by the polarization calculation section 108, and using the values of the odd-numbered lines, calculated by the polarization calculation section 108 for the immediately preceding frame.

By selecting lines to be subjected to the polarization calculation processing for each frame as described above, it is possible to display a video subjected to the polarization calculation processing while reducing the total calculation amount. Note that the method of supplementally adding data is not limited to the method of supplementally adding data of the immediately preceding frame to data of a frame to be displayed, as described above, but for example, values of each line may be obtained by interpolation calculation, as performed in a deinterlacing method.

Next, a seventh embodiment of the present invention will be described. In the seventh embodiment, a description will be given of a configuration for suppressing reduction of the frame rate of a video displayed on the display section 121 by performing the polarization calculation processing only with respect to a limited specific area.

In a first method of the seventh embodiment, first, the polarization calculation section 108 calculates a difference between the maximum value Imax' and the minimum value Imin' in the luminance information acquired through the polarizing filters 201 to 204 of the four different directions. Then, only pixels larger in the calculated difference than a predetermined threshold value are set as target pixels to be subjected to the polarization calculation processing, and a polarization-processed image is generated by using a value obtained by averaging I (0), I (45), I (90), and I (135) for pixels other than the target pixels.

In a second method of the seventh embodiment, an upper limit of the number of pixels to be subjected to the polarization calculation processing within a time period for one frame is determined in advance. Then, the polarization calculation processing is performed with respect to the target pixels to be subjected to the polarization calculation processing sequentially from an upper left pixel of one frame. In a case where the number of pixels subjected to the polarization calculation processing exceeds the upper limit number of pixels to be subjected to the polarization calculation processing within the time period for one frame, a polarization-processed image is generated by using values of the immediately preceding frame for the remainder of the target pixels. Then, the polarization calculation processing to be performed for the remaining area on which the polarization calculation processing has not been performed is carried over to the next frame, and in the next frame, the polarization calculation processing is performed starting from the remaining area for which the polarization calculation processing has been carried over to generate a polarization-processed image.

As described above, by performing the polarization calculation processing only with respect to the limited specific area, it is possible to generate a polarization-processed image while suppressing reduction of the frame rate. Note that the method of generating a polarization-processed image while suppressing reduction of the frame rate is not limited to the above-described first and second methods, but the polarization calculation processing may be performed only with respect to pixels in a face detected area or a pupil detected area, detected by detection means, not shown, an object recognized area, an in-focus area, or an area designated by a user.

Next, an eighth embodiment of the present invention will be described. In the eighth embodiment, a description will be given of a first configuration for switching between the polarization calculation processing for recording and the simplified polarization calculation processing. In the first configuration, the polarization calculation processing is switched according to a focusing operation performed during image capturing.

Figure 11:
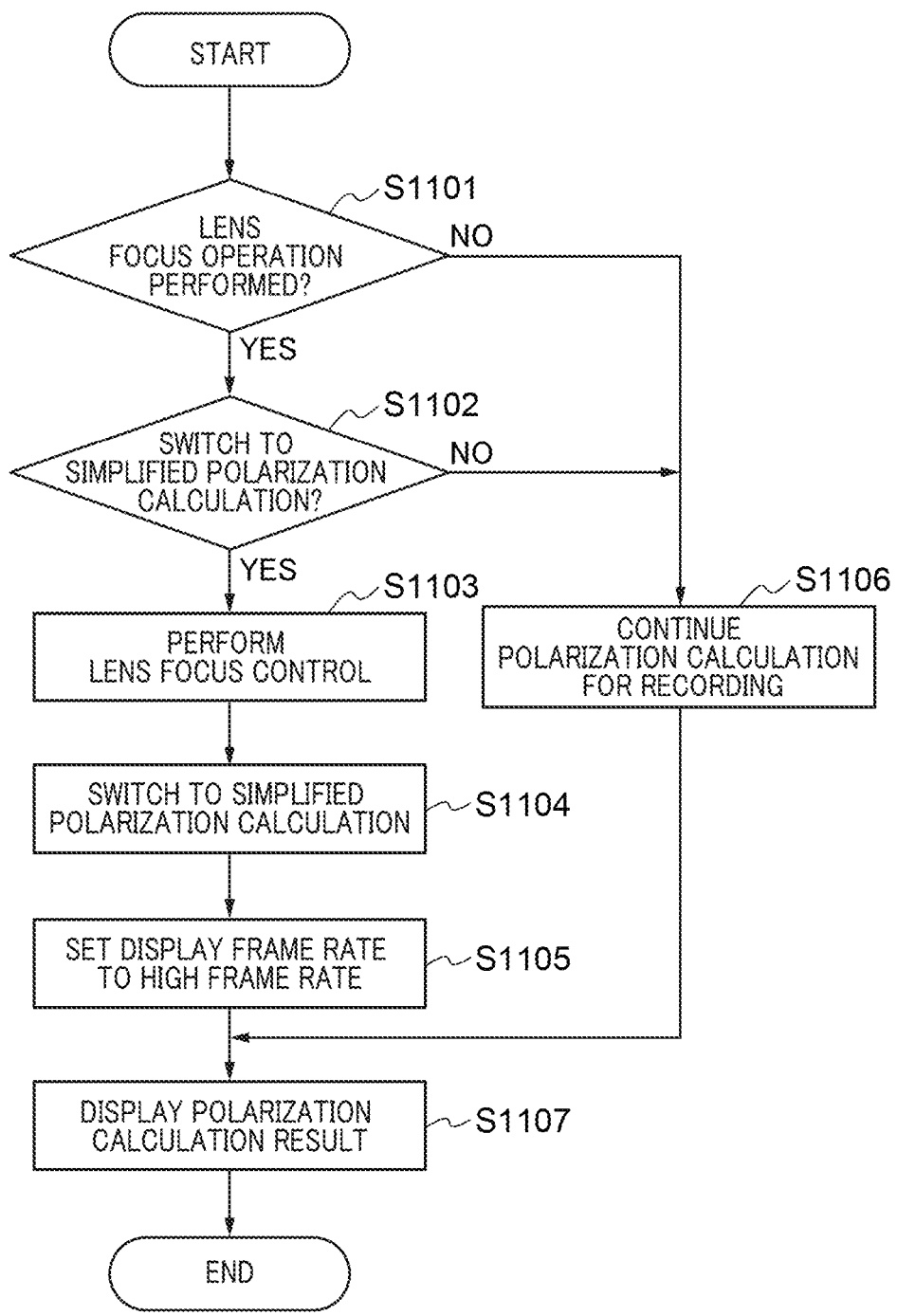
FIG. 11 is a flowchart of a first switching control process for switching the polarization calculation processing in an eighth embodiment.

FIG. 11 is a flowchart of a first switching control process for switching the polarization calculation processing, i.e. a switching control process for switching the polarization calculation processing from the polarization calculation processing for recording to the simplified polarization calculation processing, in the eighth embodiment. Processing operations (steps) indicated by S numbers in FIG. 11 are realized by the CPU 109 that loads a predetermined program stored in the ROM 111 into the RAM 112 and performs centralized control of the operations of the components of the image capturing apparatus 100.

It is assumed that the polarization calculation processing for recording is being performed by the image capturing apparatus 100 when the process is started. In a step S1101, the CPU 109 determines whether or not a focusing operation of the optical lens 101 has been performed via the operation section 110. If it is determined that the focusing operation has been performed (YES to the step S1101), the CPU 109 proceeds to a step S1102.

In the step S1102, the CPU 109 determines whether or not to switch the polarization calculation processing from the polarization calculation processing for recording to the simplified polarization calculation processing. For example, the CPU 109 detects the operation speed of the focusing operation, and switches the polarization calculation processing to the simplified polarization calculation processing if the detected operation speed is higher than a predetermined threshold value. As the predetermined threshold value used in this step, an update period of the display frame rate can be used. The calculation processing method is switched in a case where the operation speed is higher than the update period of the display frame rate because the display cannot follow up the operation, whereas it is not switched in a case where the operation speed is lower than the update period of the display frame rate.

This is not limitative, but in a case where the focus level in a designated area is lower than a predetermined threshold value to make the image blurred, the polarization calculation processing may be switched to the simplified polarization calculation processing to enable the user to check an object for focus control by increasing the display frame rate. Further, the polarization calculation processing may be controlled not to be switched in a case where not manual focusing, but auto focusing is performed. Furthermore, the polarization calculation processing may be controlled not to be switched in a case where the assist function for obtaining correct focus, such as peaking or a focus indicator, is used. In a case where a video at a high frame rate is set to be output not only to the display section 121, but also to the video terminal 119 and the network terminal 125, the calculation processing may also be controlled not to be switched. Note that the step S1102 may be omitted.

If it is determined in the step S1102 that the polarization calculation processing is to be switched to the simplified polarization calculation processing (YES to the step 1102), the CPU 109 proceeds to a step S1103. In the step S1103, the CPU 109 performs focus control of the optical lens 101. The focus control of the optical lens 101 is performed such that the CPU 109 judges information of operation performed on the operation section 110 and transmits the result of judgment to the focus controller 114, and the lens driving circuit 104 drives the focus lens according to a command received from the focus controller 114.

In a step S1104, the CPU 109 switches the polarization calculation processing from the polarization calculation processing for recording to the simplified polarization calculation processing. Then, in a step S1105, the CPU 109 sets the display frame rate to the high frame rate and then proceeds to a step S1007.

If it is determined in the S1101 that no focusing operation has been performed (NO to the step S1101) or if it is determined in the step S1102 that the polarization calculation processing is not to be switched to the simplified polarization calculation processing (NO to the step 1102), the CPU 109 proceeds to a step S1106. In the step S1106, the CPU 109 continues to perform the polarization calculation processing for recording and then proceeds to the step S1107.

In the step S1107, the CPU 109 displays a result of the polarization calculation processing on the display section 121 (i.e. displays the live view on the display section 121 at the set display frame rate), followed by terminating the present process. Note that in the determination in the step S1101, whether or not a diaphragm operation of the image capturing optical system has been performed or whether or not a zoom operation of the optical lens 101 has been performed may be determined in place of determination of whether or not the focusing operation has been performed.

Figure 12:
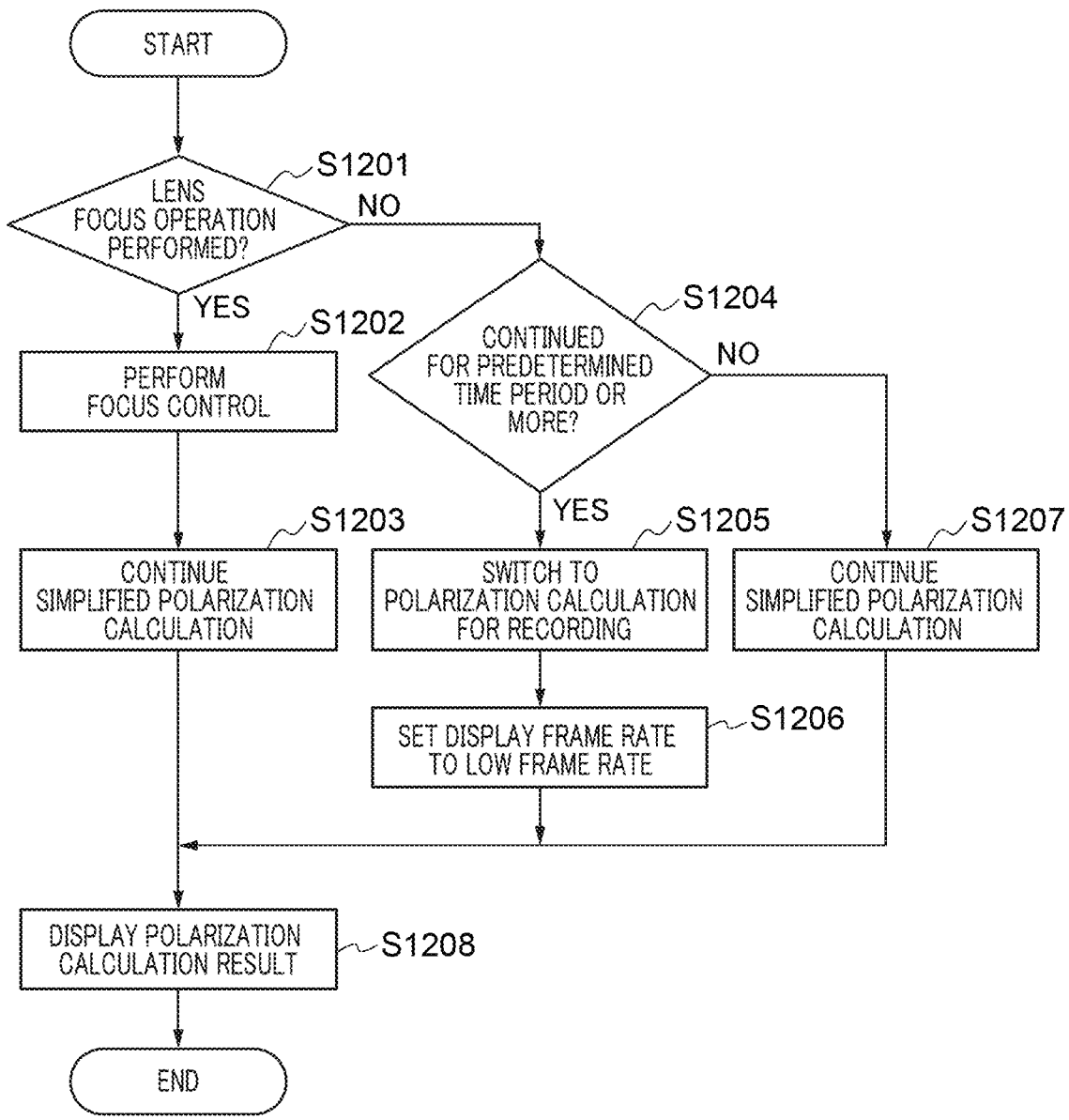
FIG. 12 is a flowchart of a second switching control process for switching the polarization calculation processing in the eighth embodiment.

FIG. 12 is a flowchart of a second switching control process for switching the polarization calculation processing, i.e. a switching control process for switching the polarization calculation processing from the simplified polarization calculation processing to the polarization calculation processing for recording, in the eighth embodiment. Processing operations (steps) indicated by S numbers in FIG. 12 are realized by the CPU 109 that loads a predetermined program stored in the ROM 111 into the RAM 112 and performs centralized control of the operations of the components of the image capturing apparatus 100.

It is assumed that the simplified polarization calculation processing is being performed by the image capturing apparatus 100 when the process is started. In a step S1201, the CPU 109 determines whether or not the focusing operation of the optical lens 101 has been performed via the operation section 110. If it is determined that the focusing operation has been performed (YES to the step S1201), the CPU 109 proceeds to a step S1202. In the step S1202, the CPU 109 performs focus control of the optical lens 101. In a step S1203, the CPU 109 continues the simplified polarization calculation processing and then proceeds to a step S1208.

On the other hand, if it is determined in the step S1201 that the focusing operation has not been performed, the CPU 109 proceeds to a step S1204. In the step S1204, the CPU 109 determines whether or not a state in which the focus operation is not performed has continued for a predetermined time period or more. If it is determined that the state has continued for the predetermined time period or more (YES to the step S1204), the CPU 109 proceeds to a step S1205. In the step S1205, the CPU 109 switches the polarization calculation processing from the simplified polarization calculation processing to the polarization calculation processing for recording. In the next step S1206, the CPU 109 sets the display frame rate to a low frame rate and then proceeds to the step S1208.

If it is determined in the step S1204 that the state has not continued for the predetermined time period or more (NO to the step S1204), the CPU 109 proceeds to a step S1207. In the step S1207, the CPU 109 continues the simplified polarization calculation processing and then proceeds to the step S1208.

In the step S1208, the CPU 109 displays a result of the polarization calculation processing on the display section 121, followed by terminating the present process. Note that in the determination in the step S1201, whether or not a diaphragm operation of the image capturing optical system has been performed or whether or not a zoom operation of the optical lens 101 has been performed may be determined in place of determination of whether or not the focusing operation has been performed.

As described above, in the case where the focusing operation of the optical lens 101 has been performed, the polarization calculation processing is switched from the polarization calculation processing for recording to the simplified polarization calculation processing, whereby it is possible to increase the frame rate and thereby improve the real-time property of the display. Further, in the case where the focusing operation of the optical lens 101 has not been performed for the predetermined time period or more after switching the calculation processing to the simplified polarization calculation processing, the polarization calculation processing is returned to the polarization calculation processing for recording, whereby it is possible to display the image subjected to the polarization calculation processing with high accuracy, again.

Next, a ninth embodiment of the present invention will be described. In the ninth embodiment, a description will be given of a second configuration for switching between the polarization calculation processing for recording and the simplified polarization calculation processing. In the second configuration, the polarization calculation processing is switched according to whether or not a moving body is detected from a video being captured.

Figure 13:
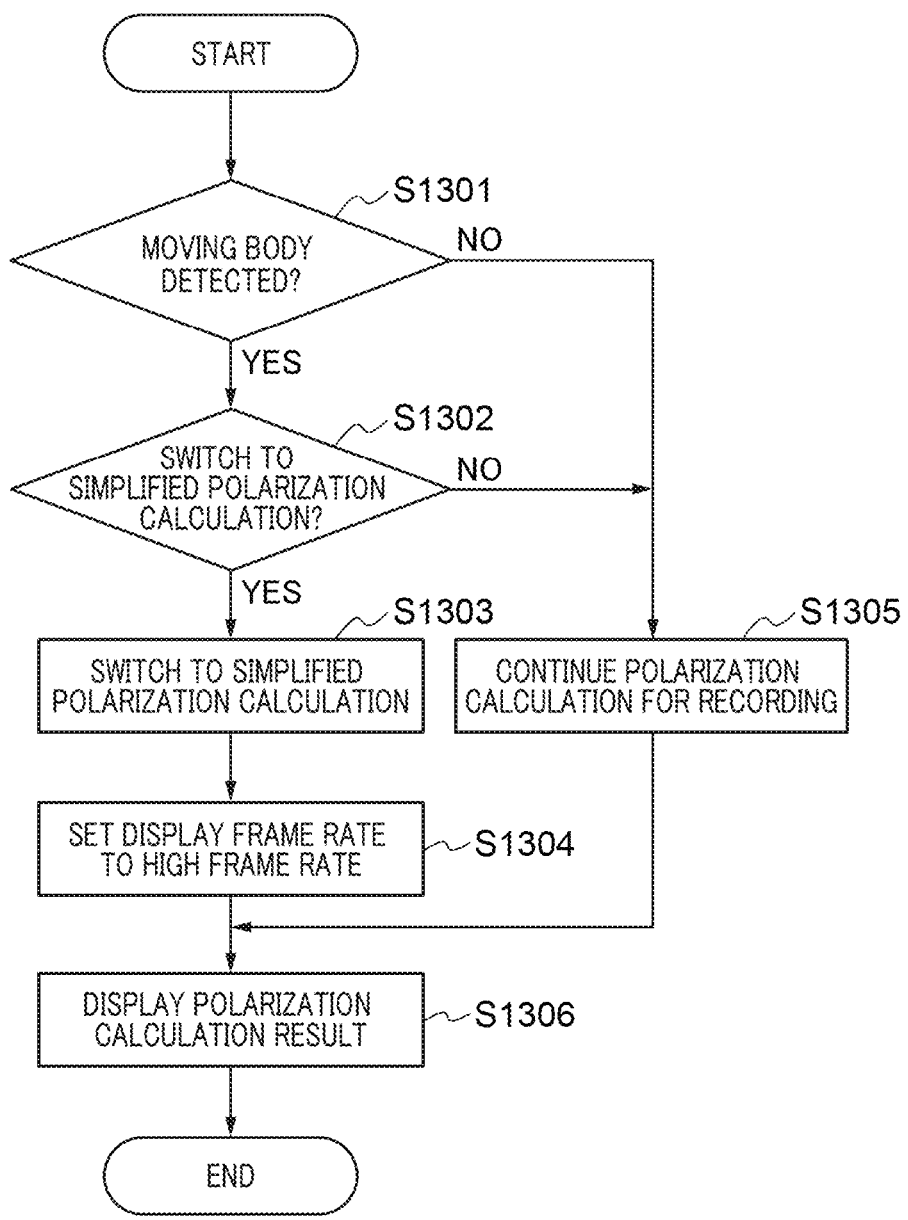
FIG. 13 is a flowchart of a first switching control process for switching the polarization calculation processing in a ninth embodiment.

FIG. 13 is a flowchart of a first switching control process for switching the polarization calculation processing, i.e. a switching control process for switching the polarization calculation processing from the polarization calculation processing for recording to the simplified polarization calculation processing, in the ninth embodiment. Processing operations (steps) indicated by S numbers in FIG. 13 are realized by the CPU 109 that loads a predetermined program stored in the ROM 111 into the RAM 112 and performs centralized control of the operations of the components of the image capturing apparatus 100.

It is assumed that the polarization calculation processing for recording is being performed by the image capturing apparatus 100 when the process is started. In a step S1301, the CPU 109 determines whether or not a moving body has been detected from a moving image being captured by the video processor 116. The moving image in this step is a moving image of a high frame rate, on which the polarization calculation processing has not been performed. A moving body can be detected e.g. by using a pixel value difference-based detection method. In the pixel value difference-based detection method, differences in luminance value of each pixel between a target frame and frames immediately before and after the target frame are calculated, and pixels each having a calculated luminance difference not smaller than a predetermined value are detected. In a case where the number of detected pixels becomes larger than a predetermined threshold value, it is determined that there is a moving body. Note that the moving body detection method is not limited to the pixel value difference-based detection method using frames before and after a target frame, but a method of detecting a moving body by determining correlation between pixels or reasoning using machine learning may be employed.

If it is determined that a moving body has been detected (YES to the step S1301), the CPU 109 proceeds to a step S1302, whereas if it is determined that a moving body has not been detected (NO to the step S1301), the CPU 109 proceeds to a step S1305.

In the step S1302, for example, the CPU 109 calculates an amount of motion of the moving body, and if it is determined that the calculated motion amount is not smaller than a predetermined value, the CPU 109 judges that the moving body is going to immediately frame out (disappear from the frame) and does not switch the calculation processing. Further, if it is determined that the detected moving body exists in the frame for a certain time period or more, the CPU 109 switches the polarization calculation processing to the simplified polarization calculation processing. The CPU 109 determines what the moving body is, and if it is determined that the moving body is an object (such as a vehicle) designated in advance, acquisition of a polarization calculation result with high accuracy is required, and hence the CPU 109 does not switch the calculation processing. Further, the CPU 109 does not switch the calculation processing also in a case where a video at a high frame rate is set to be output not only to the display section 121, but also to the video terminal 119 and the network terminal 125. Note that the step S1302 may be omitted.

If it is determined that the calculation processing is to be switched to the simplified polarization calculation processing (YES to the step 1302), the CPU 109 proceeds to a step S1303, whereas if it is determined that the calculation processing is not to be switched to the simplified polarization calculation processing (NO to the step 1302), the CPU 109 proceeds to the step S1305. The step S1303, a step S1304, the step S1305, and a step S1306 are the same as the steps S1104 to S1107 of the flowchart in FIG. 11, respectively, and hence description thereof is omitted.

Figure 14:
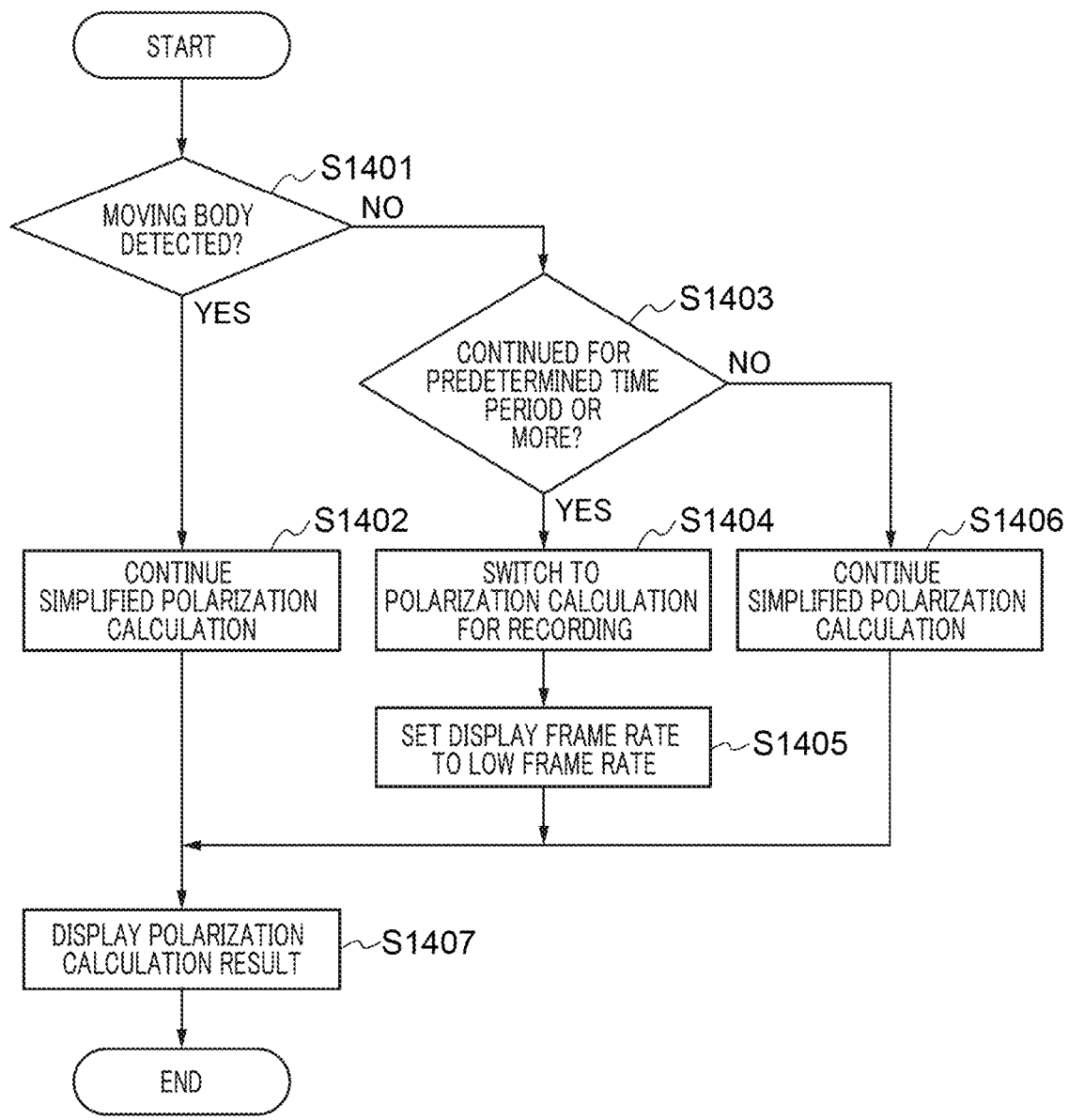
FIG. 14 is a flowchart of a second switching control process for switching the polarization calculation processing in the ninth embodiment.

FIG. 14 is a flowchart of a second switching control process for switching the polarization calculation processing, i.e. a switching control process for switching the polarization calculation processing from the simplified polarization calculation processing to the polarization calculation processing for recording, in the ninth embodiment. Processing operations (steps) indicated by S numbers in FIG. 14 are realized by the CPU 109 that loads a predetermined program stored in the ROM 111 into the RAM 112 and performs centralized control of the operations of the components of the image capturing apparatus 100.

It is assumed that the simplified polarization calculation processing is being performed by the image capturing apparatus 100 when the process is started. In a step S1401, the CPU 109 determines whether or not a moving body has been detected from a moving image being captured by the video processor 116. If it is determined that a moving body has been detected (YES to the step S1401), the CPU 109 proceeds to a step S1402, whereas if it is determined that a moving body has not been detected (NO to the step S1401), the CPU 109 proceeds to a step S1403.

In the step S1402, the CPU 109 continues the simplified polarization calculation processing and then proceeds to a step S1407. In the step S1403, the CPU 109 determines whether or not a state in which a moving body is not detected has continued for a predetermined time period or more. If it is determined that the state has continued for the predetermined time period or more (YES to the step S1403), the CPU 109 proceeds to a step S1404, whereas if it is determined that the state has not continued for the predetermined time period or more (NO to the step S1403), the CPU 109 proceeds to a step S1406. The step S1404, a step S1405, the step 1406, and the step S1407 are the same as the steps S1205 to S1208 of the flowchart in FIG. 12, respectively, and hence description thereof is omitted.

As described above, in the case where a moving body is detected, the polarization calculation processing is switched from the polarization calculation processing for recording to the simplified polarization calculation processing, whereby it is possible to increase the frame rate and thereby improve the real-time property of the display. Further, in the case where a moving body is not detected after switching the calculation processing to the simplified polarization calculation processing, the calculation processing is returned to the polarization calculation processing for recording, whereby it is possible to display the image subjected to the polarization calculation processing with high accuracy, again.

Next, a tenth embodiment of the present invention will be described. In the tenth embodiment, a description will be given of a third configuration for switching between the polarization calculation processing for recording and the simplified polarization calculation processing. In the third configuration, the polarization calculation processing is switched according to motion of the image capturing apparatus 100.

Figure 15:
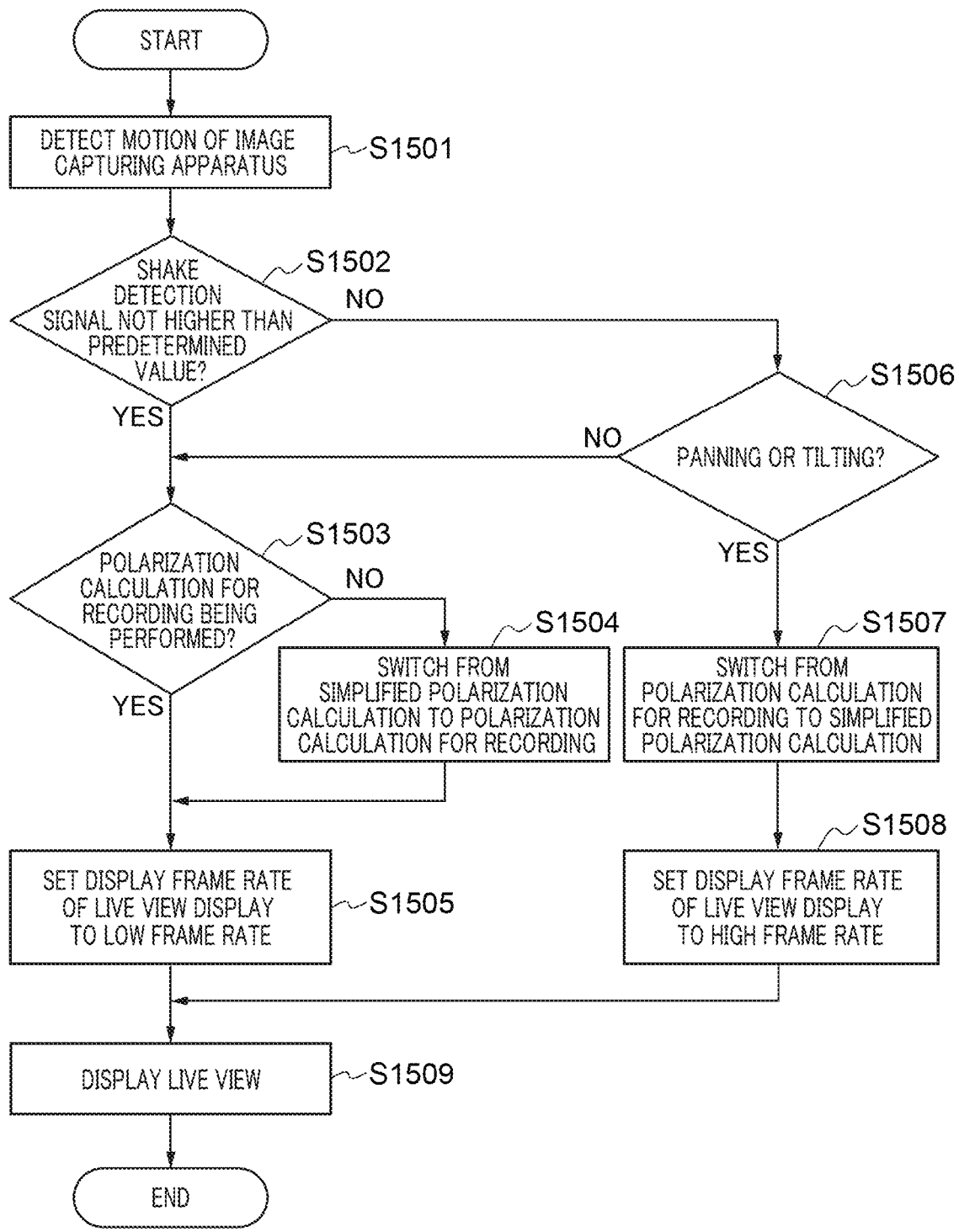
FIG. 15 is a flowchart of a switching control process for switching the polarization calculation processing in a tenth embodiment.

FIG. 15 is a flowchart of a switching control process for switching between the polarization calculation processing for recording and the simplified polarization calculation processing in the tenth embodiment. Processing operations (steps) indicated by S numbers in FIG. 15 are realized by the CPU 109 that loads a predetermined program stored in the ROM 111 into the RAM 112 and performs centralized control of the operations of the components of the image capturing apparatus 100.

In a step S1501, the CPU 109 detects motion (shake) of the image capturing apparatus 100. More specifically, a hand shake of a photographer, an intentional change of framing, or the like is detected by the motion detection section 115 implemented e.g. by an angular velocity sensor. Note that an output from the motion detection section 115 is converted from analog to digital and integrated by the CPU 109, whereby the angular velocity is converted to an angular displacement signal for use as a shake detection signal. Although motion detection is continued until motion of the image capturing apparatus 100 is detected, assuming, in this step, that motion of the image capturing apparatus 100 has been detected, the process proceeds to the next step.

In a step S1502, the CPU 109 determines whether or not the motion of the image capturing apparatus 100 is small, compared with a predetermined reference, by determining whether or not the shake detection signal converted to the angular displacement signal is not larger than a predetermined value. This is because it is necessary to determine whether the motion of the image capturing apparatus 100 is generated by a general hand shake or an intentional operation (such as panning) of a photographer. If it is determined that the shake detection signal is not higher than the predetermined value (YES to the step S1502), the CPU 109 proceeds to a step S1503.

In the step S1503, the CPU 109 determines whether or not the polarization calculation processing being performed by the polarization calculation section 108 is the polarization calculation processing for recording. Note that in a case where the polarization calculation processing for recording is not being performed, it is assumed that the simplified polarization calculation processing is being performed and that for the simplified polarization calculation processing, any of the methods described in the above embodiments may be used. Further, although the process proceeds to the step S1503 in a case where the answer to the question of the step S1502 is affirmative (YES) or a case where the answer to a question of a step S1506 is negative (NO), a reason for proceeding to the step S1503 in the case where the answer to the question of the step S1506 is negative (NO) will be described hereinafter. If it is determined that the simplified polarization calculation processing is being performed (NO to the step S1503), the CPU 109 proceeds to a step S1504, whereas if it is determined that the polarization calculation processing for recording is being performed (YES to the step S1503), the CPU 109 proceeds to a step S1505.

In the step S1504, the CPU 109 switches the polarization calculation processing being performed by the polarization calculation section 108 from the simplified polarization calculation processing to the polarization calculation processing for recording and then proceeds to the step S1505. Note that a reason for switching the polarization calculation processing in the step S1504 will be described hereinafter. In the step S1505, the CPU 109 changes the setting of the frame rate of the live view display to a low frame rate. When the process reaches the step S1505, the polarization calculation processing for recording having a large calculation load is being performed by the polarization calculation section 108, and in this case, the processing load of the CPU 109 is also large. To cope with this, in the step S1505, the processing load of the CPU 109 is reduced by reducing the frame rate of the live view display.

If it is determined in the step S1502 that the shake detection signal is higher than the predetermined value (NO to the step S1502), the CPU 109 proceeds to the step S1506. In the step S1506, the CPU 109 determines whether the motion of the image capturing apparatus 100 is panning or tilting (hereinafter referred to as the panning or the like) in which the photographer intentionally moves the image capturing apparatus 100 to cause the image capturing apparatus 100 to follow an object or the like.

Figure 16:
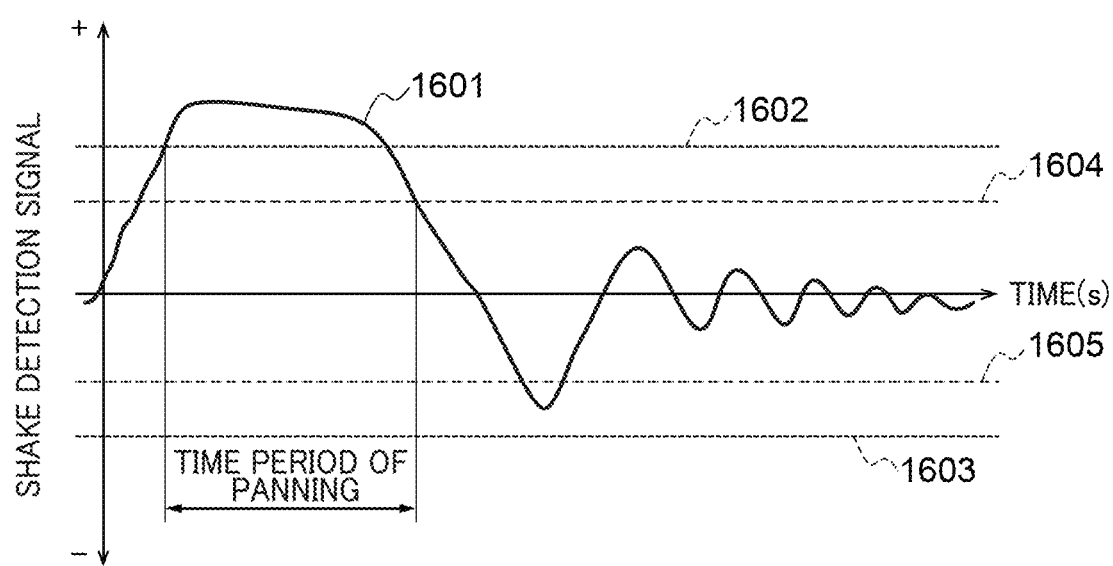
FIG. 16 is a diagram showing changes in a shake detection signal detected when panning is performed in the tenth embodiment.

Here, the shift to the panning or the like and the termination of the panning or the like will be described with reference to FIG. 16. FIG. 16 is a diagram useful in explaining temporal changes in the shake detection signal detected when panning is performed. In a case where the shake detection signal, denoted by reference numeral 1601, become not lower than a positive panning shift threshold value 1602 or becomes not higher than a negative panning shift threshold value 1603, and this state has continued for a predetermined time period, it is determined that panning of the image capturing apparatus 100 has been performed. Then, after execution of panning (after the elapse of the time period of panning), in a case where the shake detection signal 1601 becomes not higher than a positive panning end threshold value 1604 or becomes not lower than a negative panning end threshold value 1605, it is determined that panning of the image capturing apparatus 100 has been terminated.

If it is determined that the motion of the image capturing apparatus 100 is the panning or the like (YES to the step S1506), the CPU 109 proceeds to a step S1507, whereas if it is determined that the motion of the image capturing apparatus 100 is not the panning or the like (NO to the step S1506), the CPU 109 proceeds to the step S1503.

In the step S1507, the CPU 109 switches the polarization calculation processing being performed by the polarization calculation section 108 from the polarization calculation processing for recording to the simplified polarization calculation processing. This is because the background of the object image being shot by the image capturing apparatus 100 is flowing due to the panning or the like, and hence the necessity of execution of the polarization calculation processing for recording by the polarization calculation section 108 is low. Then, in a step S1508, the CPU 109 changes the frame rate of the live view display to a high frame rate. This is because since the calculation processing has been switched from the polarization calculation processing for recording to the simplified polarization calculation processing, the processing load of the CPU 109 can be allocated to the live view display, and therefore, it is possible to increase the frame rate.

Figure 17A:
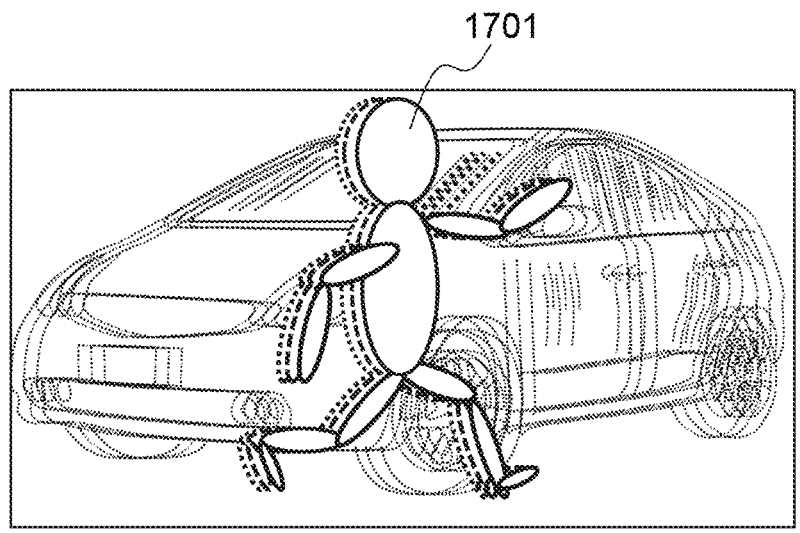
FIGS. 17A and 17B are schematic diagrams of a live view displayed when panning is performed in the tenth embodiment.

Here, changes in the live view display in a case where the polarization calculation processing is switched from the polarization calculation processing for recording to the simplified polarization calculation processing and the frame rate of the live view display is changed to the high frame rate will be described with reference to FIG. 17. FIG. 17A is a diagram schematically showing the live view displayed at a low frame rate when panning is performed, and FIG. 17B is a diagram schematically showing the live view displayed at a high frame rate when panning is performed.

The user is performing the panning operation for moving the image capturing apparatus 100 from left to right so as to follow the motion of a runner 1701 as a main object. In a case where the polarization calculation section 108 is performing the polarization calculation processing for recording, and the frame rate of the live view display is set to the low frame rate, as shown in FIG. 17A, there occurs tailing of the image of the runner 1701 as the main object, and it is found that the followability is reduced.

Figure 17B:
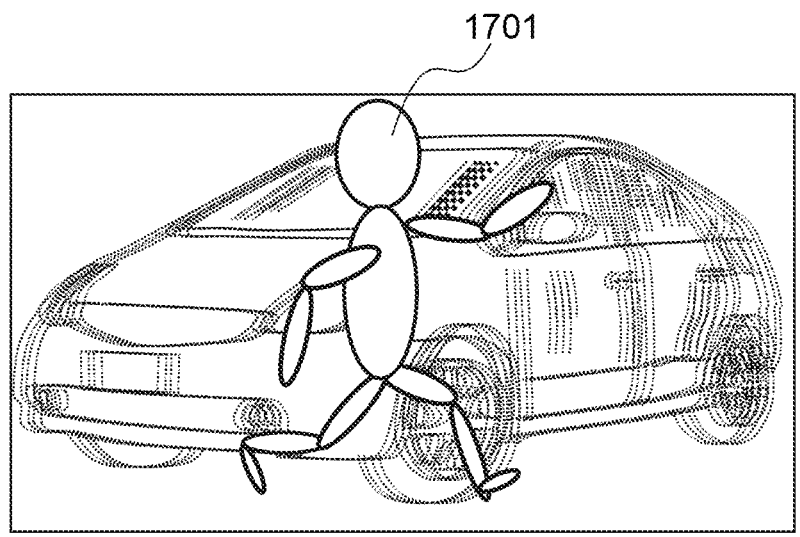

On the other hand, in a case where the polarization calculation section 108 is performing the simplified polarization calculation processing and the frame rate of the live view display is set to a high frame rate, as shown in FIG. 17B, tailing of the image of the runner 1701 is reduced and the background appears to have smoothness in the flow thereof. That is, by changing the frame rate of the live view display from the low frame rate to the high frame rate, the followability of the object is improved, and strangeness felt during shooting is reduced. For this reason, in the present embodiment, in the step S1508, the polarization calculation processing is switched from the polarization calculation processing for recording to the simplified polarization calculation processing.

Figure 18:
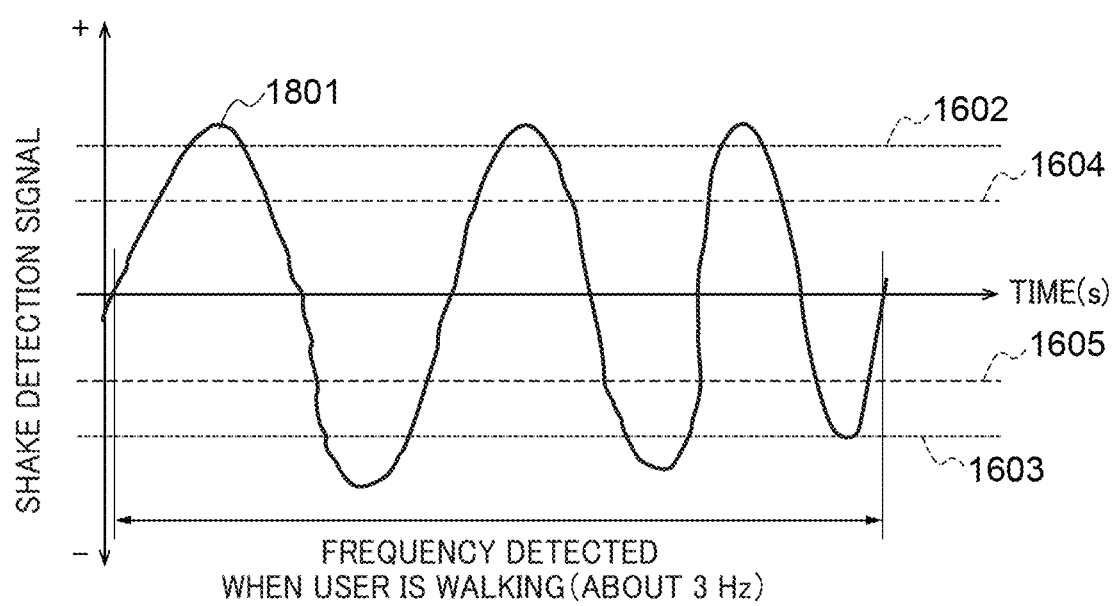
FIG. 18 is a diagram showing changes in the shake detection signal detected when shooting is performed while walking in the tenth embodiment.

Next, the processing performed in a case where it is determined in the step S1506 that the motion of the image capturing apparatus 100 is not the panning or the like will be described with reference to FIG. 18. FIG. 18 is a diagram showing temporal changes in the shake detection signal detected when the user is performing shooting while walking (shooting a moving image while walking). Note that the state in which the user is performing shooting while walking is an example of the case where the answer to the question of the step S1506 is negative (NO).

The panning shift threshold values 1602 and 1603 and the panning end threshold values 1604 and 1605 indicated in FIG. 18 are the same as those indicated in FIG. 16. In a case where the shake detection signal, denoted by reference numeral 1801, has a frequency in a range of approximately 1 Hz to 6 Hz and it is detected that the hake detection signal intermittently becomes not lower than the positive panning shift threshold value 1602 or not higher than the negative panning shift threshold value 1603, it is possible to determine that a photographer is performing shooting while walking. In other words, in this case, it is not determined that the photographer is performing panning. The frequency can be obtained as ½ of the number of times of inversion of increase and decrease of the shake detection signal 1801 per unit time.

In a case where the photographer is performing shooting while walking, the process proceeds from the step S1506 to the step S1503 to perform shake correction. In the case where shake correction is performed when the photographer is walking, the focal length of the image capturing apparatus 100 is often on a wider side than a predetermined focal length. However, when shooting is performed at a focal length which does not correspond to the above condition (which is not on the wider side than the predetermined focal length), a shake of a shot image becomes large, and hence even when the photographer is performing shooting while walking, this situation may be treated similar to the panning or the like, and the process may proceed from the step S1506 to the step S1507.

Next, a case where the process proceeds from the step S1503 to the step S1504 will be described. It is, in a case where the panning or the like is terminated after the process proceeds to the steps S1502, S1507, and S1508, and then the process proceeds to the steps S1502 and S1503, that it is determined in the step S1503 that the polarization calculation processing is not the polarization calculation processing for recording. In a case where the motion of the image capturing apparatus 100 is not the panning or the like, the frame rate of the live view display is set to the low frame rate, and hence it is necessary to switch the polarization calculation processing from the simplified polarization calculation processing to the polarization calculation processing for recording. Therefore, in the case where it is determined in the step S1503 that the polarization calculation processing is not the polarization calculation processing for recording, the process proceeds to the step S1504 to switch the polarization calculation processing to the polarization calculation processing for recording.

When the frame rate of the live view display is set in the step S1505 or S1508, the CPU 109 displays the live view on the display section 121 in a step S1509, followed by terminating the present process.

Thus, in the present embodiment, in the case where the panning or the like of the image capturing apparatus 100 is detected, the polarization calculation processing is switched from the polarization calculation processing for recording to the simplified polarization calculation processing, and the frame rate of the live view display is set to the high frame rate. This makes it possible to increase the followability to an object during shooting and reduce strangeness felt during shooting. Further, after the panning or the like is terminated, the polarization calculation processing is switched from the simplified polarization calculation processing to the polarization calculation processing for recording, and the frame rate of the live view display is set to the low frame rate. This makes it possible for a user to perform shooting while checking the polarized components of an image in detail e.g. in a shooting state in which the user is in a stationary position and is aiming the image capturing apparatus 100 to an object.

Next, an eleventh embodiment of the present invention will be described. In the eleventh embodiment, a description will be given of a fourth configuration for switching between the polarization calculation processing for recording and the simplified polarization calculation processing. In the fourth configuration, the polarization calculation processing is switched according to whether an assist display function is enabled or disabled on the display section 121.

Figure 19:
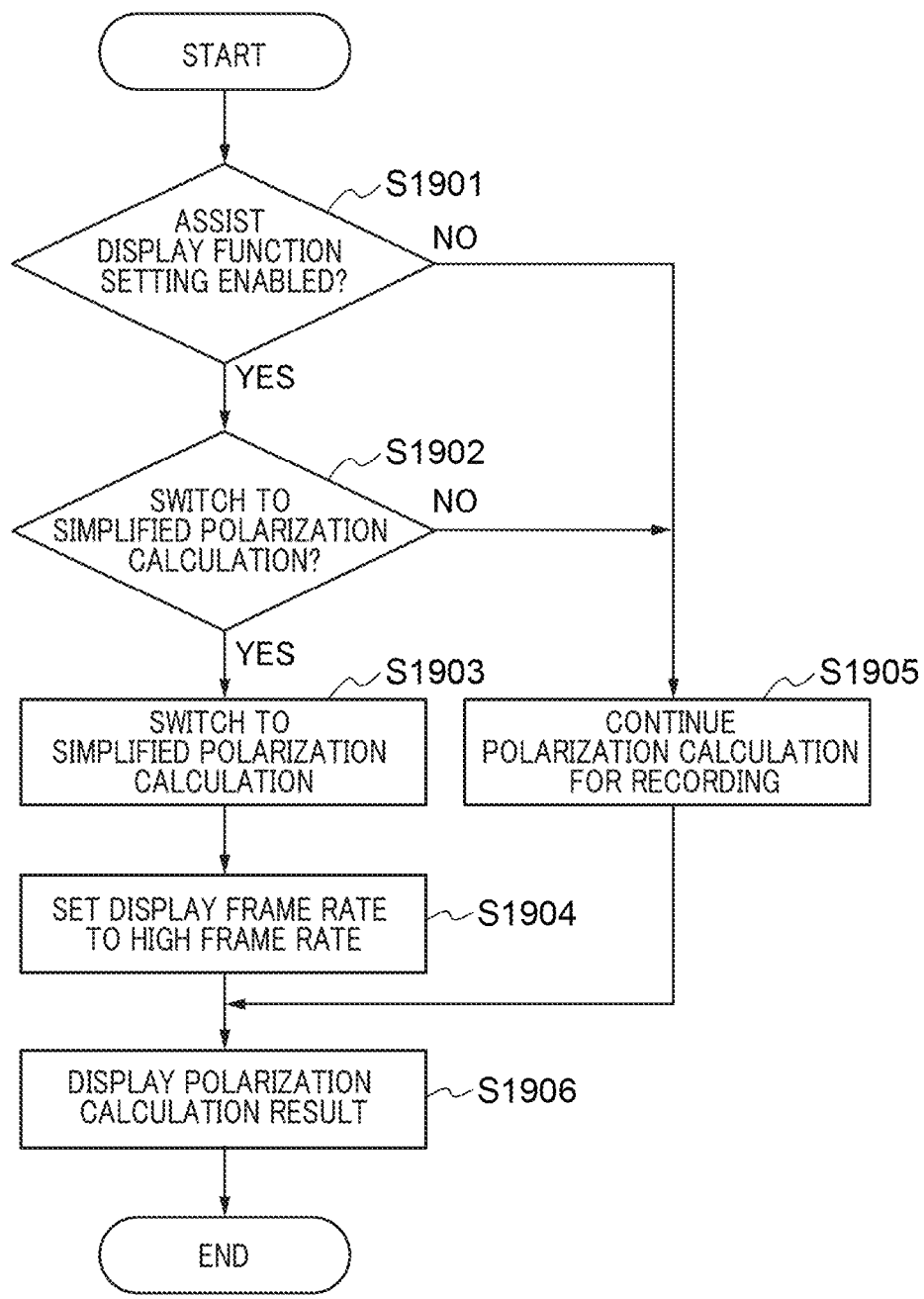
FIG. 19 is a flowchart of a first switching control process for switching the polarization calculation processing in an eleventh embodiment.

FIG. 19 is a flowchart of a first switching control process for switching the polarization calculation processing, i.e. a switching control process for switching the polarization calculation processing from the polarization calculation processing for recording to the simplified polarization calculation processing, in the eleventh embodiment. Processing operations (steps) indicated by S numbers in FIG. 19 are realized by the CPU 109 that loads a predetermined program stored in the ROM 111 into the RAM 112 and performs centralized control of the operations of the components of the image capturing apparatus 100.

In a step S1901, the CPU 109 determines whether or not the setting of the assist display function has been enabled. Examples of the assist display function include a function for displaying contrast, tone, hue, chroma, focus, sharpness, etc., of an image, using a histogram, a vector scope, a waveform monitor, a zebra pattern, peaking display, false color, etc. In the image capturing apparatus 100, by enabling the assist display function, a user can easily adjust exposure, colors, focus, etc., with high accuracy based on the display on the display section 121.

The assist display function can be switched between the enabled state and the disabled state by a user's operation of e.g. a menu display on the operation section 110. The CPU 109 switches between the enabled state and the disabled state of the assist display function according to a user operation instruction, and when the assist display function is set enabled, the CPU 109 controls the display driving circuit 120 to display the assist display generated by the OSD generation section 117 on the display section 121.

If it is determined that the assist display function is enabled (YES to the step S1901), the CPU 109 proceeds to a step S1902. In the step S1902, the CPU 109 determines whether or not to switch the polarization calculation processing from the polarization calculation processing for recording to the simplified polarization calculation processing. For example, in a case where the number of enabled functions out of the plurality of assist display functions exceeds a predetermined number, the CPU 109 switches the polarization calculation processing to the simplified polarization calculation processing. Further, the CPU 109 calculates the calculation load of the assist display function for each assist display function, and in a case where the total value of the loads becomes equal to or larger than a predetermined threshold value, the CPU 109 switches the polarization calculation processing to the simplified polarization calculation processing. Although a plurality of combinations of the assist display functions are generated in this method, the number of functions enabled as the assist display function is not used as information used in performing the determination. Further, whether or not to switch the polarization calculation processing to the simplified polarization calculation processing may be determined based on a combination of the assist display function and any other function(s) having influence on the processing load. In short, in any of the above-described cases, the CPU 109 determines to switch the polarization calculation processing to the simplified polarization calculation processing (YES to the step S1902), the CPU 109 proceeds to a step S1903. Note that the step S1902 can be omitted.

In the step S1903, the CPU 109 switches the polarization calculation processing from the polarization calculation processing for recording to the simplified polarization calculation processing. The various methods of the simplified polarization calculation processing have been described as above, and any of them can be used. In a step S1904, the CPU 109 sets the display frame rate to a high frame rate and then proceeds to a step S1906.

If it is determined in the step S1901 that the assist display function is not enabled (NO to the step S1901) or it is determined in the step S1902 not to switch to the simplified polarization calculation processing (NO to the step S1902), the CPU 109 proceeds to a step S1905. In the step S1905, the CPU 109 continues the polarization calculation processing for recording and then proceeds to the step S1906. In the step S1906, the CPU 109 displays a video as a result of the polarization calculation processing on the display section 121, followed by terminating the present process.

Figure 20:
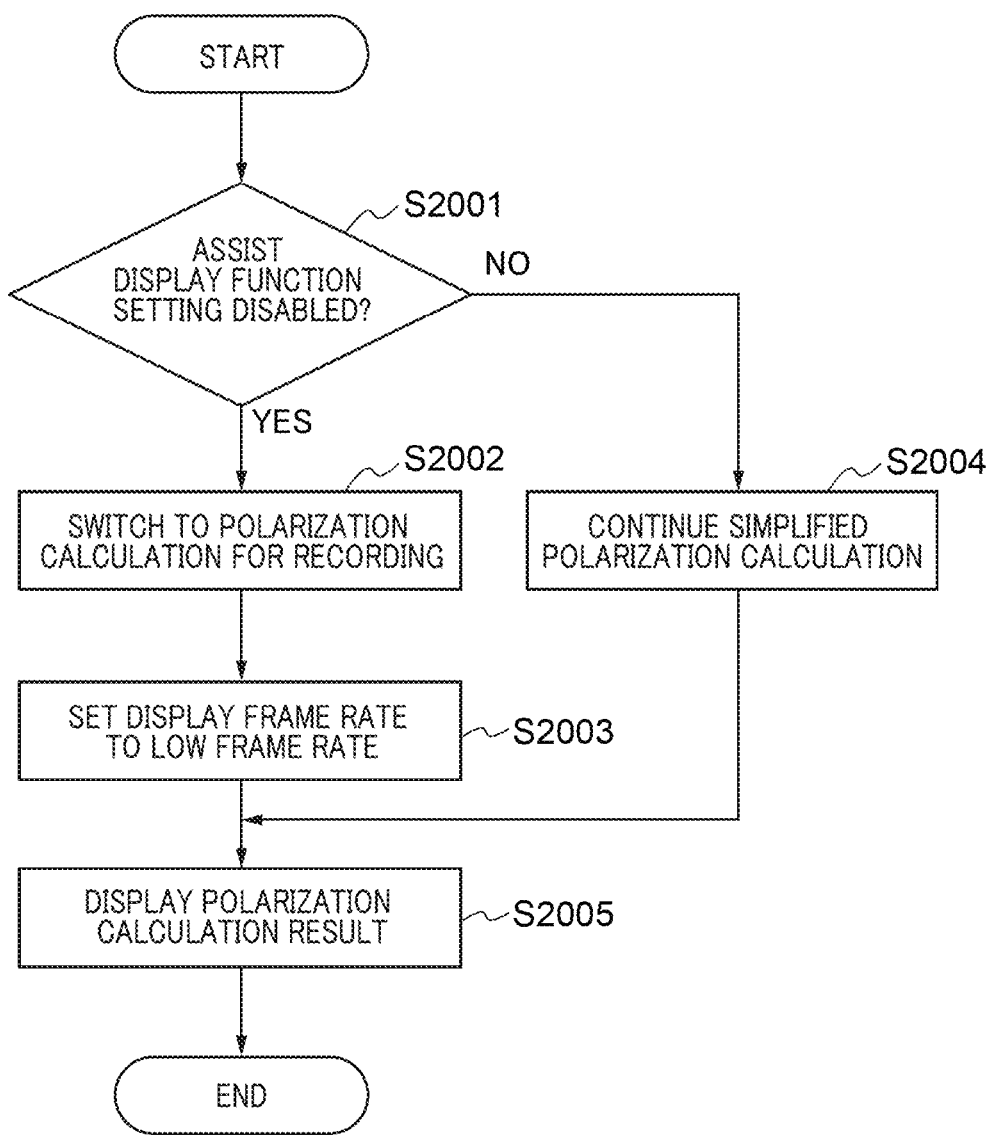
FIG. 20 is a flowchart of a second switching control process for switching the polarization calculation processing in the eleventh embodiment.

FIG. 20 is a flowchart of a second switching control process for switching the polarization calculation processing, i.e. a switching control process for switching the polarization calculation processing from the simplified polarization calculation processing to the polarization calculation processing for recording, in the eleventh embodiment. Processing operations (steps) indicated by S numbers in FIG. 20 are realized by the CPU 109 that loads a predetermined program stored in the ROM 111 into the RAM 112 and performs centralized control of the operations of the components of the image capturing apparatus 100.

In a step S2001, the CPU 109 determines whether or not the setting of the assist display function has been disabled. Note that the setting of the assist display function is changed by a user's operation on the operation section 110. If it is determined that the assist display function has been disabled (YES to the step S2001), the CPU 109 proceeds to a step S2002.

In the step S2002, the CPU 109 switches the polarization calculation processing from the simplified polarization calculation processing to the polarization calculation processing for recording. In a step S2003, the CPU 109 sets the display frame rate to the low frame rate and then proceeds to a step S2005.

If it is determined in the step S2001 that the assist display function is held in the enabled state (NO to the step S2001), the CPU 109 proceeds to a step S2004. In the step S2004, the CPU 109 continues the simplified polarization calculation processing and then proceeds to the step S2005.

In the step S2005 as the next step of the step S2003 or S2004, the CPU 109 displays a video as a result of the polarization calculation processing on the display section 121, followed by terminating the present process.

Thus, in the present embodiment, in the case where the assist display function is enabled, the polarization calculation processing is switched from the polarization calculation processing for recording to the simplified polarization calculation processing, whereby it is possible to increase the frame rate to thereby improve the real-time property. Further, in the case where the assist display function is disabled, the polarization calculation processing is switched from the simplified polarization calculation processing to the polarization calculation processing for recording, whereby it is possible to display a polarization-processed image with high accuracy.

Next, a twelfth embodiment of the present invention will be described. In the twelfth embodiment, a description will be given of a fifth configuration for switching between the polarization calculation processing for recording and the simplified polarization calculation processing. In the fifth configuration, the polarization calculation processing is switched using a change in the polarization angle of the polarizing filters 102 as a trigger, generated by an operation of a user interface (hereinafter referred to as the "UI") displayed on the display section 121.

Figure 21A:
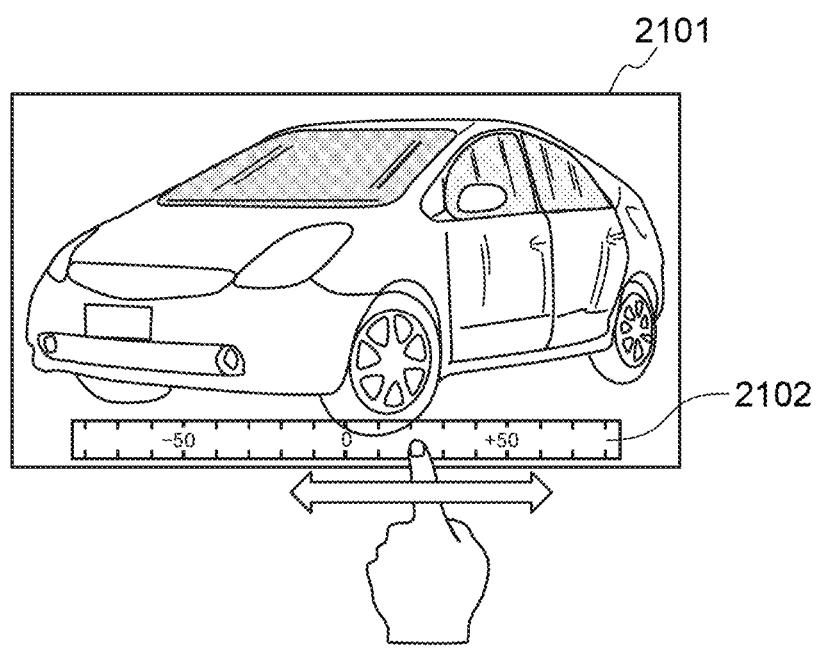
FIGS. 21A and 21B are diagrams showing an example of a user interface displayed on a display section in a twelfth embodiment.
Figure 21B:
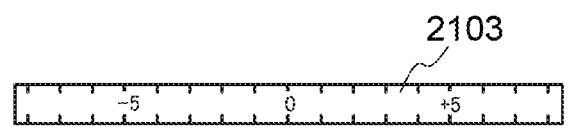

FIG. 21A is a diagram showing a UI 2102 as an example of the UI, which is displayed on the display section 121 and is used for adjustment of the polarized components of a shot image, in a state superimposed on a shot video. FIG. 21B is a diagram showing a UI 2103 as another example of the UI.

The UI 2102 is displayed on a lower portion of a display screen 2101 of the display section 121. The display of the UI 2102 is linked with the operation on the operation section 110, and the operation section 110 in the present example is specifically a touch panel provided in a state overlaid on the display section 121. That is, the user is enabled to perform an operation on the UI 2102 by touching an area where the UI 2102 is displayed.

The UIs 2102 and 2103 enables adjustment of the polarized components of a shot image based on a user's swipe operation in the right-left direction for changing the polarization angle. The UI 2103 and the UI 2102 are different in resolution. For example, the display of the UI 2102 and UI 2103 can be switched by a tap operation or a long-pressing operation performed on a slide bar. However, the UI display-switching method is not limited to this, but the UI display may be switched by any other suitable operation.

Note that although in the present embodiment, the UIs 2102 and 2103 are each displayed as a lateral belt-shaped slide bar which is operated in the right-left direction, this is not limitative. For example, the UI may be a vertical belt-shaped slide bar which is operated by a swipe operation in the vertical direction. Further, the UI may be a circular UI display which is operated by a swipe operation in a clockwise/anticlockwise direction within the circle. Further, the operation for changing the polarization angle is performed not from the touch panel provided on the display section 121, but from a mechanical switch member, such as a slide switch, a lever switch, a seesaw switch, and a dial switch, provided on the body of the image capturing apparatus 100. Alternatively, a ring-shaped switch member which is similar to a ring member used for a focusing operation and a zooming operation and can be rotated about an optical axis may be provided on a lens barrel of the optical lens 101 through which an object image is captured, and the polarization angle may be adjusted by rotating the ring-shaped switch member. Further, the polarization angle may be changed based on the operation method of the various switches originally included in the image capturing apparatus 100. In a case where the polarization angle is changed by the mechanical switch member, the resolution may be switched by changing a stroke within a movable range of the switch member or may be switched in multiple steps.

Figure 22:
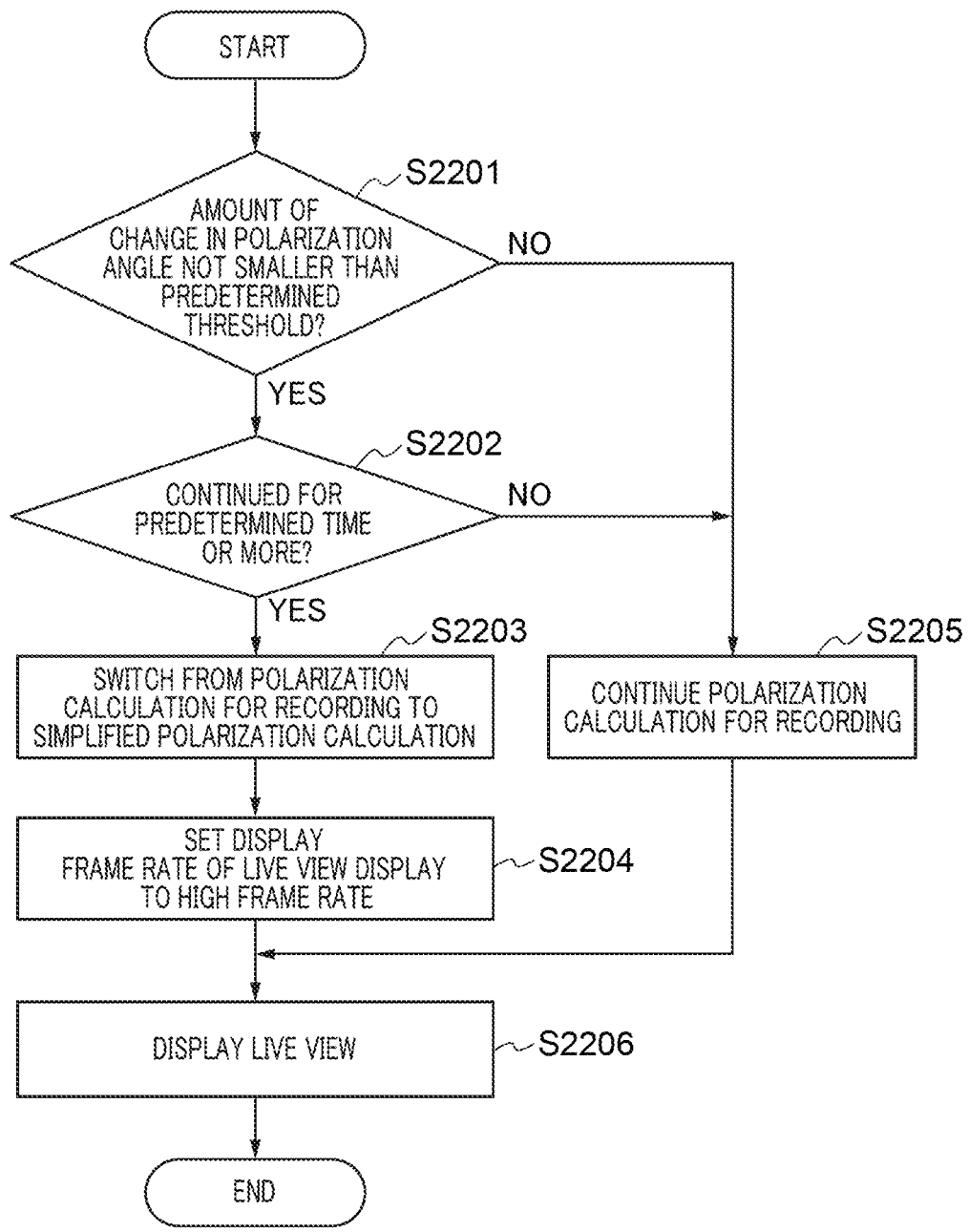
FIG. 22 is a flowchart of a first switching control process for switching the polarization calculation processing in the twelfth embodiment.

FIG. 22 is a flowchart of a first switching control process for switching the polarization calculation processing, i.e. a switching control process for switching the polarization calculation processing from the polarization calculation processing for recording to the simplified polarization calculation processing in the twelfth embodiment. Processing operations (steps) indicated by S numbers in FIG. 22 are realized by the CPU 109 that loads a predetermined program stored in the ROM 111 into the RAM 112 and performs centralized control of the operations of the components of the image capturing apparatus 100.

It is assumed that the polarization calculation processing for recording is being performed as the polarization calculation processing when the process is started. In a step S2201, the CPU 109 determines whether or not an amount of change in the polarization angle is not smaller than a predetermined threshold value. For example, the user swipes the UI (slide bar) displayed on the display section 121 to trace on a waveform (hereinafter referred to as the "fitting curve") obtained by generating luminance information at an arbitrary polarization angle from the polarization information obtained through the polarizing filters 201 to 204. Then, the CPU 109 determines whether or not an amount of change in the polarization angle, set by the user's operation, is not smaller than a predetermined angle. More specifically, the CPU 109 determines whether the user is operating the slide bar of the UI 2102 with 10-degree pitches of resolution, appearing in FIG. 21A, or the slide bar of the UI 2103 with 1-degree pitches of resolution, shown in FIG. 21B. For this reason, the threshold value of the amount of change in the polarization angle is set to 10 degrees, but the threshold value is not limited to this, and may be settable by a user.

If it is determined that the amount of change in the polarization angle is not smaller than the predetermined threshold value (not smaller than 10 degrees) (YES to the step S2201), the CPU 109 proceeds to a step S2202. In the step S2202, the CPU 109 determines whether or not the amount of change in the polarization angle, not smaller than the predetermined threshold value, has continued for a predetermined time period or more. That is, the CPU 109 determines whether the setting set by the operation of changing the polarization angle has continued with the resolution of the displayed UI or has ended. If it is determined that the setting of the amount of change in the polarization angle not smaller than the predetermined threshold value has continued for the predetermined time period or more (YES to the step S2202), the CPU 109 proceeds to a step S2203.

In the step S2203, the CPU 109 switches the polarization calculation processing from the polarization calculation processing for recording to the simplified polarization calculation processing. This is for the following reason: The polarization components of the object image on the live view display are changed by changing the polarization angle. At this time, in the polarization calculation processing for recording in which the polarization calculation processing is performed for each set of pixels, the processing load of the CPU 109 is large, and hence the frame rate of the live view display is set to a low frame rate. In this case, a time lag is liable to be generated between the change in the polarization components of the object image, generated by the UI operation, and the live view display. To cope with this, to improve the real-time property by reducing this time lag, the polarization calculation processing is switched from the polarization calculation processing for recording to the simplified polarization calculation processing so as to make it possible to display the live view at a high frame rate.

Figure 23A:
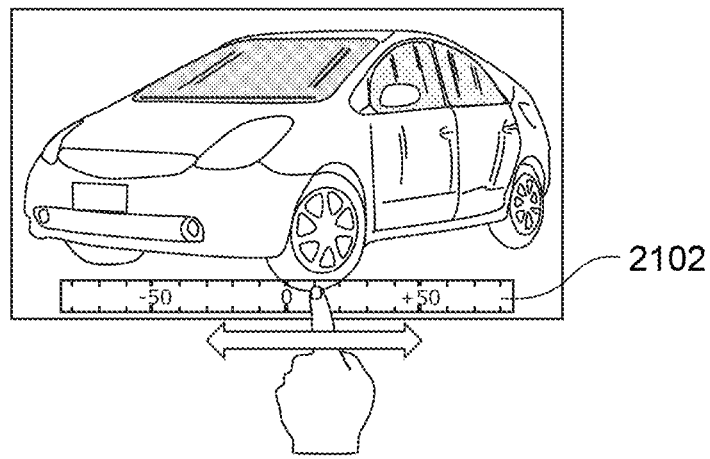
FIGS. 23A to 23C are diagrams useful in explaining a time lag of live view display, which is caused in accordance with a change of a polarization angle in the twelfth embodiment.
Figure 23B:
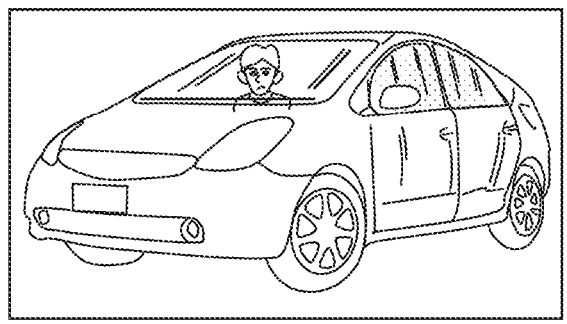
Figure 23C:
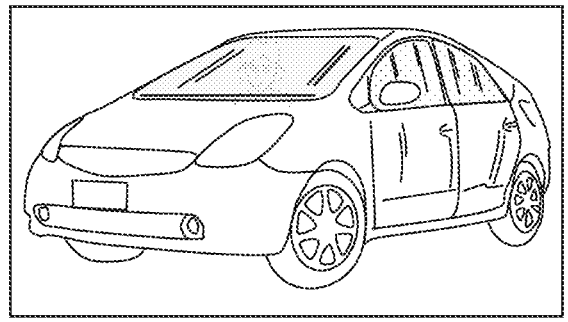

FIGS. 23A to 23C are diagrams useful in explaining a relationship between a change in the polarization components of the object image, generated by the UI operation, and a time lag of the live view display. FIG. 23A is a diagram showing a situation in which the user is operating the UI 210. FIG. 23B is a diagram showing an object image captured at the time of termination of the operation on the UI 2102 for changing the polarization angle. FIG. 23C is a diagram showing an object image actually displayed after operating the UI 2102 due to the time lag. Here, although the user has intended to change the polarization angle so as to make a driver visible as shown in FIG. 23B, in actuality, a component reflected from the front glass remains due to the time lag as shown in FIG. 23C. Therefore, the user is required to operate the UI 2102 to adjust the polarization angle.

In a step S2204, the CPU 109 sets the frame rate of the live view display to the high frame rate and then proceeds to a step S2206. This is because the processing load of the CPU 109 is reduced in the step S2203, and hence the reduced processing load can be allocated to the frame rate processing of the live view display. The real-time property of the display is improved by setting the frame rate of the live view display to the high frame rate, and hence, when referring to the illustrated example in FIGS. 23B and 23C, the user can obtain the display state shown in FIG. 23B by one operation.

If it is determined in the step S2201 that the amount of change in the polarization angle is smaller than the predetermined threshold value (NO to the step S2201), or if it is determined that the setting of the amount of change in the polarization angle not smaller than the predetermined threshold value has ended within the predetermined time period (NO to the step S2202), the CPU 109 proceeds to a step S2205. In the step S2205, the CPU 109 continues the polarization calculation processing for recording and then proceeds to the step S2206.

In the step S2206, the CPU 109 displays the live view at the frame rate having been set at the time point, followed by terminating the present process.

Figure 24:
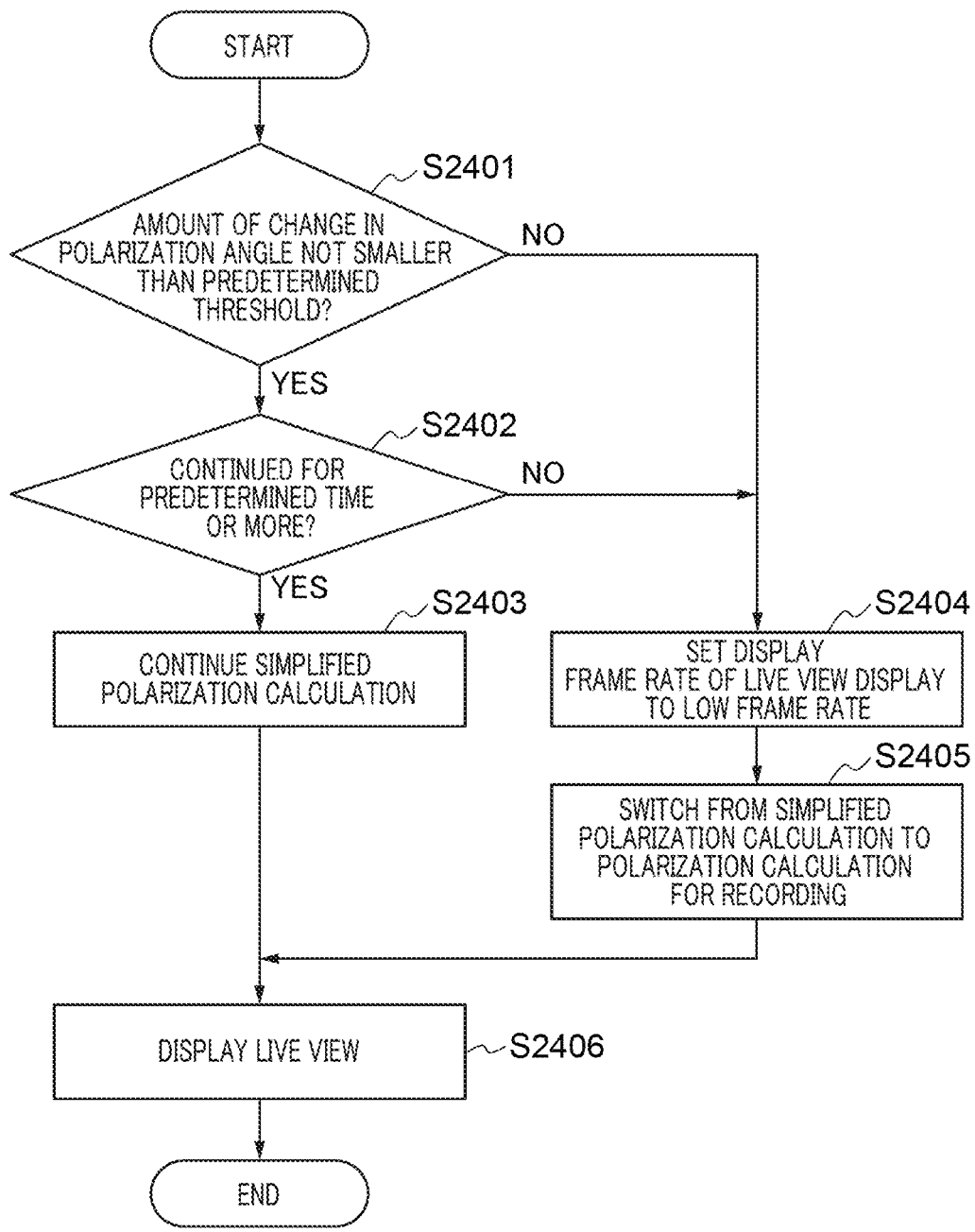
FIG. 24 is a flowchart of a side first switching control process for switching the polarization calculation processing in the twelfth embodiment.

FIG. 24 is a flowchart of a second switching control process for switching the polarization calculation processing, i.e. a switching control process for switching the polarization calculation processing from the simplified polarization calculation processing to the polarization calculation processing for recording, in the twelfth embodiment. Processing operations (steps) indicated by S numbers in FIG. 24 are realized by the CPU 109 that loads a predetermined program stored in the ROM 111 into the RAM 112 and performs centralized control of the operations of the components of the image capturing apparatus 100.

It is assumed that the simplified polarization calculation processing is being performed as the polarization calculation processing when the process is started. Steps S2401 and S2402 are the same as the steps S2201 and 2202 of the flowchart in FIG. 22, respectively, and hence description thereof is omitted. If the answers to the questions of the steps S2401 and S2402 are both affirmative (YES), the CPU 109 proceeds to a step S2403. In the step S2403, the CPU 109 continues the simplified polarization calculation processing and then proceeds to a step S2406.

If the answer to the question of the step S2401 or the answer to the question of S2402 is negative (NO), the CPU 109 proceeds to a step S2404. At the time point of the process proceeding to the step S2404, the simplified polarization calculation processing is being performed and the frame rate of the live view display has been set to the high frame rate. Further, when the process proceeds to the step S2404, an amount of change in the polarization angle, traced on the fitting curve calculated by the polarization calculation processing, is smaller than the predetermined threshold value. For this reason, it is necessary to allocate the processing load of the CPU 109 from the live view display to the polarization calculation processing. To cope with this, in the step S2404, the CPU 109 sets the current frame rate of the live view display to the low frame rate and then proceeds to a step S2405.

In the step S2405, the CPU 109 switches the polarization calculation processing from the simplified polarization calculation processing to the polarization calculation processing for recording and then proceeds to the step S2406.

In the step S2406, the CPU 109 displays the live view at the frame rate having been set at the time point, followed by terminating the present process.

Thus, in the present embodiment, in the case where the amount of the polarization angle, changed by a UI operation, is not smaller than the predetermined threshold value, and this state has continued for a predetermined time period or more, the polarization calculation processing is set to the simplified polarization calculation processing and the frame rate of the live view display is set to the high frame rate. This makes it possible to reduce a time lag between the UI operation and a change in the image, generated when the polarization angle on the fitting curve calculated by the polarization calculation section 108 is traced, and thereby improve the real-time property of the live view display.

Further, in the case where the amount of the polarization angle, changed by a UI operation, is smaller than the predetermined threshold value, and in the case where this state does not continue even when the polarization angle is changed, the frame rate of the live view display is set to the low frame rate, and the polarization calculation processing is set to the polarization calculation processing for recording. This enables a user to perform shooting while checking the polarization components of the recorded image, in detail.

Next, a thirteenth embodiment of the present invention will be described. In the thirteenth embodiment, a description will be given of a sixth configuration for switching between the polarization calculation processing for recording and the simplified polarization calculation processing. In the sixth configuration, the polarization calculation processing and the display frame rate are switched based on whether or not a UI operation is being performed. Note that the UI display and its operation in the present embodiment are the same as those in the twelfth embodiment (see FIG. 21), and hence description thereof is omitted.

Figure 25:
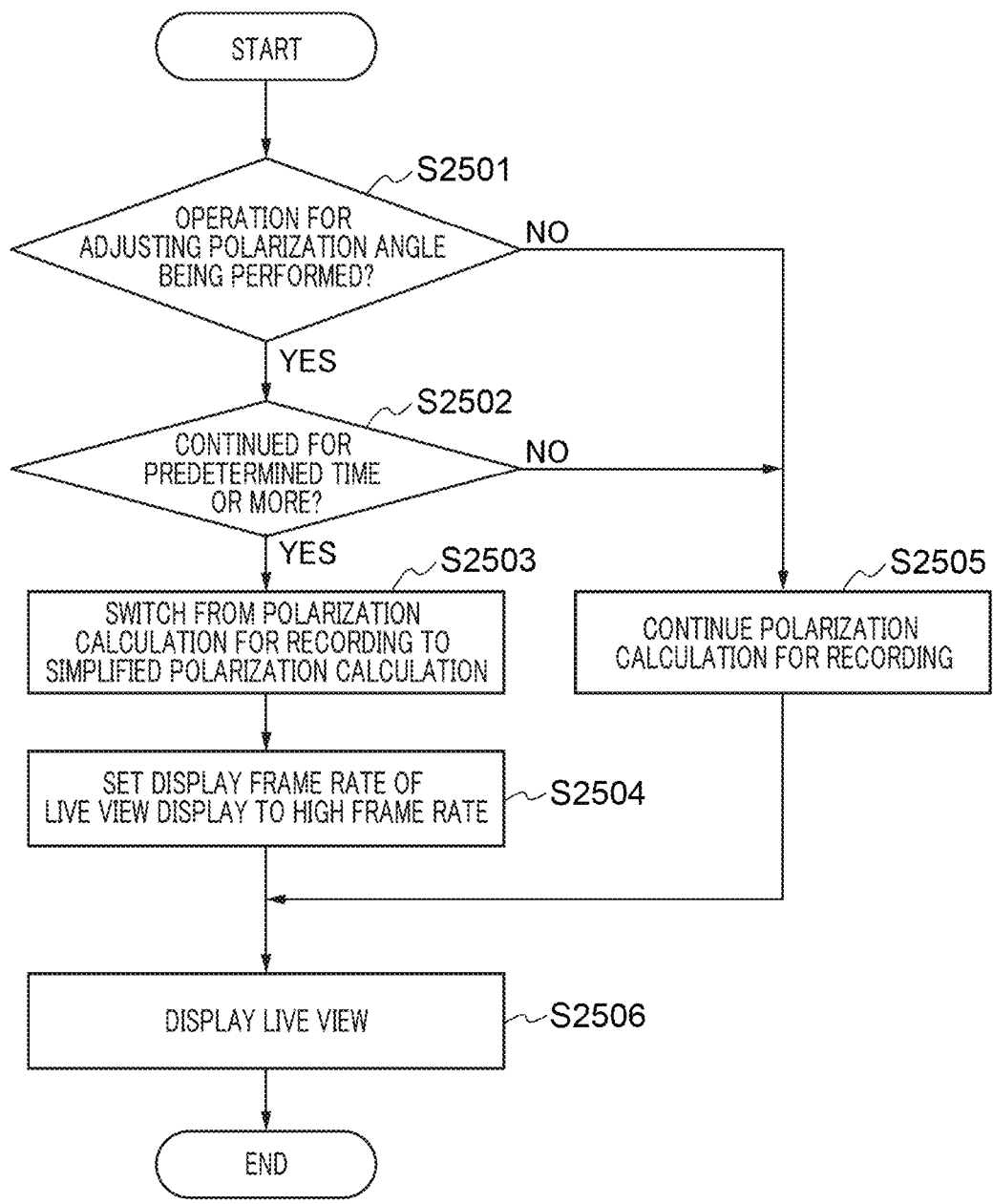
FIG. 25 is a flowchart of a first switching control process for switching the polarization calculation processing in a thirteenth embodiment.

FIG. 25 is a flowchart of a first switching control process for switching the polarization calculation processing, i.e. a switching control process for switching the polarization calculation processing from the polarization calculation processing for recording to the simplified polarization calculation processing, in the thirteenth embodiment. Processing operations (steps) indicated by S numbers in FIG. 25 are realized by the CPU 109 that loads a predetermined program stored in the ROM 111 into the RAM 112 and performs centralized control of the operations of the components of the image capturing apparatus 100.

It is assumed that the polarization calculation processing for recording is being performed as the polarization calculation processing when the process is started. In a step S2501, the CPU 109 determines whether or not the operation for adjusting the polarization angle is being performed. More specifically, whether or not the operation for adjusting the polarization angle is being performed by swiping the slide bar of the UI (such as the UI 2102) displayed on the screen of the display section 121 and tracing the fitting curve calculated by the polarization calculation processing is determined.

If it is determined that the operation for adjusting the polarization angle is being performed (YES to the step S2501), the CPU 109 proceeds to a step S2502, whereas if it is determined that the operation for adjusting the polarization angle is not being performed (NO to the step S2501), the CPU 109 proceeds to a step S2505.

In the step S2502, the CPU 109 determines whether or not the operation for adjusting the polarization angle has continued for a predetermined time period or more. That is, whether the operation for adjusting the polarization angle has continued or has ended is determined. If it is determined that the operation for adjusting the polarization angle has continued for the predetermined time period or more (YES to the step S2502), the CPU 109 proceeds to a step S2503, whereas if it is determined that the operation for adjusting the polarization angle has ended within the predetermined time period (NO to the step S2502), the CPU 109 proceeds to the step S2505.

The step S2503, a step S504, the step S504, and a step S2506 are the same as the steps S2203 to S2206 of the flowchart in FIG. 22 in the twelfth embodiment, respectively, and hence description thereof is omitted.

Figure 26:
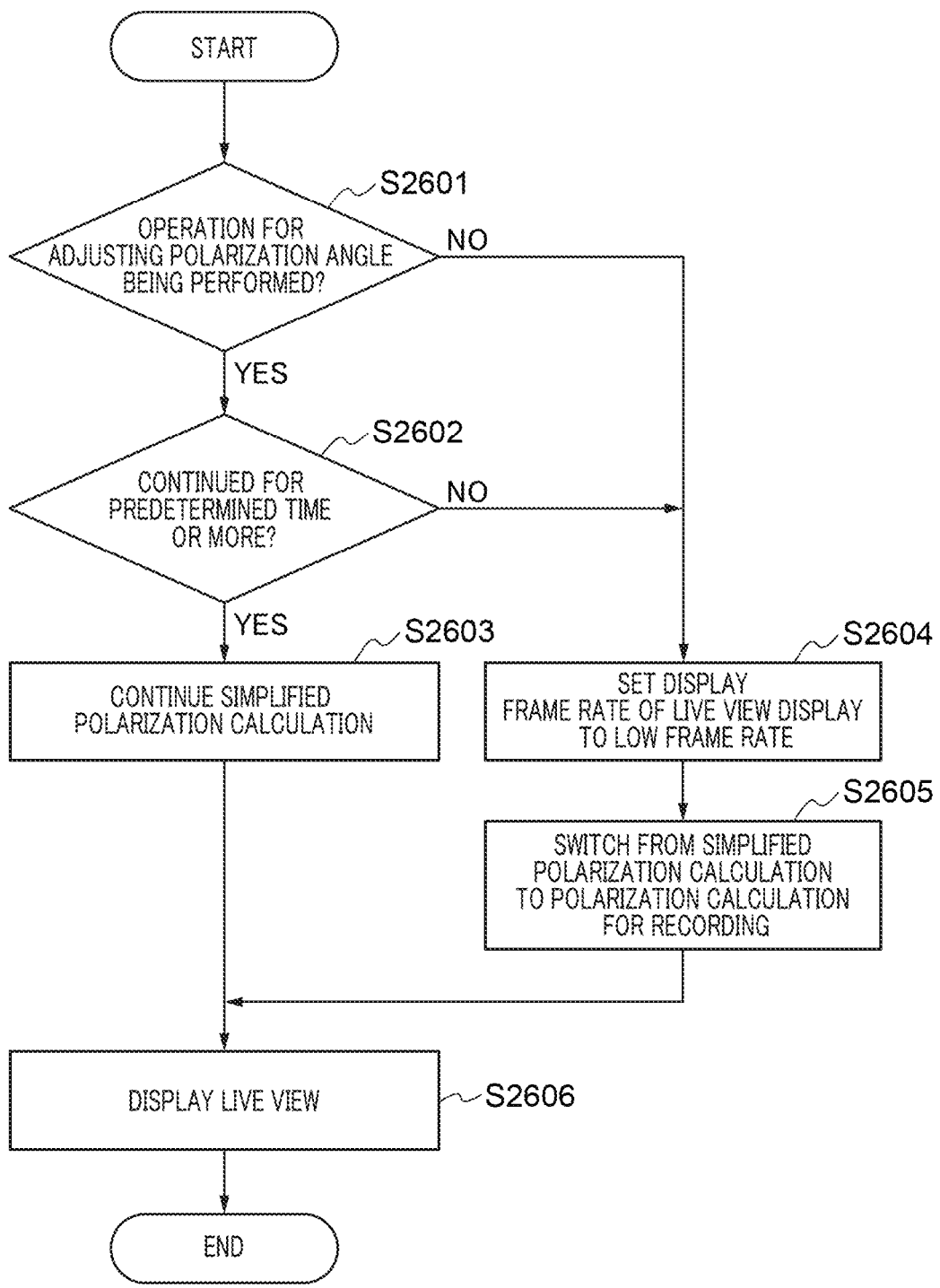
FIG. 26 is a flowchart of a second switching control process for switching the polarization calculation processing in the thirteenth embodiment.

FIG. 26 is a flowchart of a second switching control process for switching the polarization calculation processing, i.e. a switching control process for switching the polarization calculation processing from the simplified polarization calculation processing to the polarization calculation processing for recording, in the thirteenth embodiment. Processing operations (steps) indicated by S numbers in FIG. 26 are realized by the CPU 109 that loads a predetermined program stored in the ROM 111 into the RAM 112 and performs centralized control of the operations of the components of the image capturing apparatus 100.

It is assumed that the simplified polarization calculation processing is being performed as the polarization calculation processing when the process is started. Steps S2601 and S2602 are the same as the steps S2501 and S2502 of the flowchart in FIG. 25, respectively, and hence description thereof is omitted. If the answers to the questions of the steps S2601 and S2602 are both affirmative (YES), the CPU 109 proceeds to a step S2603, whereas if the answer to the question of the step S2601 or the answer to the question of the step S2602 is negative (NO), the CPU 109 proceeds to a step S2604. The steps S2603 and S2604 and steps S2605 and S2606 are the same as the steps S2403 to S2406 in FIG. 24 in the twelfth embodiment, respectively, and hence description thereof is omitted.

Thus, in the present embodiment, in the case where the UI operation for adjusting the polarization components is being performed and this state has continued for a predetermined time period or more, the polarization calculation processing is set to the simplified polarization calculation processing, and the frame rate of the live view display is set to the high frame rate. This makes it possible to reduce a time lag between the UI operation and a change in the image, generated when the polarization angle on the fitting curve calculated by the polarization calculation section 108 is traced, and thereby improve the real-time property of the live view display. Further, in the present embodiment, in the case where the UI operation for adjusting the polarization components is not being performed, or in the case where the UI operation for adjusting the polarization components has been performed but this state has not continued, the frame rate of the live view display is set to the low frame rate, and the polarization calculation processing is set to the polarization calculation processing for recording. This enables a user to perform shooting while checking the polarization components of the image to be recorded, in detail.

Next, a fourteenth embodiment of the present invention will be described. In the fourteenth embodiment, a description will be given of a seventh configuration for switching between the polarization calculation processing for recording and the simplified polarization calculation processing. In the seventh configuration, the switching between the polarization calculation processing for recording and the simplified polarization calculation processing is performed based on power supply information, such as power consumption and a battery remaining amount.

FIG. 27 is a diagram useful in explaining a relationship between the operation functions of the image capturing apparatus 100 and power consumption. In the image capturing apparatus 100, the amount of electric power is largely changed according to functions in operation. For example, although not shown, the image capturing apparatus 100 is equipped with a plurality of camera sections, and the power consumption is increased by driving these. Further, in a case where an LED light is lighted and a case where the video output-driving circuit 118 is driven to output a video to the video terminal 119, power consumption is also increased. Further, also when the network driving circuit 124 is operated to connect the image capturing apparatus 100 to a network e.g. via the side network terminal 125, Wi-Fi (registered trademark), or the like, the power consumption is also increased. Electric power is consumed not only by these components, but when a lot of functions equipped in the image capturing apparatus 100 are operated, the power consumption is increased. On the other hand, when only one camera section is driven and only functions as the minimum necessary for recording a moving image are in operation, the power consumption is necessarily reduced.

In view of this, the calculation processing is switched by setting a threshold value for the power consumption. The polarization calculation processing for recording is larger in calculation load than the simplified polarization calculation processing, and it is necessary to electrically drive a larger number of logic elements within a processing circuit, such as a LSI, and hence the power consumption is increased. On the other hand, in the simplified polarization calculation processing, the processing load is electrically reduced e.g. by reducing the amount of calculation or configuring the calculation itself as mere comparison, and hence it is possible to reduce the power consumption.

Therefore, in a case where the image capturing apparatus 100 is operated such that the power consumption is made small, by further setting the polarization calculation processing to the simplified polarization calculation processing, it is possible to make the power consumption even smaller. Inversely, instead of reducing the whole power consumption by limiting the functions during shooting, electric power can be allocated to calculation processing, and in this case, the polarization calculation processing for recording can be used not only when recording is performed. The configuration may be such that a combination of a decrease or increase of power consumption and a type of the polarization calculation processing can be freely set by a user.

In a case where the image capturing apparatus 100 is driven by a battery (driven by a battery attached to the image capturing apparatus body), the calculation processing can be switched according to the battery remaining amount.

Figure 28A:
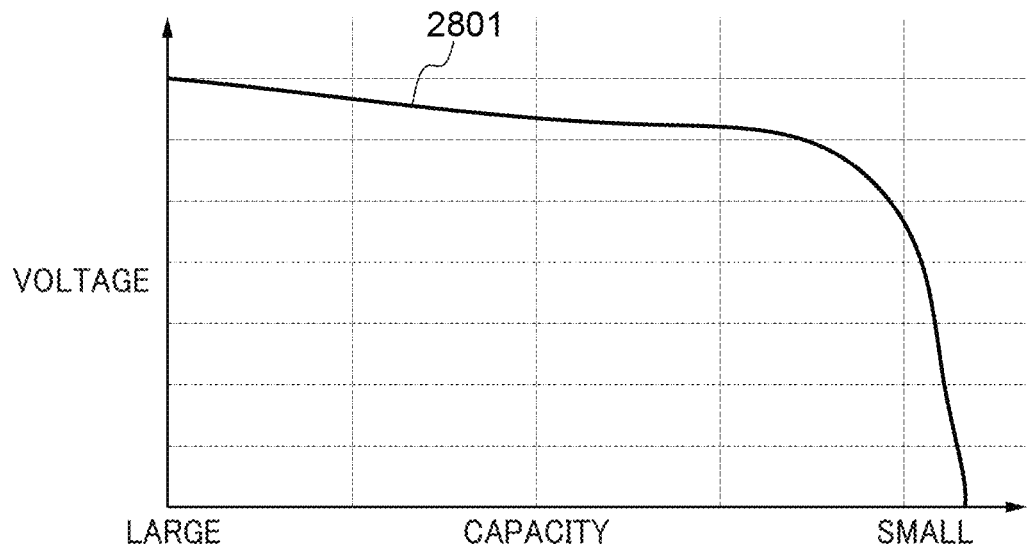
FIGS. 28A and 28B are diagrams useful in explaining discharge characteristics of a battery of the image capturing apparatus.

FIG. 28A is a diagram showing discharge characteristics of a general lithium-ion battery. Note that the battery capacity represented by the horizontal axis in FIG. 28A becomes smaller toward the right. Normally, the voltage is controlled such that it is prevented from becoming equal to a predetermined value or lower (battery capacity is prevented from becoming equal to a predetermined value or lower) by a battery voltage control circuit, and hence the voltage value is prevented from becoming equal to zero.

The lithium-ion battery has the discharge characteristics, as indicated by a solid line 2801, that the voltage is gently lowered when the battery capacity is sufficient, and rapidly lowered when the battery capacity becomes close to empty.

Further, the discharge characteristics of the lithium-ion battery depend on the temperature thereof, and in a low-temperature state, the lithium-ion battery has a smaller capacity and also has a steep falling curve of voltage. Considering these characteristics, the voltage or the capacity can be used as a calculation switching trigger.

Figure 28B:
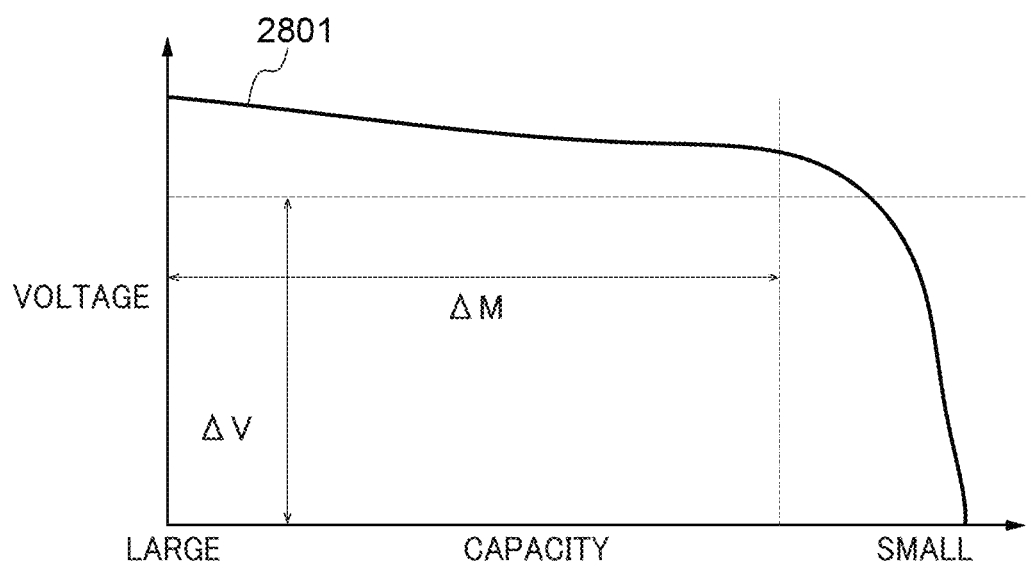

FIG. 28B is a diagram showing an example of a voltage threshold value and a capacity threshold value, set based on the discharge characteristics of the lithium-ion battery. If the battery volage is not lower than the voltage threshold value $\Delta V$, the polarization calculation processing for recording is performed, whereas if the battery volage is lower than the voltage threshold value $\Delta V$, the simplified polarization calculation processing is performed. Similarly, if the battery capacity is not smaller than the capacity threshold value $\Delta M$, the polarization calculation processing for recording is performed, whereas if the battery volage is smaller than the voltage threshold value $\Delta M$, the simplified polarization calculation processing is performed. The voltage threshold value $\Delta V$ and the capacity threshold value $\Delta M$ may be independently used or may be used in combination. By using these threshold values, when the voltage value is lowered or the battery capacity is reduced with respect to an associated one of the threshold values, the polarization calculation processing is switched to the simplified polarization calculation processing, whereby it is possible to reduce the power consumption.

Figure 29B:
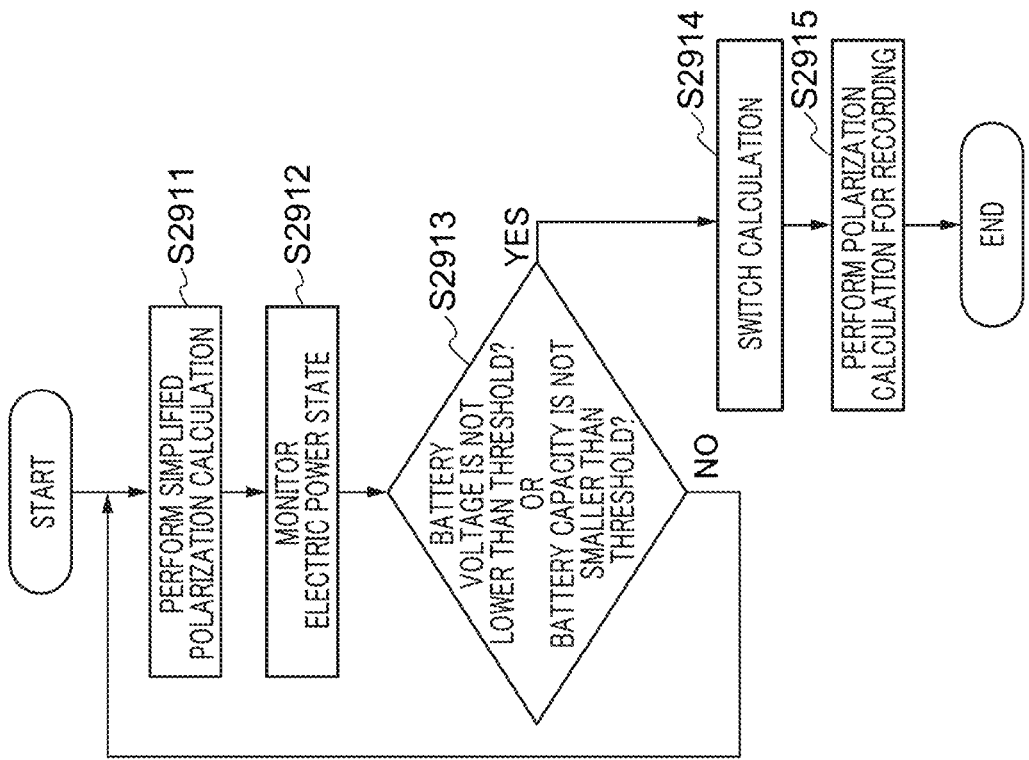
FIGS. 29A and 29B are flowcharts of first and second switching control processes for switching the polarization calculation processing in a fourteenth embodiment.
Figure 29A:
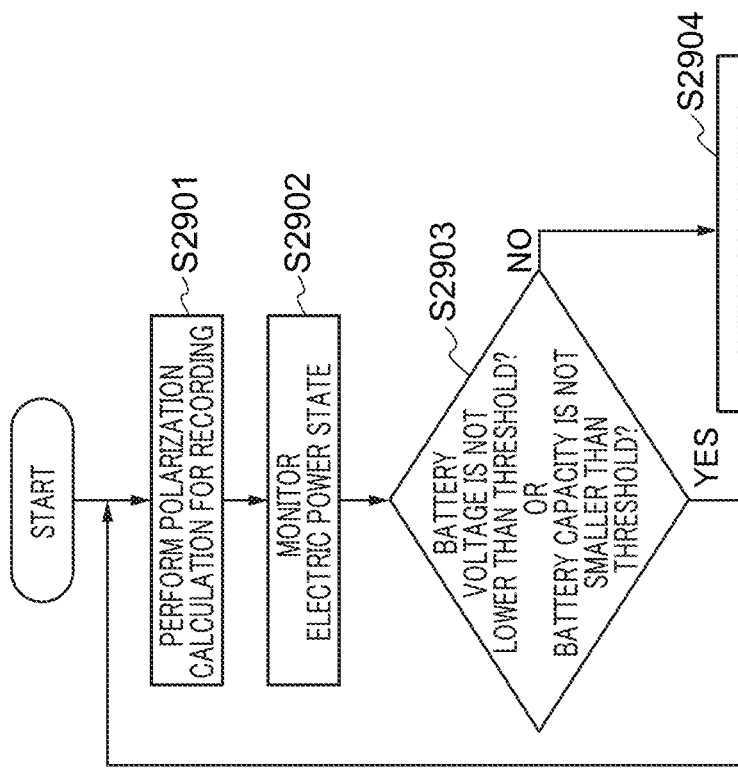

FIG. 29A is a flowchart of a first switching control process for switching the polarization calculation processing, i.e. a switching control process for switching the polarization calculation processing from the polarization calculation processing for recording to the simplified polarization calculation processing, in the fourteenth embodiment. FIG. 29B is a flowchart of a second switching control process for switching the polarization calculation processing, i.e. a switching control process for switching the polarization calculation processing from the simplified polarization calculation processing to the polarization calculation processing for recording, in the fourteenth embodiment. Processing operations (steps) indicated by S numbers in FIGS. 29A and 29B are realized by the CPU 109 that loads predetermined programs stored in the ROM 111 into the RAM 112 and performs centralized control of the operations of the components of the image capturing apparatus 100.

Referring to FIG. 29A, in a step S2901, the CPU 109 controls the polarization calculation section 108 to perform the polarization calculation processing for recording. In a step S2902, the CPU 109 monitors the power supply section 126, etc., to acquire the power supply state (battery voltage, electric current, and capacity (battery remaining amount)). In a step S2903, the CPU 109 determines whether or not the battery voltage is not lower than the voltage threshold value $\Delta V$ or the battery capacity is not smaller than the capacity threshold value $\Delta M$. If it is determined that the battery voltage is not lower than the voltage threshold value $\Delta V$ or the battery capacity is not smaller than the capacity threshold value $\Delta M$ (YES to the step S2903), the CPU 109 returns to the step S2901 and continues the polarization calculation processing for recording. On the other hand, if it is determined that the battery voltage is lower than the voltage threshold value $\Delta V$ and the battery capacity is smaller than the capacity threshold value $\Delta M$ (NO to the step S2903), the CPU 109 proceeds to a step S2904.

Note that the determination in the step S2903 may be configured such that the process returns to the step S2901 if the battery voltage is not lower than the voltage threshold value $\Delta V$ and the battery capacity is not smaller than the capacity threshold value $\Delta M$, and proceeds to the step S2904 if the battery voltage is lower than the voltage threshold value $\Delta V$ or the battery capacity is smaller than the capacity threshold value $\Delta M$.

In the step S2904, the CPU 109 switches the polarization calculation processing from the polarization calculation processing for recording to the simplified polarization calculation processing. In a step S2905, the CPU 109 controls the polarization calculation section 108 to perform the simplified polarization calculation processing, followed by terminating the present process.

The operation for returning the polarization calculation processing from the simplified polarization calculation processing to the polarization calculation processing for recording is applied to a case where the condition of the step S2903 in FIG. 29A is not satisfied e.g. due to a change of a function belonging to the image capturing apparatus 100 from the on-state to the off-state or from the off-state to the on-state. This is not limitative, but the above-mentioned operation is similarly applied to a case where driving of the image capturing apparatus 100 is switched from battery driving to driving using a stable commercial power supply.

Referring to FIG. 29B, in a step S2911, the CPU 109 controls the polarization calculation section 108 to perform the simplified polarization calculation processing. Steps S2912 and S2913 are the same as the steps S2902 and S2903 of the flowchart in FIG. 29A, respectively, and hence description thereof is omitted. If it is determined that the battery voltage is lower than the voltage threshold value $\Delta V$ and the battery capacity is smaller than the capacity threshold value $\Delta M$ (NO to the step S2913), the CPU 109 returns to the step S2911 to continue the simplified polarization calculation processing. On the other hand, if it is determined that the battery voltage is not lower than the voltage threshold value $\Delta V$ or the battery capacity is not smaller than the capacity threshold value $\Delta M$ (YES to the step S2913), the CPU 109 proceeds to a step S2914.

Note that the determination in the step S2913 may be configured such that the process proceeds to the step S2914 if the battery voltage is not lower than the voltage threshold value $\Delta V$ and the battery capacity is not smaller than the capacity threshold value $\Delta M$, and returns to the step S2911 if the battery voltage is lower than the voltage threshold value $\Delta V$ or the battery capacity is smaller than the capacity threshold value $\Delta M$.

In the step S2914, the CPU 109 switches the polarization calculation processing from the simplified polarization calculation processing to the polarization calculation processing for recording. In a step S2915, the CPU 109 controls the polarization calculation section 108 to perform the polarization calculation processing for recording, followed by terminating the present process.

Note that in the determination in the steps S2903 and S2913, a condition based on hysteresis characteristics or a condition of several times of coincidence, may be provided, whereby the control may be configured to suppress switching between the polarization calculation processing for recording and the simplified polarization calculation processing, at a short period. Further, also in the present embodiment, the processing for switching the display frame rate may be performed in accordance with switching between the polarization calculation processing for recording and the simplified polarization calculation processing.

Next, a fifteenth embodiment of the present invention will be described. In the fifteenth embodiment, a description will be given of an eighth configuration for switching between the polarization calculation processing for recording and the simplified polarization calculation processing. In the eighth configuration, the switching between the polarization calculation processing for recording and the simplified polarization calculation processing is performed based on the amount of change in the polarization calculation result between frames.

Figure 30:
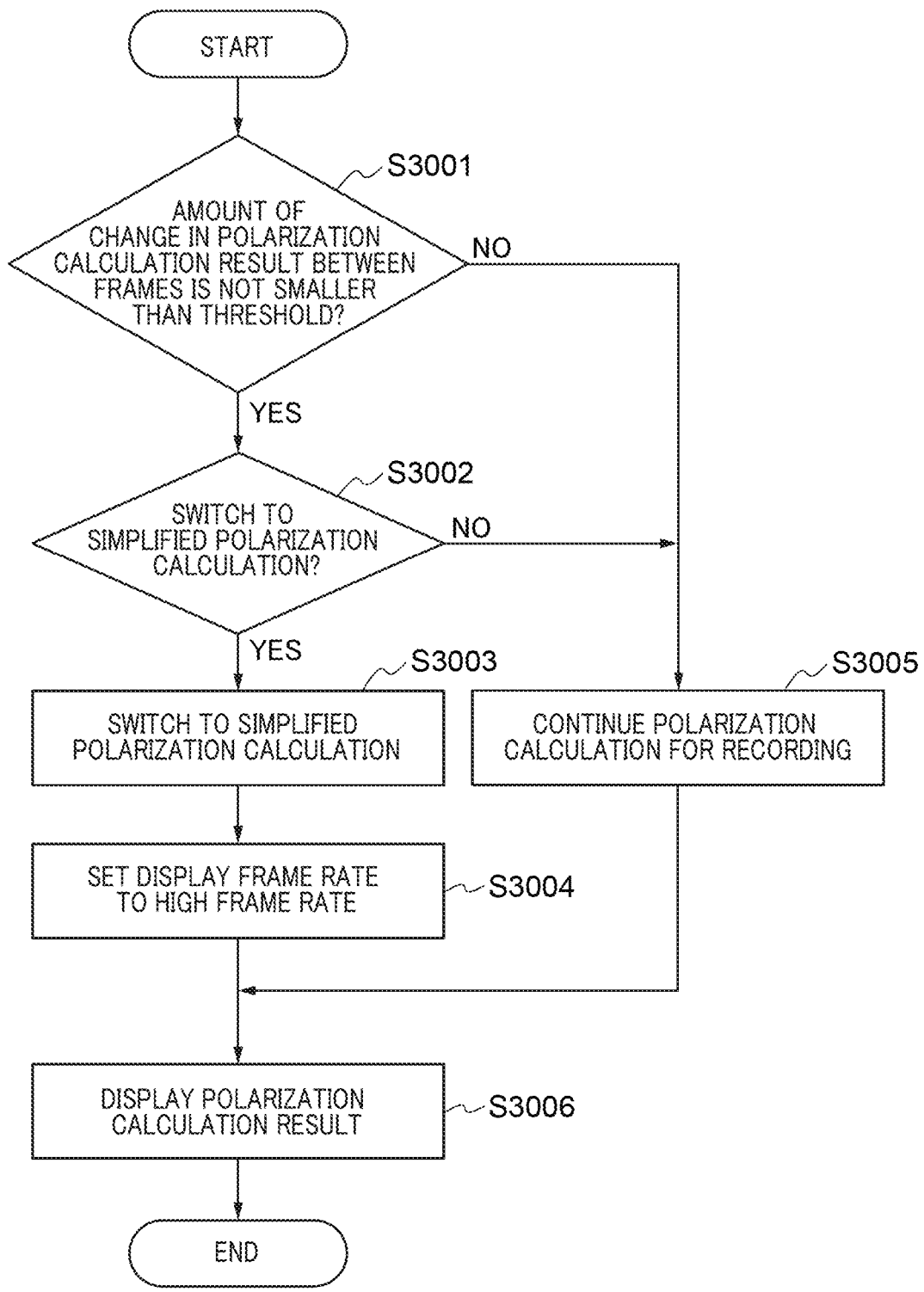
FIG. 30 is a flowchart of a first switching control process for switching the polarization calculation processing in a fifteenth embodiment.

FIG. 30 is a flowchart of a first switching control process for switching the polarization calculation processing, i.e. a switching control process for switching the polarization calculation processing from the polarization calculation processing for recording to the simplified polarization calculation processing, in the fifteenth embodiment. Processing operations (steps) indicated by S numbers in FIG. 30 are realized by the CPU 109 that loads a predetermined program stored in the ROM 111 into the RAM 112 and performs centralized control of the operations of the components of the image capturing apparatus 100. It is assumed that the polarization calculation processing for recording is being performed when the process is started.

In a step S3001, the CPU 109 determines whether or not an amount of change in the polarization calculation result between frames is not smaller than a predetermined threshold value. The polarization calculation result specifically refers to polarization degrees or polarization angles. Here, the description is given using the polarization degrees as the polarization calculation result. The polarization degree DoLP is calculated for each set of pixels (set of four pixels having respective polarization directions of 0 degree, 45 degrees, 90 degrees, and 135 degrees) by the above-mentioned formula (equation (8)). Next, the calculation result of polarization degrees of one frame, each calculated for a set of pixels, is stored in the frame memory 107. The stored calculation result of the polarization degrees of one frame is compared with a calculation result of polarization degrees, calculated when the immediately preceding frame has been acquired, and a difference of the polarization degree is calculated for each set of pixels. A difference integrated value of polarization degrees of one frame is calculated by integrating the obtained result of the difference of the polarization degree, calculated for each set of pixels. This difference integrated value of polarization degrees is the "amount of change in the polarization calculation result between frames", and whether or not the difference integrated value of polarization degrees is not smaller than the predetermined threshold value is determined in the step S3001.

Note that although in the present embodiment, the polarization degree is calculated for each set of pixels, the polarization degree may be calculated for each of a plurality of sets of pixels (areas). Further, although a calculation result of the difference of the polarization degree is integrated for one frame (all pixels), this is not limitative, but for example, in a case where a difference calculated for each set of pixels is smaller than a predetermined value, this case is determined as noise, and the corresponding calculation result may be excluded from integration.

Further, although in the present embodiment, a calculation result of the polarization degree of the current frame is compared with a calculation result of a frame immediately preceding the current frame, this is not limitative. For example, not only the immediately preceding frame, but also a second preceding frame or a further preceding frame may be considered and compared, or a frame obtained by weighting these frames may be newly generated as a frame to be compared. Further, although in the present embodiment, the description is given of the configuration using the polarization degree, the "amount of change in the polarization calculation result between frames" may be calculated by using an angle difference of the above-mentioned polarization angle AoLP. In this case, the comparison may be performed not only by simply using an angle difference, but also by converting an angle difference to another evaluation value and using the resulting conversion result.

The threshold value used in the step S3001 may be changeable according to the shooting mode or various settings of the image capturing apparatus 100. For example, in any of a case where the assist display function is enabled, a case where face detection processing is enabled, a case where the live view display is performed at a high frame rate, and like other cases, the load of calculation processing is large, and hence the processing capability resources of the CPU 109 are taken by these processing operations. To cope with this, the threshold value may be lowered so as to easily shift the calculation processing to the simplified polarization calculation processing.

If it is determined in the step S3001 that the amount of change in the polarization calculation result between frames is not smaller than the predetermined threshold value (YES to the step S3001), the CPU 109 proceeds to a step S3002. In the step S3002, the CPU 109 determines whether or not to switch the polarization calculation processing from the polarization calculation processing for recording to the simplified polarization calculation processing. The determination in the step S3002 is performed e.g. by determining whether or not the difference integrated value of polarization degrees, which is not smaller than the threshold value, has continued for a predetermined number or more of frames, and if the same has not continued for the predetermined number or more of frames, this case is determined as noise, and the polarization calculation processing is not switched to the simplified polarization calculation processing. This is not limitative, but the determination may be performed by considering other calculation processing loads at the time point of determination in the step S3002. That is, unless the calculation load is large, the polarization calculation processing for recording is continued. Note that the step S3002 may be omitted.

If it is determined that the polarization calculation processing is to be switched to the simplified polarization calculation processing (YES to the step S3002), the CPU 109 proceeds to a step S3003. In the step S3003, the CPU 109 switches the polarization calculation processing from the polarization calculation processing for recording to the simplified polarization calculation processing. For the simplified polarization calculation processing, any of the above-described various methods may be used. In the next step S3004, the CPU 109 sets the display frame rate to a high frame rate and then proceeds to a step S3006.

If it is determined in the step S3001 that the amount of change in the polarization calculation result between frames is smaller than the predetermined threshold value (NO to the step S3001), or if it is determined in the step S3002 that the polarization calculation processing is not to be switched to the simplified polarization calculation processing (NO to the step S3002), the CPU 109 proceeds to a step S3005. In the step S3005, the CPU 109 continues the polarization calculation processing for recording and then proceeds to the step S3006.

In the step S3006, the CPU 109 displays a result of the polarization calculation processing performed at the time point on the display section 121, followed by terminating the present process.

Figure 31:
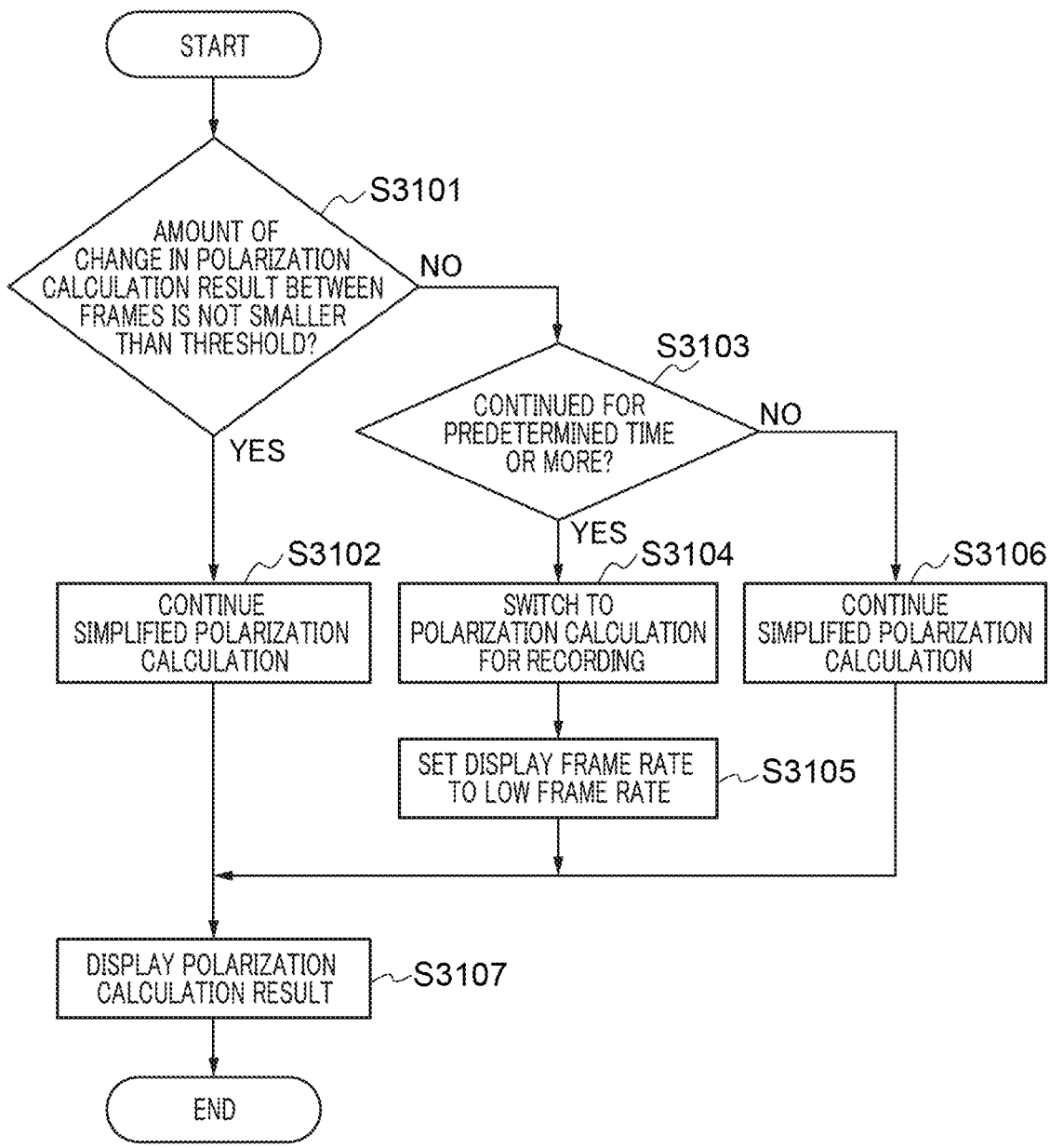
FIG. 31 is a flowchart of a second switching control process for switching the polarization calculation processing in the fifteenth embodiment.

FIG. 31 is a flowchart of a second switching control process for switching the polarization calculation processing, i.e. a switching control process for switching the polarization calculation processing from the simplified polarization calculation processing to the polarization calculation processing for recording, in the fifteenth embodiment. Processing operations (steps) indicated by S numbers in FIG. 31 are realized by the CPU 109 that loads a predetermined program stored in the ROM 111 into the RAM 112 and performs centralized control of the operations of the components of the image capturing apparatus 100. It is assumed that the simplified polarization calculation processing is being performed when the process is started.

In a step S3101, the CPU 109 determines whether or not the amount of change in the polarization calculation result between frames is not smaller than the predetermined threshold value. The step S3101 differs from the step S3001 only in whether the polarization calculation processing being executed is the simplified polarization calculation processing or the polarization calculation processing for recoding. If it is determined that the amount of change in the polarization calculation result between frames is not smaller than the predetermined threshold value (YES to the step S3101), the CPU 109 proceeds to a step S3102. In the step S3102, the CPU 109 continues the simplified polarization calculation processing and then proceeds to a step S3107. Note that the process in FIG. 31 is assumed to be performed after the simplified polarization calculation processing has come to be performed by the process in FIG. 30. Therefore, the processing in the step S3101 may be changed to processing for determining whether or not the state in which the amount of change in the polarization calculation result between frames is not smaller than the predetermined threshold value has continued for a predetermined time period or more.

If it is determined in the step S3101 that the amount of change in the polarization calculation result between frames is smaller than the predetermined threshold value (NO to the step S3101), the CPU 109 proceeds to a step S3103. In the step S3103, the CPU 109 determines whether or not the state in which the amount of change in the polarization calculation result between frames is smaller than the predetermined threshold value has continued for a predetermined time period or more. If it is determined that the state in which the amount of change in the polarization calculation result between frames is smaller than the predetermined threshold value has continued for a predetermined time period or more (YES to the step S3103), the CPU 109 proceeds to a step S3104. In the step S3104, the CPU 109 switches the polarization calculation processing from the simplified polarization calculation processing to the polarization calculation processing for recording. Then, in a step S3105, the CPU 109 sets the display frame rate to a low frame rate and then proceeds to the step S3107.

If it is determined in the step S3103 that the state in which the amount of change in the polarization calculation result between frames is smaller than the predetermined threshold value has not continued for the predetermined time period or more (NO to the step S3103), the CPU 109 proceeds to a step S3106. In the step S3106, the CPU 109 continues the simplified polarization calculation processing and then proceeds to the step S3107. In the step S3107, the CPU 109 displays the result of the polarization calculation processing on the display section 121, followed by terminating the present process.

Thus, in the present embodiment, in the case where the amount of change in the polarization calculation result between frames is not smaller than the predetermined threshold value, the polarization calculation processing is switched from the polarization calculation processing for recording to the simplified polarization calculation processing, and in the case where the state in which the amount of change in the polarization calculation result between frames is not smaller than the predetermined threshold value has continued for the predetermined time period or more, the simplified polarization calculation processing is continued. This makes it possible to increase the frame rate and thereby improve the real-time property of the display. Further, in the case where the state in which the amount of change in the polarization calculation result between frames is smaller than the predetermined threshold value has continued for the predetermined time period or more, the polarization calculation processing is switched from the simplified polarization calculation processing to the polarization calculation processing for recording. This makes it possible to display a polarization-processed image with high accuracy.

Next, a sixteenth embodiment of the present invention will be described. In the sixteenth embodiment, a description will be given of a ninth configuration for switching between the polarization calculation processing for recording and the simplified polarization calculation processing. In the ninth configuration, the switching between the polarization calculation processing for recording and the simplified polarization calculation processing is performed based on a luminance difference of each pixel and an amount of change in the polarization angle between frames.

Figure 32:
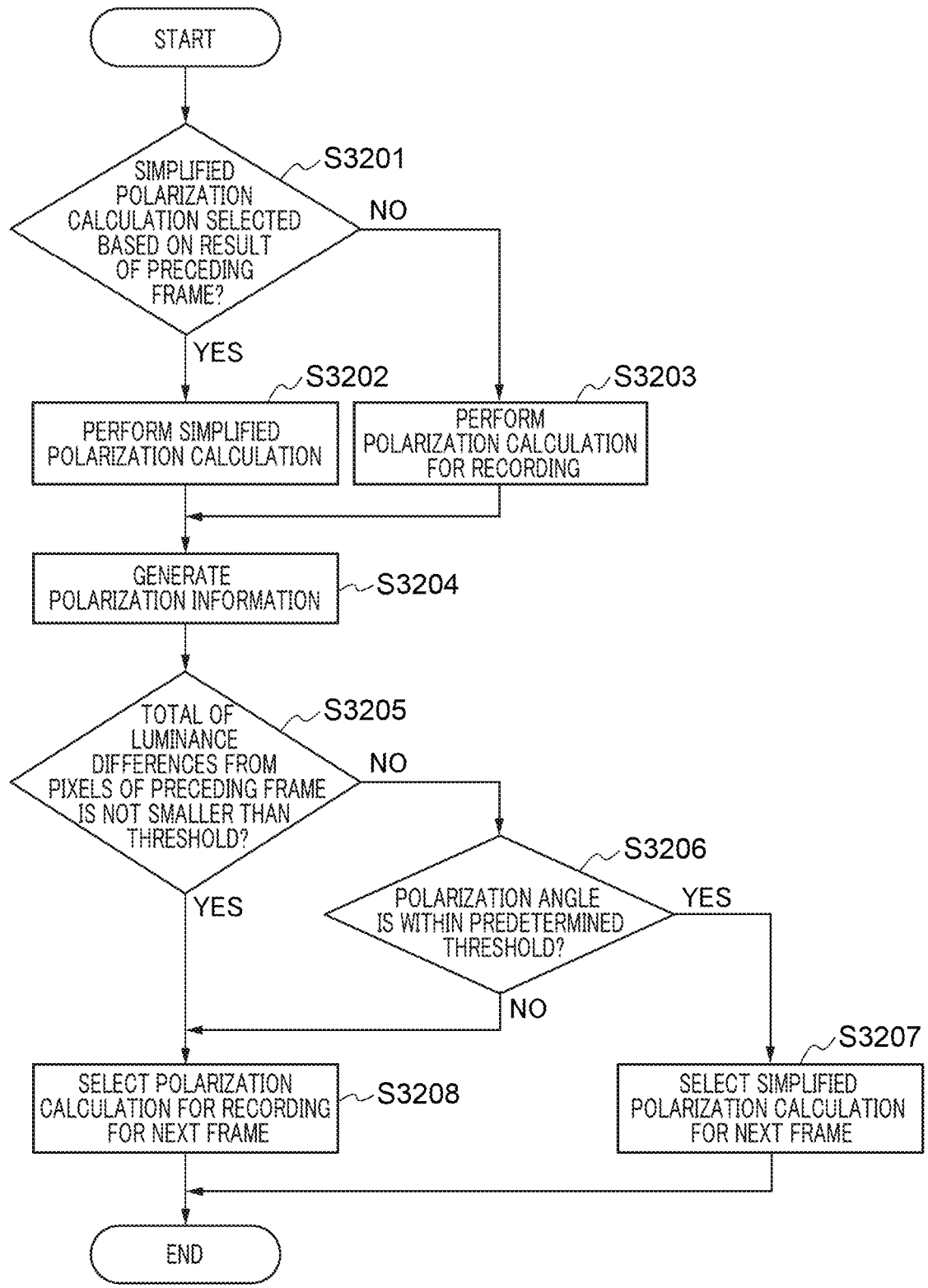
FIG. 32 is a flowchart of a switching control process for switching the polarization calculation processing in a sixteenth embodiment.

FIG. 32 is a flowchart of a switching control process for switching the polarization calculation processing from the polarization calculation processing for recording to the simplified polarization calculation processing, in the sixteenth embodiment. Processing operations (steps) indicated by S numbers in FIG. 32 are realized by the CPU 109 that loads a predetermined program stored in the ROM 111 into the RAM 112 and performs centralized control of the operations of the components of the image capturing apparatus 100.

In a step S3201, the CPU 109 determines, based on a calculation result of the immediately preceding frame (frame immediately preceding the current frame), whether or not the simplified polarization calculation processing has been selected (used) in the immediately preceding frame. If it is determined that the simplified polarization calculation processing has been selected in the immediately preceding frame (YES to the step S3201), the CPU 109 proceeds to a step S3202, whereas if it is determined that the polarization calculation processing for recording has been selected in the immediately preceding frame (NO to the step S3201), the CPU 109 proceeds to a step S3203.

In the step S3202, the CPU 109 performs the simplified polarization calculation processing with respect to the current frame and then proceeds to a step S3204. In the step S3203, the CPU 109 performs the polarization calculation processing for recording with respect to the current frame and then proceeds to the step S3204. In the step S3204, the CPU 109 generates polarization information obtained by the polarization calculation processing in the step S3202 or S3203.

In the following step S3205, the CPU 109 calculates a luminance difference between the immediately preceding frame and the current frame with respect to each set of pixels (set of four pixels having respective polarization directions of 0 degree, 45 degrees, 90 degrees, and 135 degrees), calculates a total of all calculated luminance values, and determines whether or not the total is not smaller than a predetermined threshold value. If it is determined that the total of the luminance values is smaller than the predetermined threshold value (NO to the step S3205), the CPU 109 proceeds to a step S3206.

In the step S3206, the CPU 109 determines whether or not the polarization angle is within a range of a predetermined threshold value with reference to the angles of 0°, 45°, 90°, and 135° based on the polarization information generated in the step S3204. That is, whether or not any of the pixels having the respective polarization directions of 0°, 45°, 90°, and 135° has a luminance value close to the value of Imax or Imin. If it is determined that the polarization angle is within the range of the predetermined threshold (YES to the step S3206), the CPU 109 proceeds to a step S3207. In the step S3207, the CPU 109 selects execution of the simplified polarization calculation processing with respect to the next frame, followed by terminating the present process.

If it is determined in the step S3205 that the luminance difference is not smaller than the predetermined threshold value (YES to the step S3205), and if it is determined in the step S3206 that the polarization angle is out of the range of the predetermined threshold (NO to the step S3206), the CPU 109 proceeds to a step S3208. In the step S3208, the CPU 109 judges that there is a high probability that the object has undergone some change in a case where the process proceeds to the step S3208, and therefore, and selects execution of the polarization calculation processing with high accuracy, the polarization calculation processing for recording, with respect to the next frame, followed by terminating the present process.

Thus, in the present embodiment, in the case where there is a high possibility that the object has undergone some change, the polarization calculation processing is switched to the polarization calculation processing for recording, whereby it is possible to more accurately check the object. On the other hand, in the case where a change of the object is small, the simplified polarization calculation processing is continued, whereby it is possible to continue the display at the high frame rate and maintain the real-time property of the display.

Next, a seventeenth embodiment of the present invention will be described. In the seventeenth embodiment, a description will be given of a configuration for using part of the display section 121 as a waveform monitor. The waveform monitor has a vertical axis representing a waveform level of the luminance signal and is created by superimposing a signal level of each horizontal line of luminance signals forming a video signal. It is also possible to display only a waveform level of a specified horizontal line or display a color difference signal.

Figure 33:
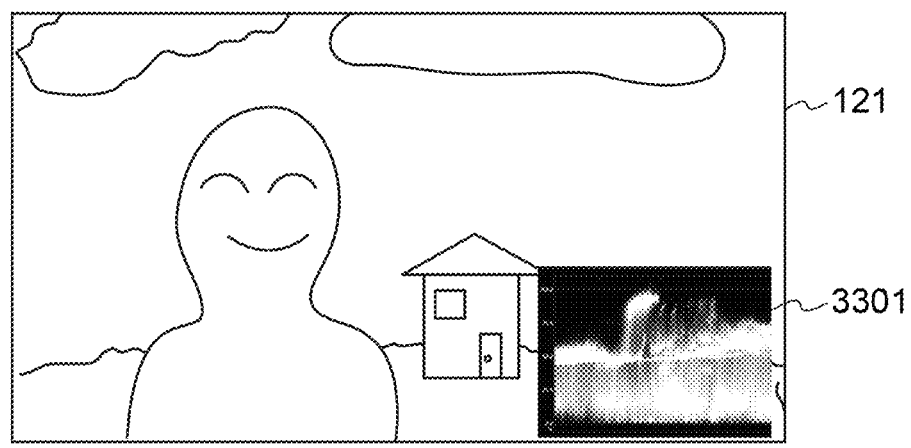
FIG. 33 is a diagram showing an example of display on the display section in a seventeenth embodiment.

FIG. 33 is a diagram showing an example of the display of an object and a waveform monitor 3301 superimposed on the object image on the display section 121 of the image capturing apparatus 100. Here, although the waveform monitor 3301 is displayed in lower right part of the screen on the display section 121, for example, the display position can be moved within the screen by an operation of the operation section 110.

Figure 34A:
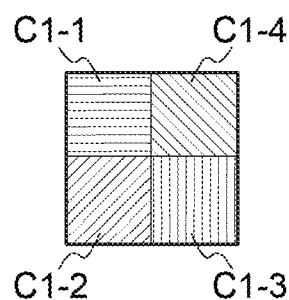
FIGS. 34A to 34E are diagrams showing a set of pixels of the imaging surface polarization sensor, on which polarization filters having different polarization directions are disposed, and an example of waveform monitors of the pixels, in the seventeenth embodiment.
Figure 34B:
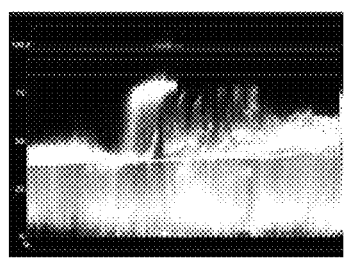
Figure 34C:
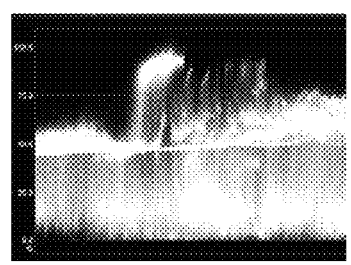
Figure 34D:
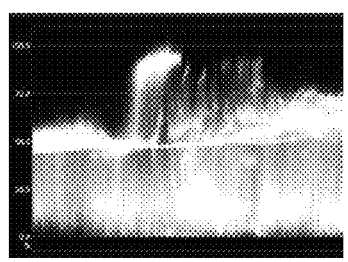
Figure 34E:

FIG. 34A is a diagram extracting and showing one set of pixels of the imaging surface polarization sensor 200, on which the polarizing filters 201 to 204, different in polarization direction, are arranged. Here, the pixels which are different in the polarization direction are denoted by reference numerals "C1-1", "C1-2", "C1-3", and "C1-4".

The polarization calculation section 108 and the OSD generation section 117 obtain the polarization information with respect to each of the pixels C1-1, C1-2, C1-3, and C1-4 based on the output from each pixel of the imaging surface polarization sensor 200. FIGS. 34B to 34E show the waveform monitors of the pixels C1-1, C1-4, C1-2, and C1-3, respectively. Referring to FIGS. 34B to 34E, the pixel C1-3 is largest in reflection level, and its waveform monitor shows a large waveform. On the other hand, the pixel C1-1 has reflection eliminated most, and its waveform monitor shows a small waveform. The pixels C1-2 and C1-4 each have a waveform of a level between the waveforms of the pixel C1-3 and C1-1.

Figure 35:
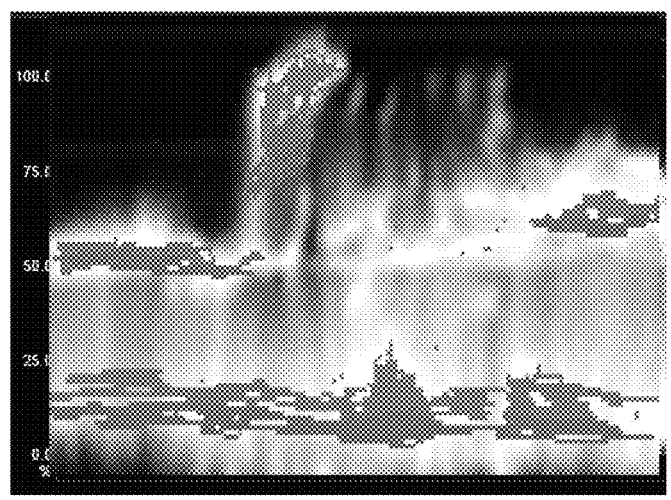
FIG. 35 is a diagram showing an example of display of the waveform monitor in the seventeenth embodiment.

In this case, the waveforms of the pixels C1-1 and C1-3 are superimposed. FIG. 35 is a diagram showing the waveform generated by superimposing the waveforms of the pixels C1-1 and C1-3. In FIG. 35, the waveforms of the pixels C1-1 and C1-3 are differentiated in color and displayed on the display section 121 so as to enable a user to distinguish them. This enables the user to check what part of the object reflects light before final shooting.

Note that although generation of the waveform may be performed by directly converting an image of each polarization angle to a waveform, this is not limitative. For example, four pixels which are different in polarization angle are set as one set, a pixel having large reflection and a pixel having small reflection are extracted, and one waveform may be generated based on these extracted pixels. Further, in a case where the processing can be performed within the image capturing apparatus 100, an emphasizing level and a reduction level of reflection may be calculated using the above equations (1) to (6) for each set of pixels, formed by four pixels which are different in polarization angle, and a reflection-emphasized image and a reflection-reduced image may be generated as the image information and displayed as the waveform in a distinguishable manner.

Figure 36A:
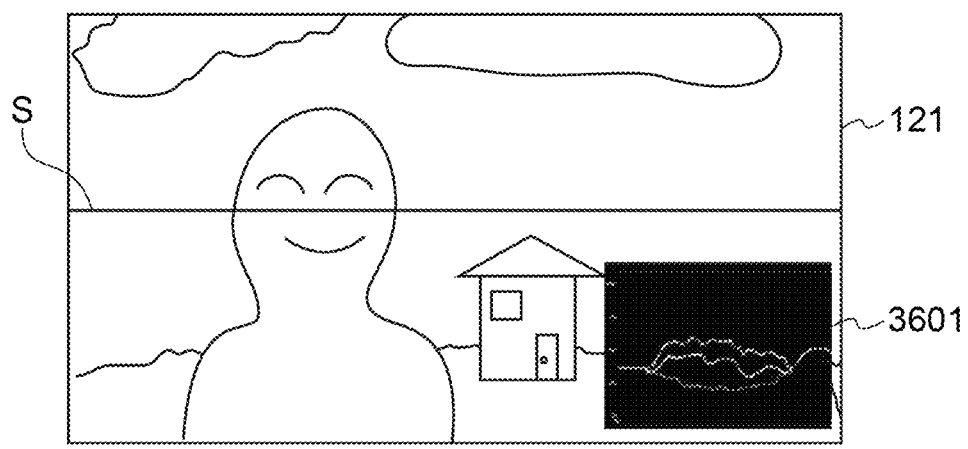
FIGS. 36A and 36B are diagrams showing another example of display of the waveform monitor in the seventeenth embodiment.
Figure 36B:
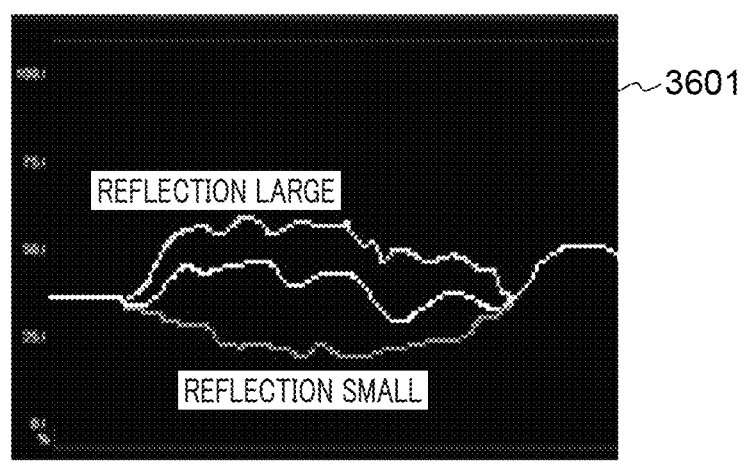

Further, a waveform monitor may be generated with respect to part selected from an image (object) and be displayed on the display section 121. FIG. 36A is a diagram showing an example in which a waveform monitor 3601 specified to a line S on the image (object) is displayed on the display section 121. FIG. 36B shows the waveform monitor 3601 appearing in FIG. 36A in an enlarged scale. Here, the polarization information is calculated only with respect to the line S in the vicinity of the center of the screen, and as shown in FIG. 36B, the reflection-reduced level and the reflection-emphasized level are identifiably displayed with the original level. With this, the user can check which part of the object reflects light, by focusing on part where the user desires to check before final shooting.

Thus, in the present embodiment, the effects of reflection reduction and reflection emphasis, obtained from the polarization information, are identifiably displayed on the display section 121 of the image capturing apparatus 100 as the waveform monitor, whereby it is possible to greatly improve the convenience of shooting. Note that as in the present embodiment, to identifiably display the waveforms of reflection reduced and emphasized by polarization on the waveform monitor, information output from each pixel of the imaging surface polarization sensor 200 is required. Normally, the output information is output from the image capturing apparatus to an external apparatus as one video signal of which the polarization information has been subjected to image processing, and hence the polarization information of each pixel no longer been included in the video signal. Although in the above-described configuration, the waveform monitor is displayed on the display section of the image capturing apparatus, a system may be formed by the image capturing apparatus which is configured to be capable of outputting all of the polarization information and an external measurement device which is connected to the image capturing apparatus and configured to calculate the polarization information and identifiably display the calculation results.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-029498 filed Feb. 25, 2020, which is hereby incorporated by reference herein in its entirety.

What is claimed is:
1. An image capturing apparatus including:
an image capturing unit including polarization pixels that detect polarization information of a plurality of different direction, and
at least one processor or circuit configured to perform the operations of the following units:
a calculation unit configured to determine polarization information of the polarization pixels by performing first polarization calculation or second polarization calculation which is smaller in calculation load than the first polarization calculation, on video signals output from the polarization pixels;
an image generation unit configured to generate a polarization-processed image using polarization information determined by the calculation unit; and
a control unit configured to switch between the first polarization calculation and the second polarization calculation, which are performed by the calculation unit, according to a predetermined timing, a mode, or a result of detecting a predetermined state.

2. The image capturing apparatus according to claim 1, wherein a plurality of polarization pixels which are different in polarization direction are set as one set of pixels, and
wherein a polarization-processed image generated by using polarization information determined by the first polarization calculation is one of an image generated by using a minimum value of luminance values of each set of pixels at an arbitrary polarization angle, an image generated by using a maximum value of luminance values of each set of pixels at an arbitrary polarization angle, and an image generated by using a value between the minimum value and the maximum value of luminance values of each set of pixels at an arbitrary polarization angle.

3. The image capturing apparatus according to claim 1, wherein a plurality of polarization pixels which are different in polarization direction are set as one set of pixels, and
wherein a polarization-processed image generated by using polarization information determined by the second polarization calculation is one of an image generated by using a minimum value of luminance values of each set of pixels, an image generated by using a maximum value of luminance values of each set of pixels, and an image generated by using a value between the minimum value and the maximum value of luminance values of each set of pixels.

4. The image capturing apparatus according to claim 1, wherein the at least one processor or circuit is also configured to perform the operation of a first recording unit configured to record a still image, and
wherein the control unit switches between the first polarization calculation and the second polarization calculation, which are performed by the calculation unit, such that the image generation unit generates a polarization-processed image using polarization information determined by the first polarization calculation when a still image is recorded by the first recording unit, and using polarization information determined by the second polarization calculation, otherwise.

5. The image capturing apparatus according to claim 1, wherein the at least one processor or circuit is also configured to perform the operation of a second recording unit configured to record a moving image, and
a setting unit configured to set a format of a moving image recorded by the second recording unit, and
wherein the control unit switches between the first polarization calculation and the second polarization calculation, which are performed by the calculation unit, according to the format set by the setting unit.

6. The image capturing apparatus according to claim 1, wherein the at least one processor or circuit is also configured to perform the operation of a first selection unit configured to select polarization pixels as targets of the second polarization calculation, and
wherein the image generation unit generates a polarization-processed image using polarization information determined by the calculation unit performing the second polarization calculation with respect to the polarization pixels selected by the first selection unit.

7. The image capturing apparatus according to claim 1, wherein the at least one processor or circuit is also configured to perform the operation of a second selection unit configured to select a frame used for the second polarization calculation from frames acquired by the image capturing unit, and
wherein the image generation unit generates a polarization-processed image using polarization information determined by the calculation unit performing the second polarization calculation with respect to the frame selected by the second selection unit.

8. The image capturing apparatus according to claim 1, wherein the at least one processor or circuit is also configured to perform the operation of an extraction unit configured to extract an area used for the second polarization calculation from a frame acquired by the image capturing unit, and wherein the image generation unit generates a polarization-processed image using polarization information determined by the calculation unit performing the second polarization calculation with respect to the area extracted by the extraction unit.

9. The image capturing apparatus according to claim 8, wherein a plurality of polarization pixels which are different in polarization direction are set as one set of pixels, and wherein the extraction unit extracts an area where a difference between a maximum value and a minimum value of luminance values of each set of pixels, is not smaller than a predetermined threshold value.

10. The image capturing apparatus according to claim 1, further comprising a lens operation unit configured to operate a lens that guides light from an object to the image capturing unit, and wherein the predetermined timing is a timing at which the lens is operated.

11. The image capturing apparatus according to claim 10, wherein the operation performed by the lens operation unit is a zoom operation, a diaphragm operation or a focusing operation.

12. The image capturing apparatus according to claim 1, wherein the at least one processor or circuit is also configured to perform the operation of a moving body detection unit configured to detect motion of an object, and wherein the predetermined timing is a timing at which motion of an object is detected by the moving body detection unit.

13. The image capturing apparatus according to claim 12, wherein the moving body detection unit detects motion of an object based on a difference in luminance value between preceding and following frames acquired by the image capturing unit or detects motion of an object by determining correlation of pixels between preceding and following frames acquired by the image capturing unit.

14. The image capturing apparatus according to claim 1, wherein the at least one processor or circuit is also configured to perform the operation of a motion detection unit configured to detect motion of the image capturing apparatus, and a determination unit configured to determine whether motion of the image capturing apparatus, detected by the motion detection unit, is panning or tilting, and wherein the predetermined timing is a timing at which an output from the motion detection unit is not lower than a predetermined threshold value and also it is determined that the motion of the image capturing apparatus is a start of panning or tilting.

15. The image capturing apparatus according to claim 14, wherein the predetermined timing is a timing at which an output from the motion detection unit is lower than the predetermined threshold value and also it is determined that the motion of the image capturing apparatus is an end of panning or tilting.

16. The image capturing apparatus according to claim 14, wherein the motion detection unit is an angular velocity sensor provided in the image capturing apparatus.

17. The image capturing apparatus according to claim 1, wherein the at least one processor or circuit is also configured to perform the operations of the following units:

a display unit, an assist unit configured to generate information for assisting shooting, a switching unit configured to switch between enabling and disabling of the assist unit, and a display control unit configured to display an image acquired by the image capturing unit and information generated by the assist unit in a superimposed state, on the display unit, and wherein the predetermined timing is a timing at which enabling and disabling of the assist unit are switched.

18. The image capturing apparatus according to claim 17, wherein the assist unit generates information on at least one of contrast, tone, hue, chroma, focus, and sharpness of an image acquired by the image capturing unit.

19. The image capturing apparatus according to claim 17, wherein the control unit determines the predetermined timing based on any of the number of enabled or disabled items of the information, a type of the information, and a combination of the number and the type of the information.

20. The image capturing apparatus according to claim 1, wherein the at least one processor or circuit is also configured to perform the operation of an operation unit configured to change a polarization angle used for generation of the polarization-processed image, and wherein the predetermined timing is a timing at which it is determined that an amount of change in the polarization angle according to a resolution of the operation unit is not smaller than a predetermined threshold value, and also the operation of the operation unit has continued for a predetermined time period or more.

21. The image capturing apparatus according to claim 20, wherein the predetermined timing is a timing at which it is determined that an amount of change in the polarization angle according to a resolution of the operation unit is smaller than the predetermined threshold value, and also the operation of the operation unit has not continued for the predetermined time period or more.

22. The image capturing apparatus according to claim 20, wherein the operation unit is a user interface displayed on the display unit, and the user interface is a belt-shaped user interface on which a polarization angle in the polarization-processed image is changed by a touch operation in a left-right direction or a vertical direction, or a user interface which has a circular shape and is operated in a clockwise/anticlockwise direction within the circular shape.

23. The image capturing apparatus according to claim 20, wherein the operation unit is a mechanical switch.

24. The image capturing apparatus according to claim 23, wherein the mechanical switch is a slide switch, a lever switch, a seesaw switch, a dial switch, or a ring-shaped switch which is provided on an optical system that guides light from an object to the image capturing unit and can be rotated about an optical axis of the optical system.

25. The image capturing apparatus according to claim 1, further comprising an operation unit configured to change a polarization angle used for generation of the polarization-processed image, and wherein the predetermined timing is a timing at which the operation unit is being operated, and also it is determined that the operation unit has been continuously operated for a predetermined time period or more.

26. The image capturing apparatus according to claim 1, wherein the at least one processor or circuit is also configured to perform the operation of a monitoring unit configured to monitor a voltage of a power supply of the image capturing apparatus, and
wherein the control unit controls such that in a case where the voltage of the power supply is not lower than a predetermined threshold value, a polarization-processed image is generated by using polarization information determined by the first polarization calculation, and in a case where the voltage of the power supply is lower than the predetermined threshold value, a polarization-processed image is generated by using polarization information determined by the second polarization calculation.

27. The image capturing apparatus according to claim 1, wherein the at least one processor or circuit is also configured to perform the operation of a monitoring unit configured to monitor a battery capacity of a power supply of the image capturing apparatus, and
wherein the control unit controls such that in a case where the battery capacity is not smaller than a predetermined threshold value, a polarization-processed image is generated by using polarization information determined by the first polarization calculation, and in a case where the battery capacity is smaller than the predetermined threshold value, a polarization-processed image is generated by using polarization information determined by the second polarization calculation.

28. The image capturing apparatus according to claim 1, wherein the control unit switches polarization calculation performed by the calculation unit from the first polarization calculation to the second polarization calculation in a case where an amount of change in a polarization degree or a polarization angle between frames acquired by the image capturing unit is not smaller than a predetermined threshold value, in polarization information determined by the first polarization calculation, and
switches polarization calculation performed by the calculation unit from the second polarization calculation to the first polarization calculation in a case where an amount of change in a polarization degree or a polarization angle between frames acquired by the image capturing unit is smaller than the predetermined threshold value, in polarization information determined by the second polarization calculation, and also this state has continued for a predetermined time period or more.

29. The image capturing apparatus according to claim 28, wherein the amount of change in a polarization degree or a polarization angle between frames is a value obtained by integrating a difference in polarization degree or polarization angle for one frame, which difference is calculated for each polarization pixel or for each of predetermined areas of an image acquired by the image capturing unit between frames acquired by the image capturing unit.

30. The image capturing apparatus according to claim 29, wherein in a case where an amount of change in a polarization degree or a polarization angle, which is calculated for each polarization pixel or each area between frames, is smaller than a predetermined threshold value, the amount of change is excluded from integration.

31. The image capturing apparatus according to claim 29, wherein the amount of change in a polarization degree or a polarization angle between frames is calculated by comparison between a current frame and an immediately preceding frame or comparison between the current frame and a frame to be compared, which is generated by considering a plurality of frames preceding the current frame.

32. The image capturing apparatus according to claim 28, wherein the at least one processor or circuit is also configured to perform the operation of a setting unit configured to change and set the predetermined threshold value based on a setting of a function in the image capturing apparatus or a magnitude of a calculation load associated with control of the image capturing apparatus.

33. The image capturing apparatus according to claim 1, wherein the control unit selects the first polarization calculation for a next frame in a case where a difference in luminance value between frames acquired by the image capturing unit is not smaller than a predetermined threshold value, and in a case where the difference in luminance value is smaller than the predetermined threshold value and also a change in a polarization angle with respect to a predetermined polarization direction is within a range of a predetermined value, and
selects the second polarization calculation for a next frame in a case where the difference in luminance value is smaller than the predetermined threshold value and also a change in the polarization angle with respect to the predetermined polarization direction is out of the range of the predetermined value.

34. An image capturing apparatus including:
an image capturing unit including polarization pixels that detect polarization information of a plurality of different directions;
at least one processor or circuit configured to perform the operations of the following units:
a calculation unit configured to determine polarization information by performing a predetermined calculation on video signals output from the polarization pixels;
a generation unit configured to generate a waveform monitor associated with the video signals; and
a display control unit configured to display the waveform monitor that identifiably displays image information calculated from the polarization information on a display unit that displays a video acquired by the image capturing unit.

35. The image capturing apparatus according to claim 34, wherein the image information calculated from the polarization information is a reflection-emphasized image and a reflection-reduced image of an object.

36. The image capturing apparatus according to claim 34, wherein the image information calculated from the polarization information is maximum luminance information and minimum luminance information of the polarization pixels.

37. A method of controlling an image capturing apparatus comprising:
generating a polarization-processed image using polarization information obtained by performing first polarization calculation on video signals output from an image capturing unit including polarization pixels that detect polarization information of a plurality of different directions;
generating a polarization-processed image using polarization information obtained by performing second polarization calculation, which is smaller in calculation load than the first polarization calculation, on the video signals; and
generating a polarization-processed image by switching between the first polarization calculation and the second polarization calculation according to a predetermined timing, a mode, or a result of detecting a predetermined state.

* * * * *